United States Patent
Tsotsis et al.

(10) Patent No.: US 7,897,122 B2
(45) Date of Patent: Mar. 1, 2011

(54) HYBRID ADSORPTIVE MEMBRANE REACTOR

(75) Inventors: Theodore T. Tsotsis, Huntington Beach, CA (US); Muhammad Sahimi, Altadena, CA (US); Babak Fayyaz-Najafi, Richmond, CA (US); Aadesh Harale, Los Angeles, CA (US); Byoung-Gi Park, Yeosu (KR); Paul K. T. Liu, Lafayette Hill, PA (US)

(73) Assignees: Media and Process Technology, Pittsburgh, PA (US); LG Petrochemical Co., Ltd., Seoul (KR); University of Southern California, Los Angeles, CA (US)

( * ) Notice: Subject to any disclaimer, the term of this patent is extended or adjusted under 35 U.S.C. 154(b) by 1164 days.

(21) Appl. No.: 11/354,672

(22) Filed: Feb. 14, 2006

(65) Prior Publication Data
US 2007/0053811 A1    Mar. 8, 2007

Related U.S. Application Data

(60) Provisional application No. 60/653,035, filed on Feb. 14, 2005.

(51) Int. Cl.
B01J 7/02 (2006.01)
B01J 8/02 (2006.01)
B01J 35/02 (2006.01)
C01B 3/02 (2006.01)

(52) U.S. Cl. ....... 422/239; 422/211; 422/212; 423/648.1

(58) Field of Classification Search ................. 422/239, 422/211, 212; 423/648.1
See application file for complete search history.

(56) References Cited

U.S. PATENT DOCUMENTS

| | | | |
|---|---|---|---|
| 5,393,325 A * | 2/1995 | Edlund | 95/56 |
| 6,248,682 B1 * | 6/2001 | Thompson et al. | 502/4 |
| 6,830,596 B1 * | 12/2004 | Hershkowitz et al. | 48/95 |
| 6,919,062 B1 * | 7/2005 | Vasileiadis et al. | 423/437.1 |
| 2003/0156989 A1 * | 8/2003 | Safir et al. | 422/99 |
| 2003/0183080 A1 * | 10/2003 | Mundschau | 95/55 |
| 2003/0204993 A1 * | 11/2003 | Holland et al. | 48/127.9 |

OTHER PUBLICATIONS

Ding et al, Equilibria and kinetics of carbon dioxide adsorption on hydrotalcite adsorbent, 2000, Chemical Engineering Science, 55, p. 3461-3474.*

* cited by examiner

*Primary Examiner* — Walter D Griffin
*Assistant Examiner* — Natasha Young
(74) *Attorney, Agent, or Firm* — Hogan Lovells US LLP

(57) ABSTRACT

A hybrid adsorbent-membrane reactor in which the chemical reaction, membrane separation, and product adsorption are coupled. Also disclosed are a dual-reactor apparatus and a process using the reactor or the apparatus.

40 Claims, 56 Drawing Sheets

Base Case: Conventional WGS and HT Adsorber

Case I: Adsorption Enhanced WGS Reactor

Case II: Adsorption Enhanced WGS Membrane Reactor

Case IIA: WGS Membrane Reactor with Interstage CO$_2$ Adsorber

HYBRID ADSORPTIVE MEMBRANE REACTOR

RELATED APPLICATION

This application claims priority to U.S. Provisional Application Ser. No. 60/653,035, filed Feb. 14, 2005, the content of which is incorporated herein by reference in its entirety.

FUNDING

This invention was made with support in part by grants from the United States National Aeronautics and Space Administration (NASA) and Department of Energy (DOE) under cooperative agreement No. DE-FC26-00NT40922. Therefore, the U.S. government has certain rights.

FIELD OF THE INVENTION

The present invention relates generally to chemical reactors. More specifically, the invention relates to a hybrid adsorbent-membrane reactor (HAMR) and uses thereof.

BACKGROUND OF THE INVENTION

As a result of stricter environmental regulations worldwide, hydrogen is progressively becoming a very important clean energy source for both mobile and stationary applications. For hydrogen to replace fossil fuels as the fuel of choice for mobile applications, it requires the creation of a production and delivery infrastructure equivalent to those that currently exist for fossil fuels. As an alternative and an interim step toward the new hydrogen economy, various groups are currently investigating hydrocarbon steam reforming for onboard generation of hydrogen for use in fuel cell-powered vehicles, or for on-site production, in place of compressed or liquid hydrogen gas storage for stationary power generation applications (Choi and Stenger (2003) J. Power Sources 124: 432, Darwish et al. (2003) Fuel 83:409, Liu et al. (2002) J. Power Sources 111:83, and Semelsberger et al. (2004) Int. J. Hydrogen Energy 29:1047). Methane steam reforming is currently attracting renewed interest in this regard, particularly for distributed power generation through the use of fuel cells. The process is widely practiced for large-scale hydrogen production and involves reacting steam with methane, through the endothermic and reversible methane steam reforming reaction, over supported nickel catalysts in packed bed reactors (reformers). Traditionally, these reformers have generally operated at temperatures often in excess of 1,000 K and pressures as high as 30 bar and reach relatively low equilibrium conversions (Elnashaie et al. (1990) Chem. Eng. Sci. 45:491, Xu and Froment (1989) AIChE J. 35:88, and Han and Harrison (1994) Chem. Eng. Sci. 49:5875). Such conditions are often neither convenient nor economical to attain for small-scale, on-site (or onboard) hydrogen generation. As a result, there is much current interest in the development of more effective reforming technologies.

Reactive separation processes have been attracting renewed interest for application in catalytic steam reforming. They include packed bed catalytic membrane reactors (MRs) (Hwang (2001) Korean J. Chem. Eng. 18:775, Lim et al. (2002) Chem. Eng. Sci. 57:4933, Park et al. (1998) Ind. Eng. Chem. Res. 37:1276, Nam et al. (2000) Korean J. Chem. Eng. 17:288, Saracco and Specchia (1994) Catal. Rev.-Sci. Eng. 36:305, and Sanchez and Tsotsis (2002) Catalytic Membranes and Membrane Reactors, Wiley-VCH, Weinheim, Germany) and, more recently, absorptive reactor (AR) processes (Xiu et al. (2004) Chem. Eng. Res. Des. 82:192, Xiu et al. (2003) Chem. Eng. J. (Amsterdam, Neth.) 95:83, Xiu et al. (2003) Chem. Eng. Sci. 58:3425, Xiu et al. (2002) AIChE J. 48:817, Xiu et al. (2002) Chem. Eng. Sci. 57:3893, Lee et al. (2004) Chem. Eng. Sci. 59:931, Ding and Alpay (2000) Chem. Eng. Sci. 55:3929, Ortiz and Harrison (2001) Ind. Eng. Chem. Res. 40:5102, Balasubramanian et al. (1999) Chem. Eng. Sci. 54:3543, Waldron et al. (2001) AIChE J. 47:1477, and Hufton et al. (1999) AIChE J. 45:248). Their potential advantages over the more conventional reformers have been widely discussed. They include (i) increasing the reactant conversion and product yield, through shifting of the equilibrium toward the products, potentially allowing operation under milder conditions (e.g., lower temperatures and pressures and reduced steam consumption), and (ii) reducing the downstream purification requirements by in situ separating from the reaction mixture the desired product hydrogen (in the case of MRs) or the undesired product $CO_2$ (in the case of ARs).

MRs show substantial promise in this area and, typically, utilize nanoporous inorganic or metallic Pd or Pd alloy membranes (Sanchez and Tsotsis (2002) Catalytic Membranes and Membrane Reactors, Wiley-VCH, Weinheim, Germany). The latter are better suited for pure hydrogen production. However, metallic membranes are very expensive and become brittle during reactor operation (Nam et al. (2000) Korean J. Chem. Eng. 17:288) or deactivate in the presence of sulfur or coke. Nanoporous membranes are better suited for the steam reforming environment. They are difficult to manufacture, however, without cracks and pinholes and, as a result, often have inferior product yield. In addition, the hydrogen product in the permeate side contains substantial amounts of other byproducts, particularly $CO_2$, and may require further treatment for use in fuel cell-powered vehicles.

Adsorptive reactors also show good potential (Xiu et al. (2004) Chem. Eng. Res. Des. 82:192, Xiu et al. (2003) Chem. Eng. J. (Amsterdam, Neth.) 95:83, Xiu et al. (2002) AIChE J. 48:817, and Xiu et al. (2002) Chem. Eng. Sci. 57:3893). The challenge here, however, is in matching the adsorbent properties with those of the catalytic system. Two types of adsorbents have been suggested: potassium-promoted layered double hydroxides (LDHs), which operate stably only at lower temperatures (less than 500° C. (Waldron et al. (2001) AIChE J. 47:1477, Hufton et al. (1999) AIChE J. 45:248, and Ding and Alpay (2000) Chem. Eng. Sci. 55:3461), and CaO or commercial dolomite, which can be utilized at the typical steam reforming temperatures of 650-700° C. (Lee et al. (2004) Chem. Eng. Sci. 59:931) but requires temperatures higher than 850° C. for regeneration (Ortiz and Harrison (2001) Ind. Eng. Chem. Res. 40:5102 and Balasubramanian et al. (1999) Chem. Eng. Sci. 54:3543). These are very harsh conditions that result in gradual deterioration of the adsorbent properties and potentially sintering of the reforming catalyst (Ortiz and Harrison (2001) Ind. Eng. Chem. Res. 40:5102 and Balasubramanian et al. (1999) Chem. Eng. Sci. 54:3543). The mismatch between the reaction and regeneration conditions is likely to result in significant process complications.

Conventional steam reforming, particularly for methane ($CH_4$), has been studied extensively and practiced routinely in the industry using a packed bed catalytic reactor (PBR). A high reaction temperature is required (i.e., >800° C. for $CH_4$) to deliver a sufficient reaction rate and to overcome the equilibrium conversion limitations; this introduces an unfavorable environment for the exothermic water-gas-shift (WGS) reaction step. As a result, significant CO is present in the final product, which requires further conversion to $H_2$ in a separate two-stage WGS reactor and additional post-treatment reactors (such as a partial oxidizer and a methanizer) to reduce the CO levels to meet the proton exchange membrane (PEM) feedstock specifications. This multiple-step reforming process adds significant process complexity, and is undesirable, particularly for small-scale distributed-type applications. MR technology (Sanchez Marcano and Tsotsis (2002) Catalytic Membranes and Membrane Reactors, Wiley VCH), primarily Pd membrane-based, has been proposed to streamline the reforming process by, for instance, integrating the reforming and WGS reaction in a single step or via the use of a one-step WGS. However, this Pd membrane-based MR suffers the following disadvantages: potential coking on the Pd surface as a result of $H_2$ removal even at the lowest operating temperature, e.g., >450° C.; and only incremental, not dramatic increases in overall conversion resulting from bulk $H_2$ removal. Theoretically, a nearly 100% conversion can be achieved by completely removing the $H_2$ from the reactor side; however, the partial pressure of $H_2$ available for permeation is too low for this to be realized in practice.

In the case of natural gas (NG), the reforming reaction is typically modeled as reforming of methane (by far its major component), which consists of the following two reactions:

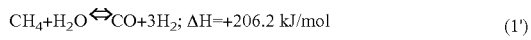

(1')

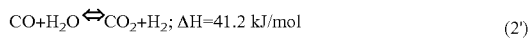

(2')

Reaction (1') is endothermic and equilibrium limited, and is, therefore, practiced at higher temperatures (>800° C.). Unfortunately, the WGS reaction (2') is exothermic and is highly unfavorable at higher temperatures. This then necessitates the need for utilizing a separate reactor system for carrying out the WGS step at lower temperatures. The WGS reactor system is typically a dual-reactor system consisting of a high temperature reactor operating at ||400-450° C., followed by a low temperature reactor, which operates at ~250-300° C. This, then, adds significant process complexity to the fuel processing section. Nevertheless, even with the separate WGS reactor being present, the product contains ~0.5-1% CO, substantially higher than what is permissible, for example, for PEM fuels cells. To make the use of such fuel cells possible (CO at the tens of ppm level is detrimental to performance) for power generation and mobile applications, an additional processing step for CO removal, typically a partial oxidation step (POX), is required, which further adds to the processing complexity and costs.

SUMMARY OF THE INVENTION

The invention is based upon the unexpected discovery that a novel hybrid adsorbent-membrane reactor requires less hostile operating conditions and provides enhanced product yield and purity.

Accordingly, in one aspect, the invention features a reactor comprising a chamber, an inlet for introducing one or more reactants into the chamber, a catalyst disposed in the chamber for facilitating a WGS reaction of the reactants to produce at least one desired product and at least one by-product, a membrane disposed in the chamber for selectively permitting the desired product and the by-product to pass through the membrane, an adsorbent disposed in the chamber for adsorbing the by-product, and an outlet for allowing the desired product to exit the chamber.

In another aspect, the invention features a reactor comprising a chamber, an inlet for introducing one or more reactants into the chamber, a catalyst disposed in the chamber for facilitating a steam reforming reaction of the reactants to produce at least one desired product and at least one by-product, a non-metallic membrane disposed in the chamber for selectively permitting the desired product and the by-product to pass through the membrane, an adsorbent disposed in the chamber for adsorbing the by-product, and an outlet for allowing the desired product to exit the chamber.

The invention further provides a reactor comprising a chamber, an inlet for introducing one or more reactants into the chamber, a catalyst disposed in the chamber for facilitating a steam reforming reaction of the reactants to produce at least one desired product and at least one by-product, a membrane disposed in the chamber for selectively permitting the desired product and the by-product to pass through the membrane, a hydrotalcite (HT) adsorbent disposed in the chamber for adsorbing the by-product, and an outlet for allowing the desired product to exit the chamber.

The invention also provides a reactor comprising a chamber, an inlet for introducing one or more reactants into the chamber, a catalyst disposed in the chamber for facilitating a steam reforming reaction of the reactants to produce at least one desired product and at least one by-product, a membrane disposed in the chamber for selectively permitting the desired product and the by-product to pass through the membrane, an adsorbent disposed in the chamber for adsorbing the by-product, and an outlet for allowing the desired product to exit the chamber, wherein neither the catalyst nor the adsorbent is disposed in a circulating fluidized bed. A circulating fluidized bed refers to a type of furnace or reactor in which the emission of sulfur compounds is lowered by the addition of crushed limestone in the fluidized bed, thus obviating the need for much of the expensive stack gas clean-up equipment. The particles are collected and recirculated, after passing through a conventional bed, and cooled by boiler internals.

In addition, the invention features a reactor comprising a chamber, an inlet for introducing one or more reactants into the chamber, a catalyst disposed in the chamber for facilitating a reaction of the reactants to produce at least one desired product and at least one by-product, a carbon molecular sieve (CMS) or silicon carbide membrane disposed in the chamber for selectively permitting the desired product and the by-product to pass through the membrane, an adsorbent disposed in the chamber for adsorbing the by-product, and an outlet for allowing the desired product to exit the chamber.

Moreover, the invention provides a reactor comprising a chamber, an inlet for introducing one or more reactants into the chamber, a catalyst disposed in the chamber for facilitating a reaction of the reactants to produce at least one desired product and at least one by-product, a membrane disposed in the chamber for selectively permitting the desired product and the by-product to pass through the membrane, a hydrotalcite adsorbent disposed in the chamber for adsorbing the by-product, and an outlet for allowing the desired product to exit the chamber.

Also within the scope of the invention is a process comprising introducing one or more reactants into a reactor of the invention, contacting the catalyst with the reactants to facilitate a reaction of the reactants to produce at least one desired product and at least one by-product, selectively passing the desired product and the by-product through the membrane, adsorbing the by-product with the adsorbent, and withdrawing the desired product from the reactor.

In some embodiments, the invention provides an apparatus comprising at least two reactors of the invention.

In particular, the invention features an apparatus comprising at least two reactors, each reactor including a chamber, an inlet for introducing one or more reactants into the chamber, a catalyst disposed in the chamber for facilitating a steam reforming reaction of the reactants to produce at least one desired product and at least one by-product, a membrane disposed in the chamber for selectively permitting the desired product and the by-product to pass through the membrane, an adsorbent disposed in the chamber for adsorbing the by-product, and an outlet for allowing the desired product to exit the chamber.

Accordingly, the invention provides a process comprising introducing one or more reactants into each reactor of an apparatus of the invention, contacting the catalyst with the reactants to facilitate a reaction of the reactants to produce at least one desired product and at least one by-product in the reactor, selectively passing the desired product and the by-product through the membrane in the reactor, adsorbing the by-product with the adsorbent in the reactor, and withdrawing the desired product from the reactor, wherein the reactors of the apparatus are offset in point of time such that, at all times, the desired product is being withdrawn from at least one of the reactors.

In a reactor of the invention, the reaction may be a WGS or steam reforming reaction, the membrane may be a CMS or silicon carbide membrane, and the adsorbent may be a hydrotalcite. A process of the invention may be carried out at 275-700° C.

The above-mentioned and other features of this invention and the manner of obtaining and using them will become more apparent, and will be best understood, by reference to the following description, taken in conjunction with the accompanying drawings. These drawings depict only typical embodiments of the invention and do not therefore limit its scope.

DETAILED DESCRIPTION OF THE INVENTION

Figure 1:
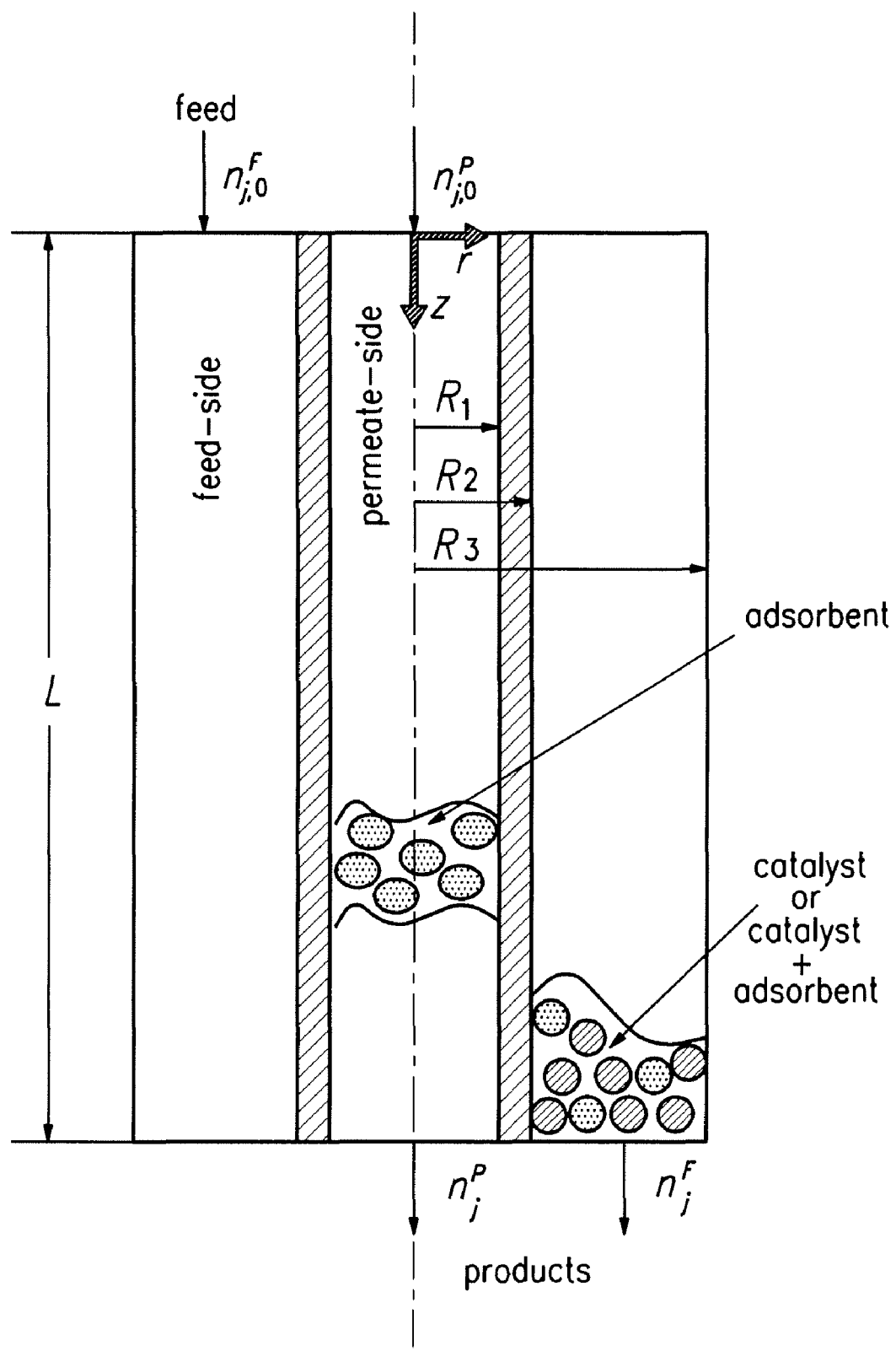
FIG. 1 is a schematic diagram of an HAMR.
Figure 2:
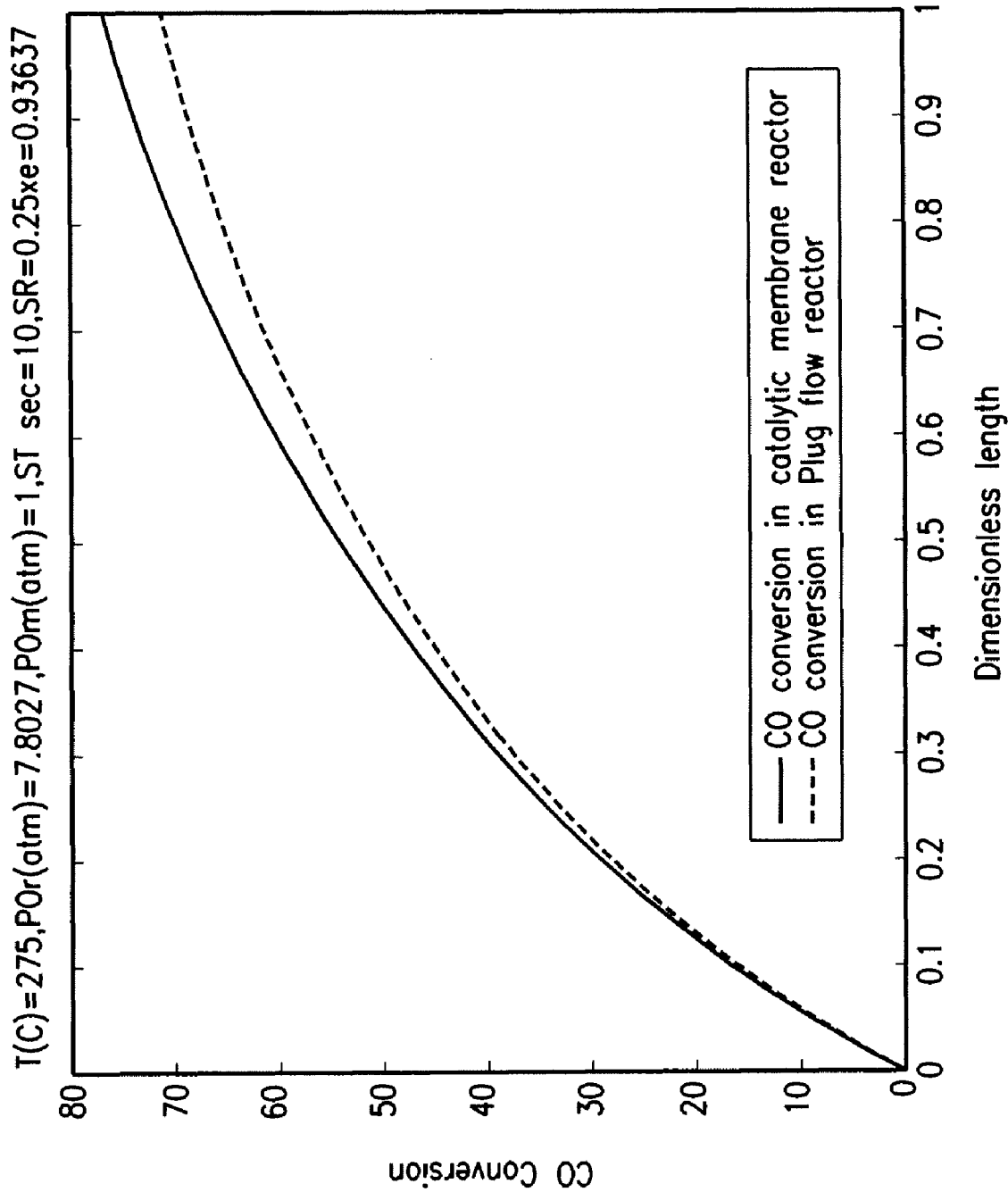
FIG. 2 shows CO conversion vs. reactor length for HAMR vs. packed bed reactors. T=275° C., $P_0r$=7.8027 atm, $P_0m$=1 atm, Space Time (ST)=10 sec, Sweep Ratio (SR)=0.25, Equilibrium Conversion (Xe)=0.93637.
Figure 3:
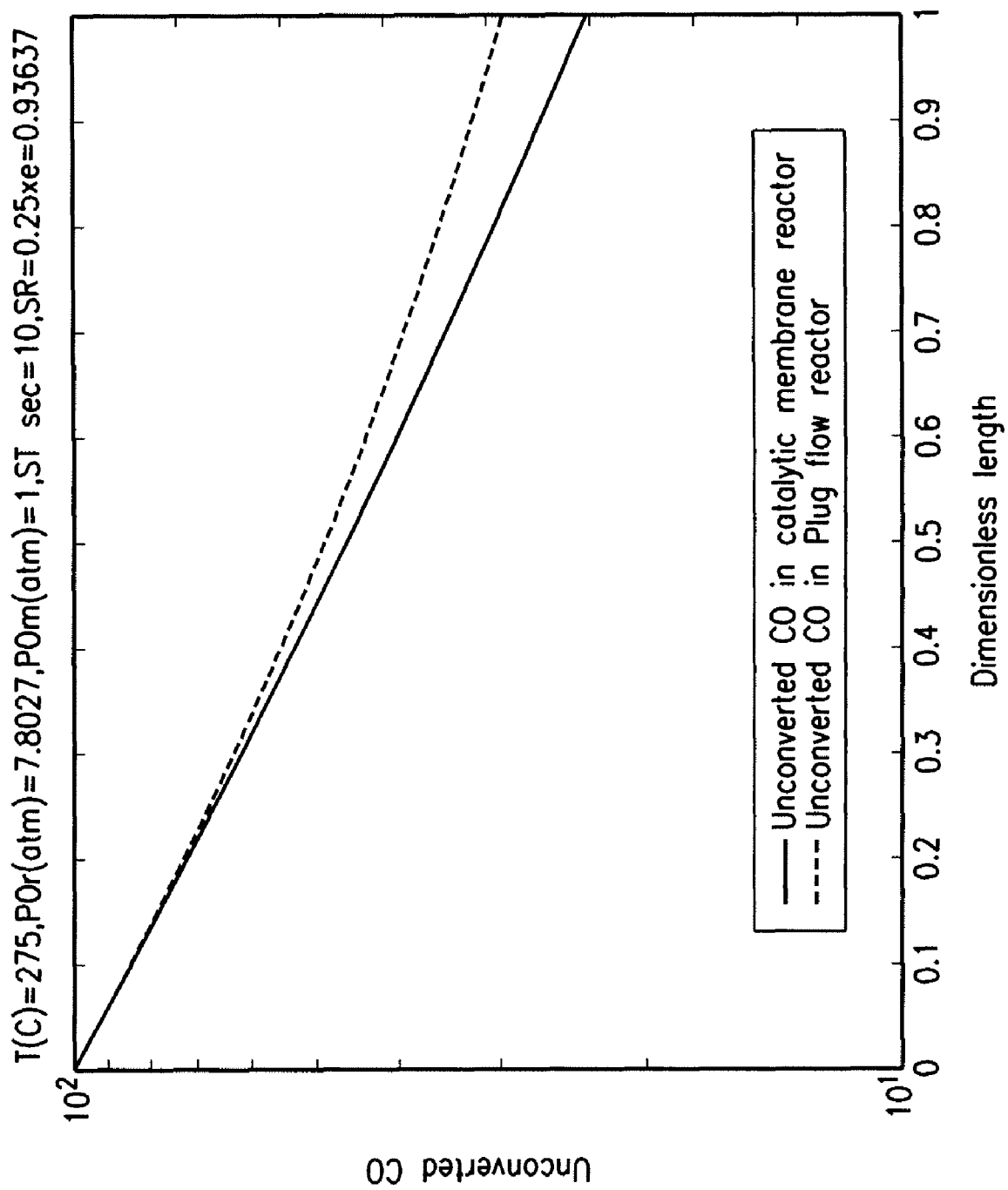
FIG. 3 shows unconverted CO vs. reactor length for HAMR vs. packed bed reactors. (Conditions same as in FIG. 2)
Figure 4:
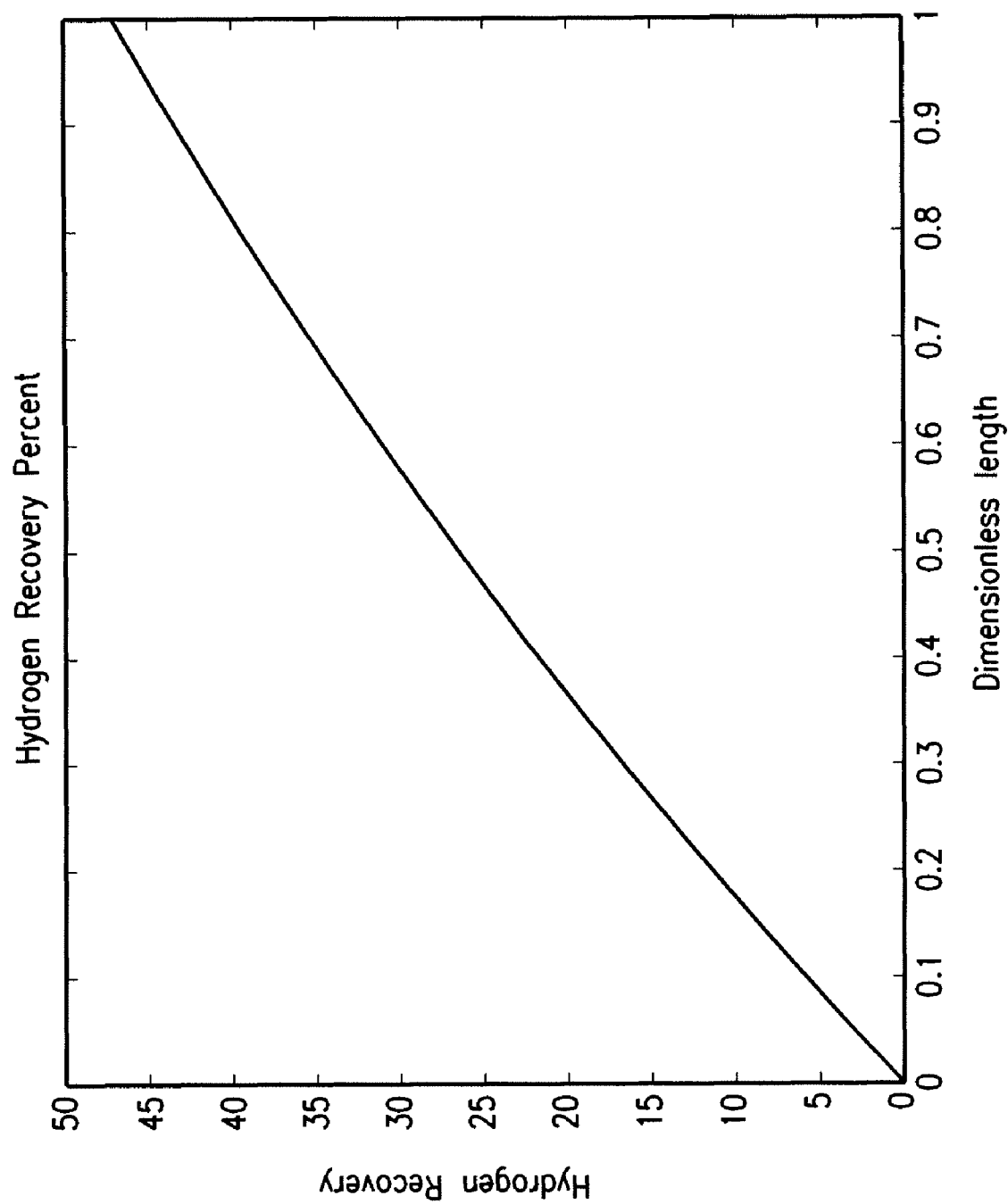
FIG. 4 shows hydrogen recovery (%) in HAMR. (Conditions same as in FIG. 2)
Figure 5:
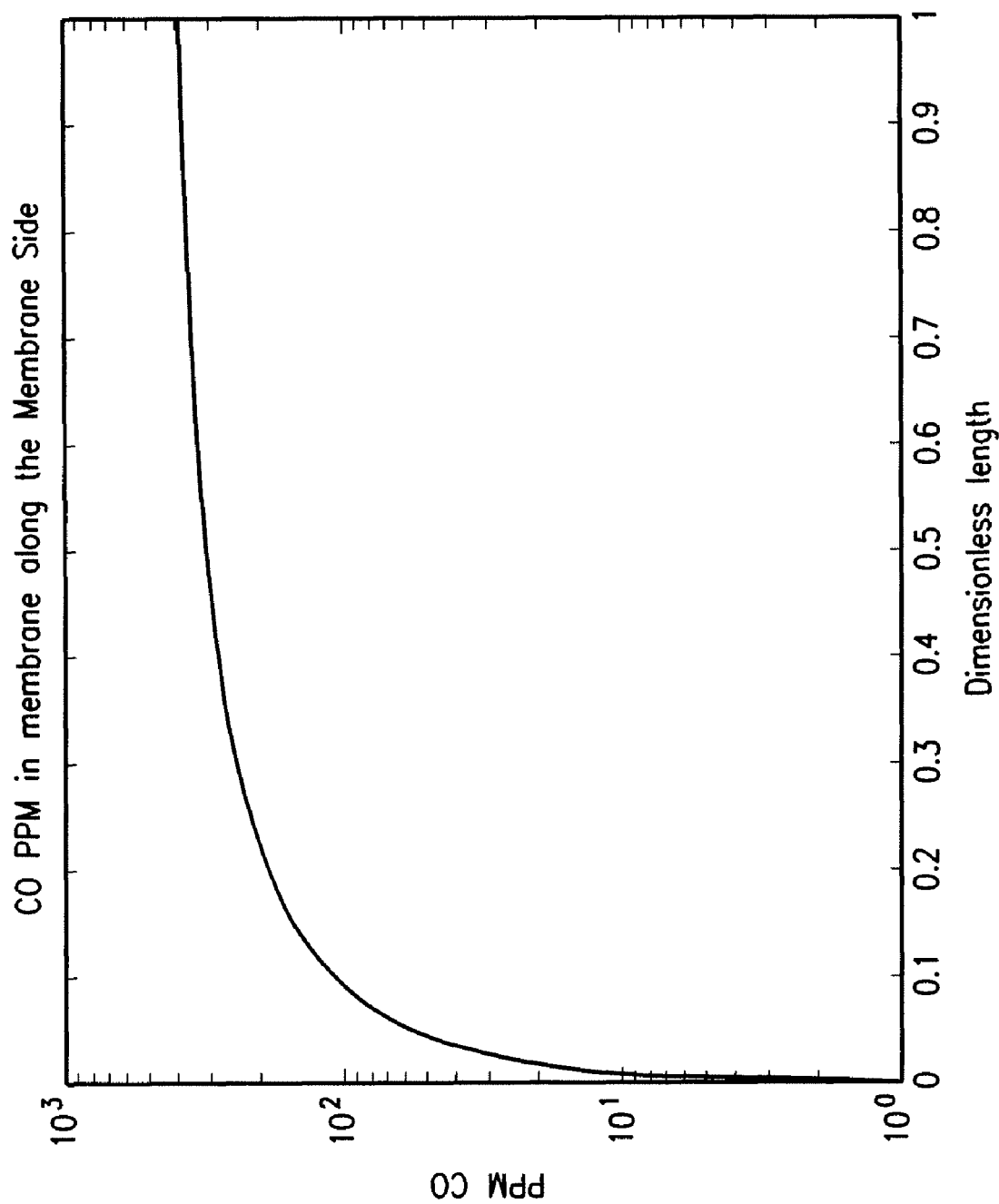
FIG. 5 shows permeate CO concentration (in ppm) in HAMR. (Conditions same as in FIG. 2)
Figure 6:
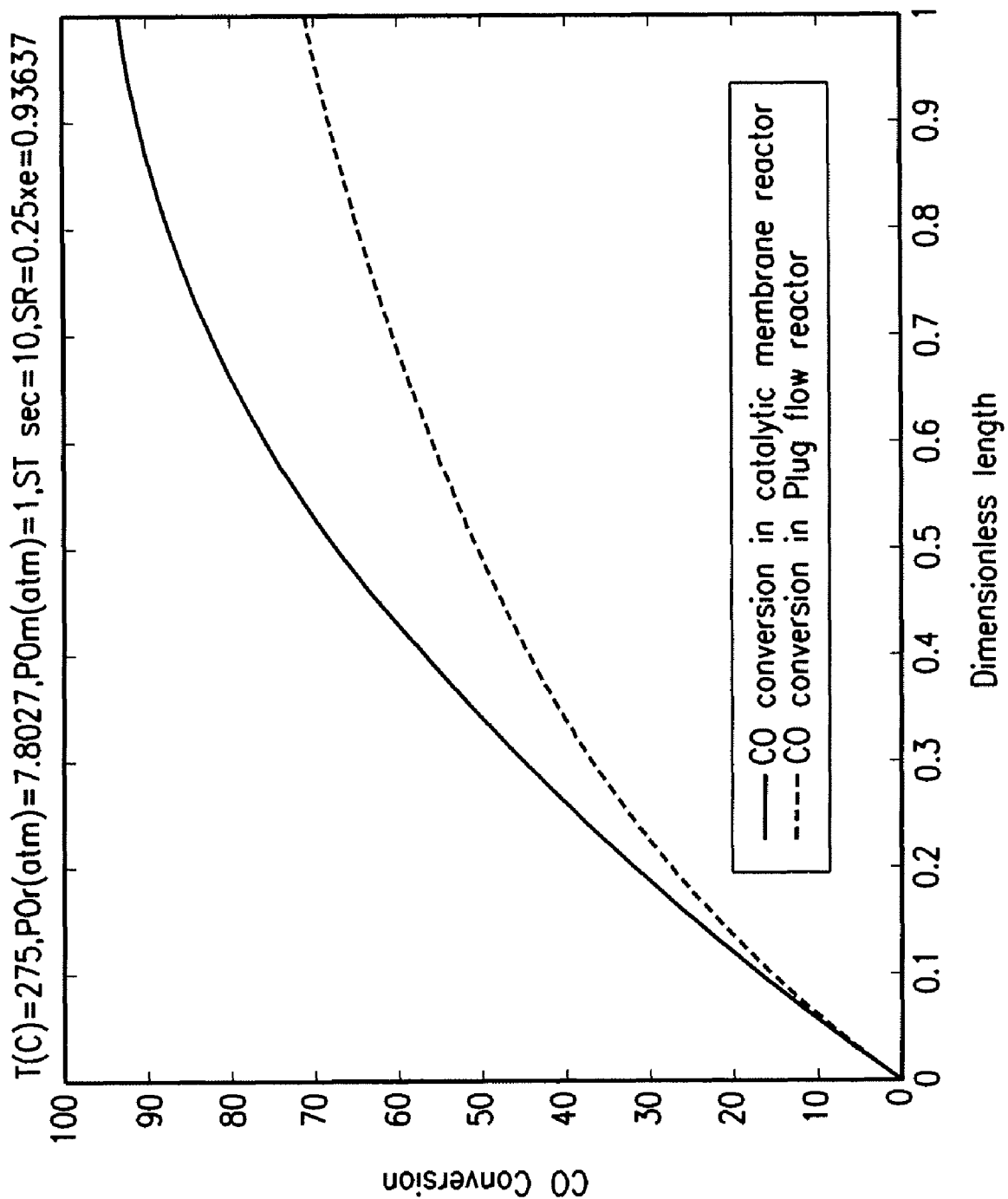
FIG. 6 shows CO conversion vs. reactor length for HAMR vs. packed bed reactors. T=275° C., $P_0r$=7.8027 atm, $P_0m$=1 atm, ST=10 sec, SR=0.25, Xe=0.93637, $H_2$ permeance=5× $10^{-6}$ mole/($cm^2$·sec·atm), $H_2$/CO=100, $CO_2$/CO=1.
Figure 7:
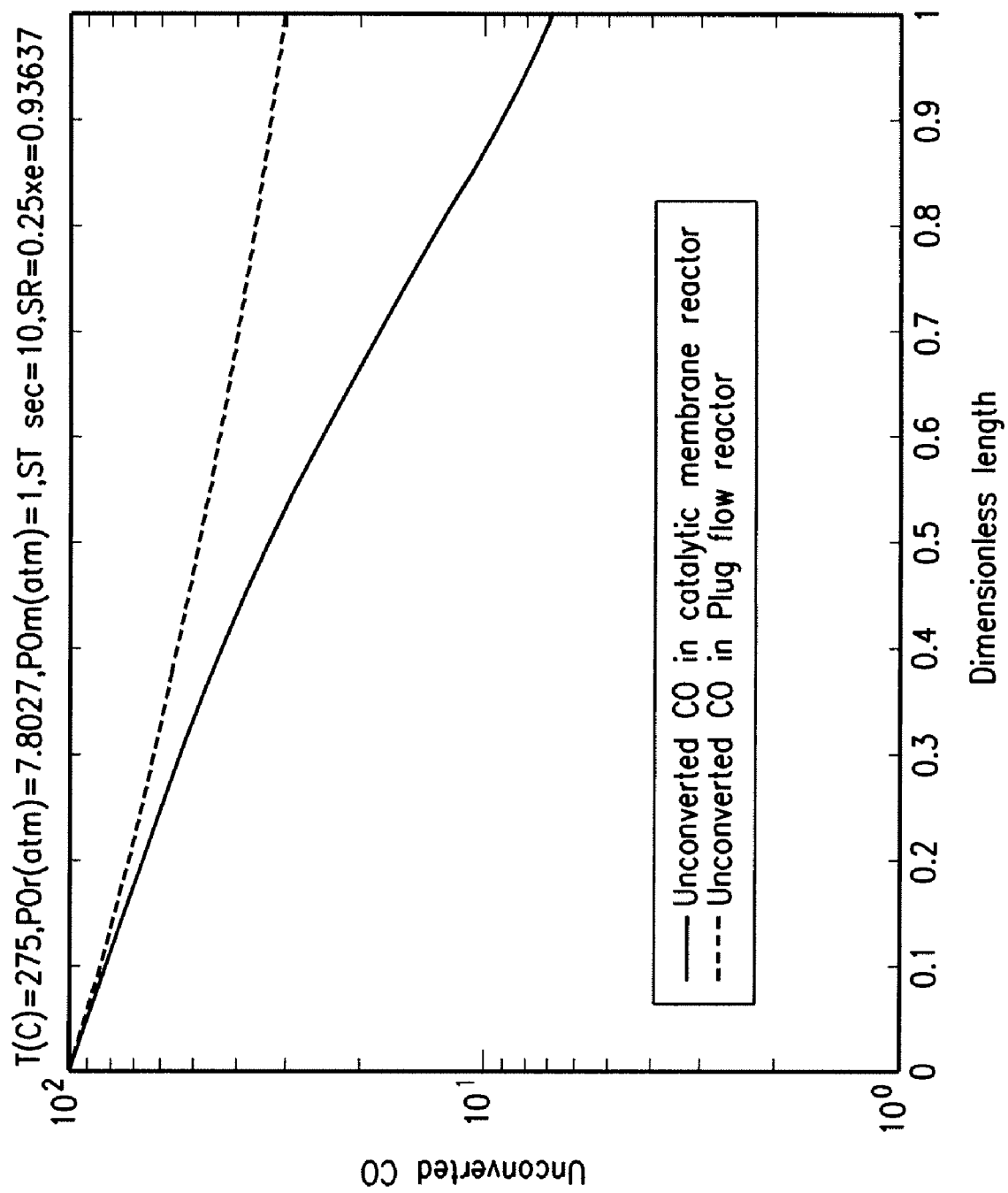
FIG. 7 shows unconverted CO vs. reactor length for HAMR vs. packed bed reactors. (Conditions same as in FIG. 6)
Figure 8:
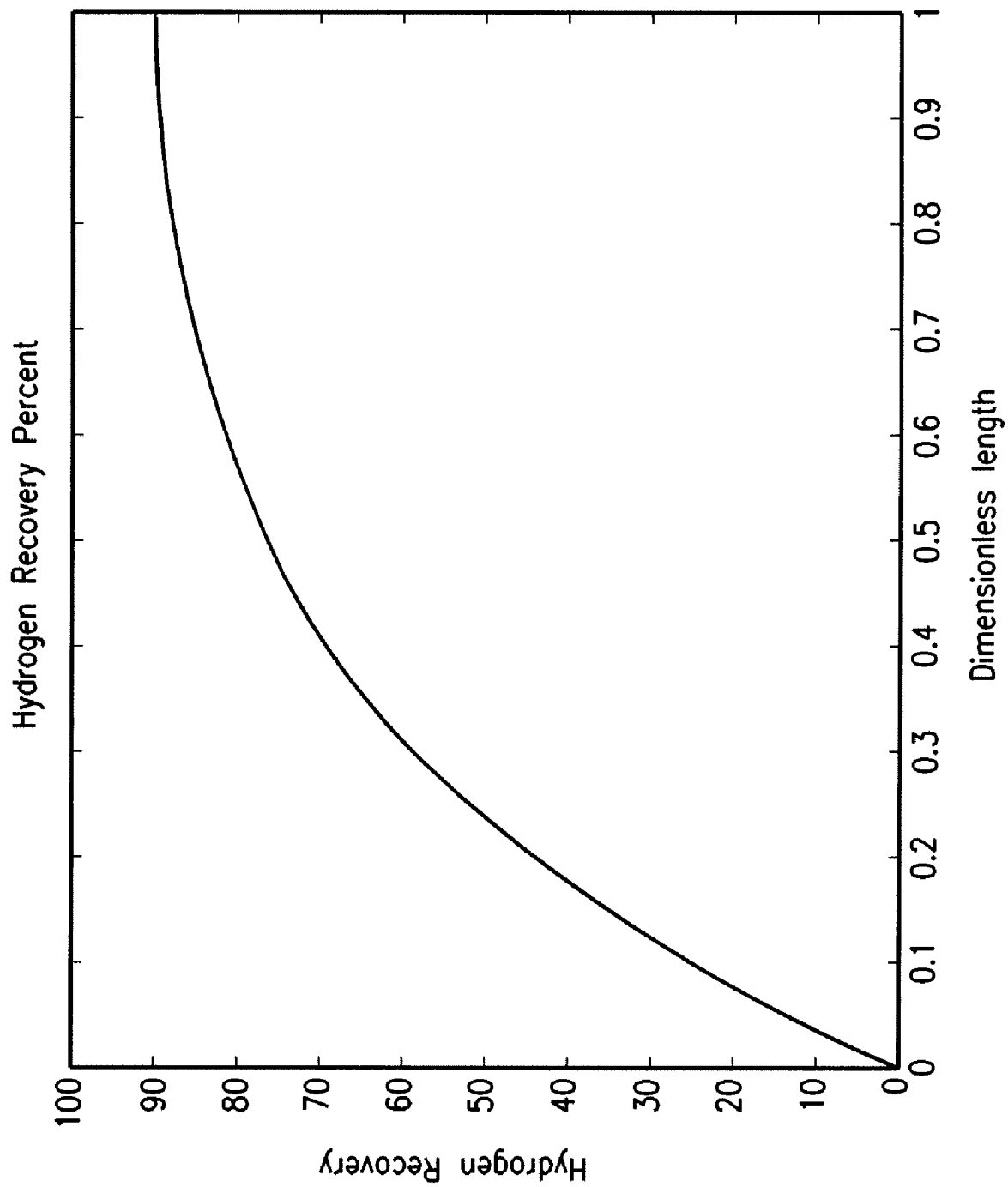
FIG. 8 shows hydrogen recovery (%) in HAMR. (Conditions same as in FIG. 6)
Figure 9:
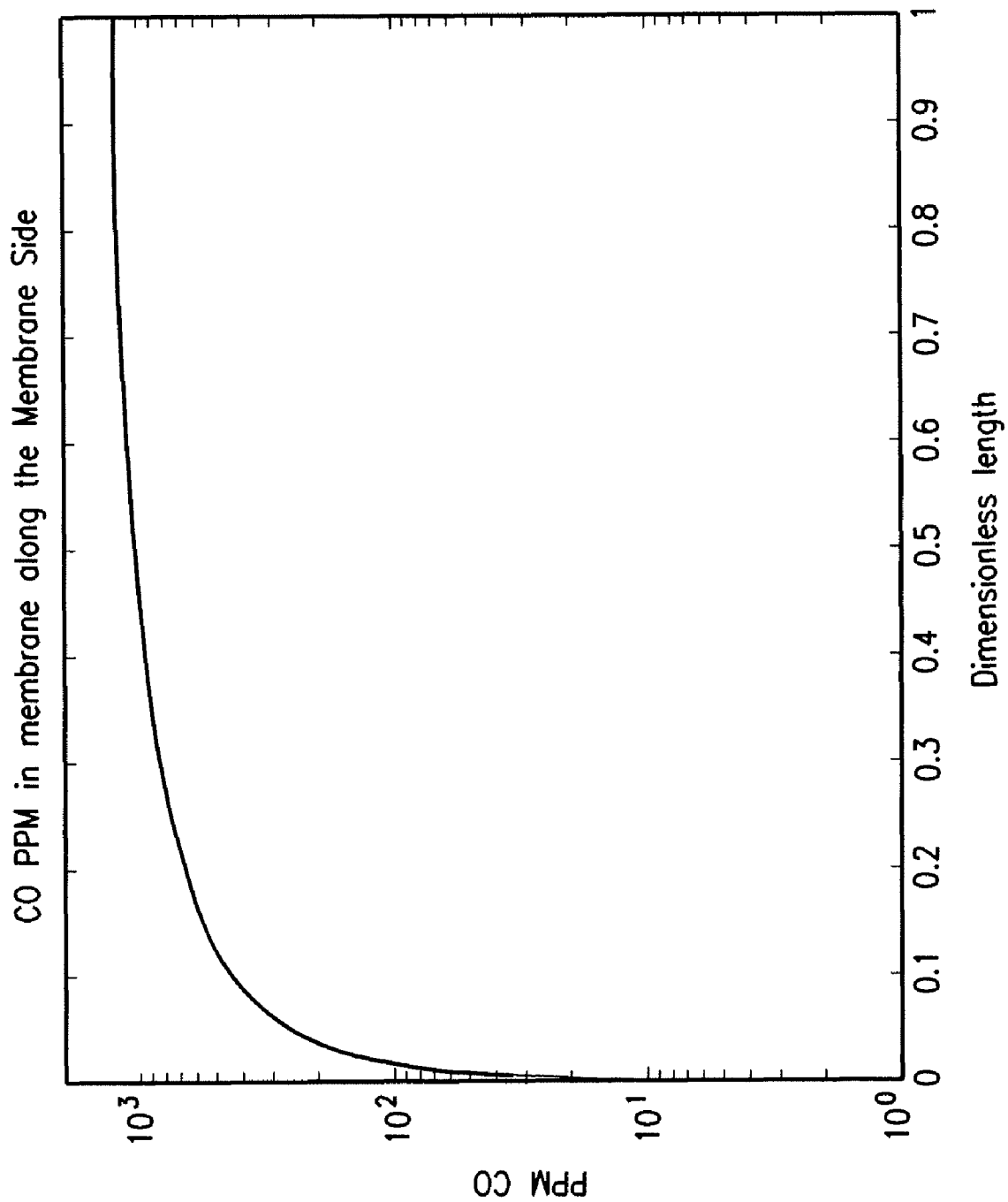
FIG. 9 shows permeate CO concentration (in ppm) in HAMR. (Conditions same as in FIG. 6)
Figure 10:
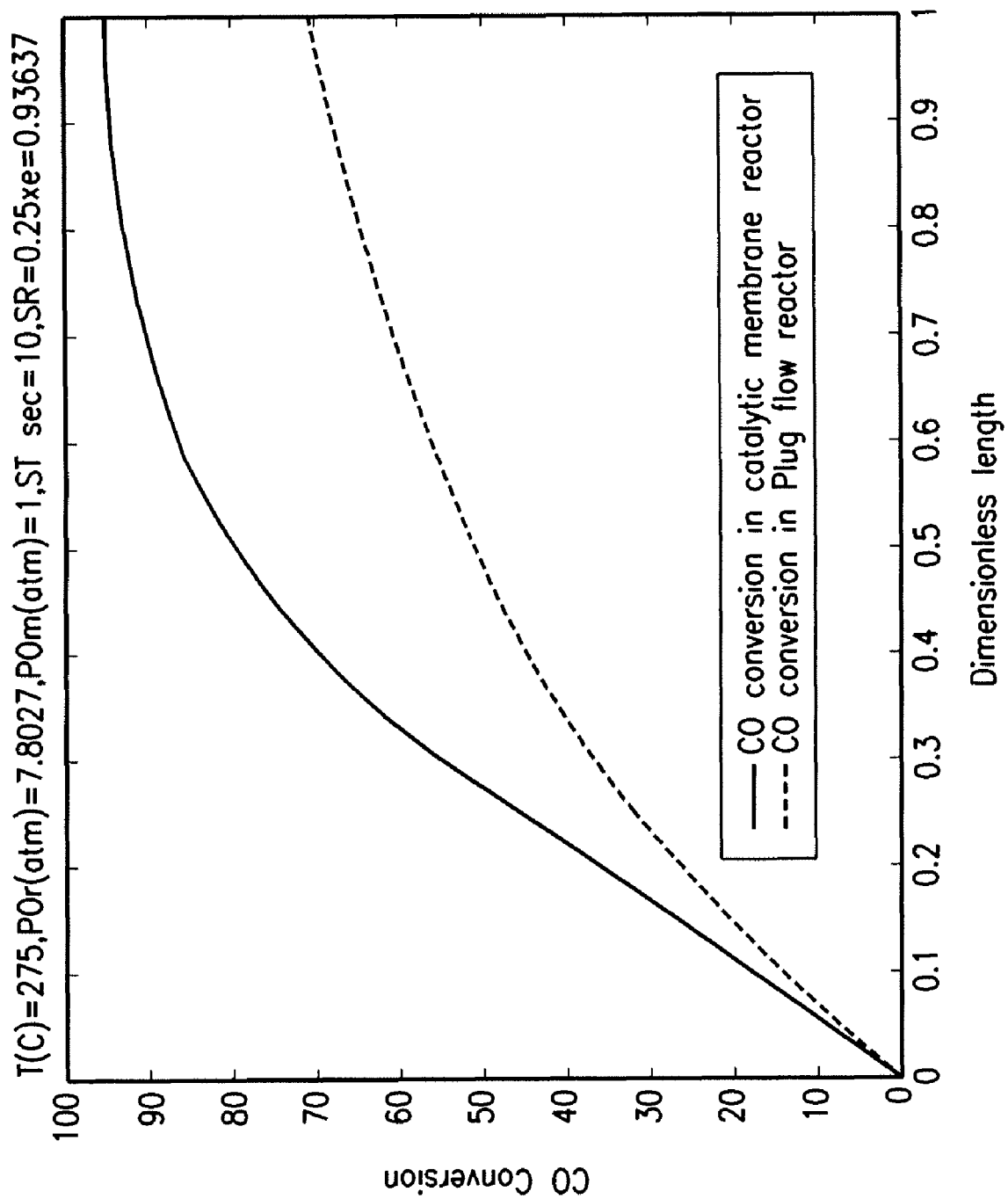
FIG. 10 shows CO conversion vs. reactor length for HAMR vs. packed bed reactors. T=275° C., $P_0r$=7.8027 atm, $P_0m$=1 atm, ST=10 sec, SR=0.25, Xe=0.93637, $H_2$ permeance=10× $10^{-6}$ mole/($cm^2$·sec·atm), $H_2$/CO=100, $CO_2$/CO=1.
Figure 11:
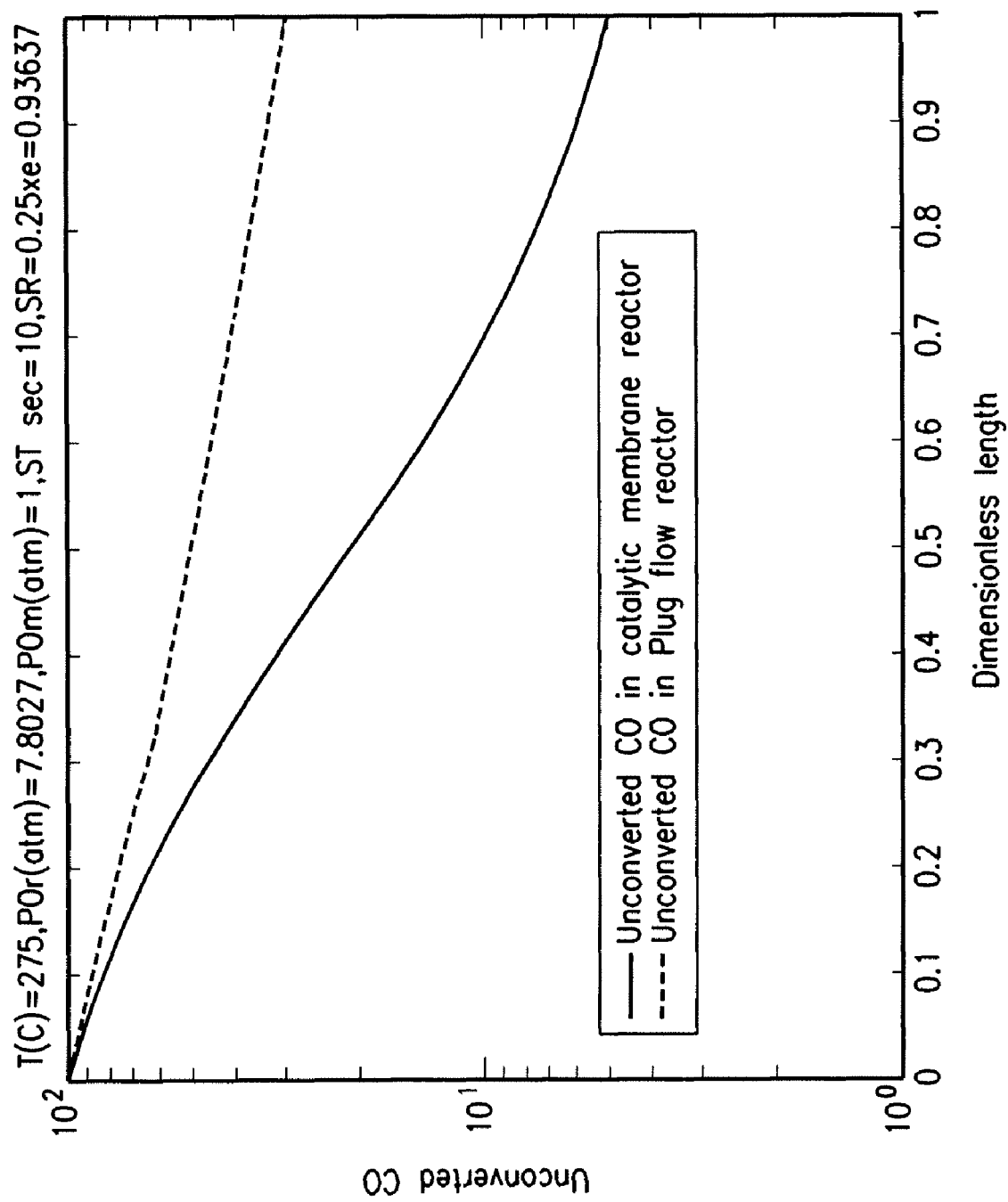
FIG. 11 shows unconverted CO vs. reactor length for HAMR vs. packed bed reactors. (Conditions same as in FIG. 10)
Figure 12:
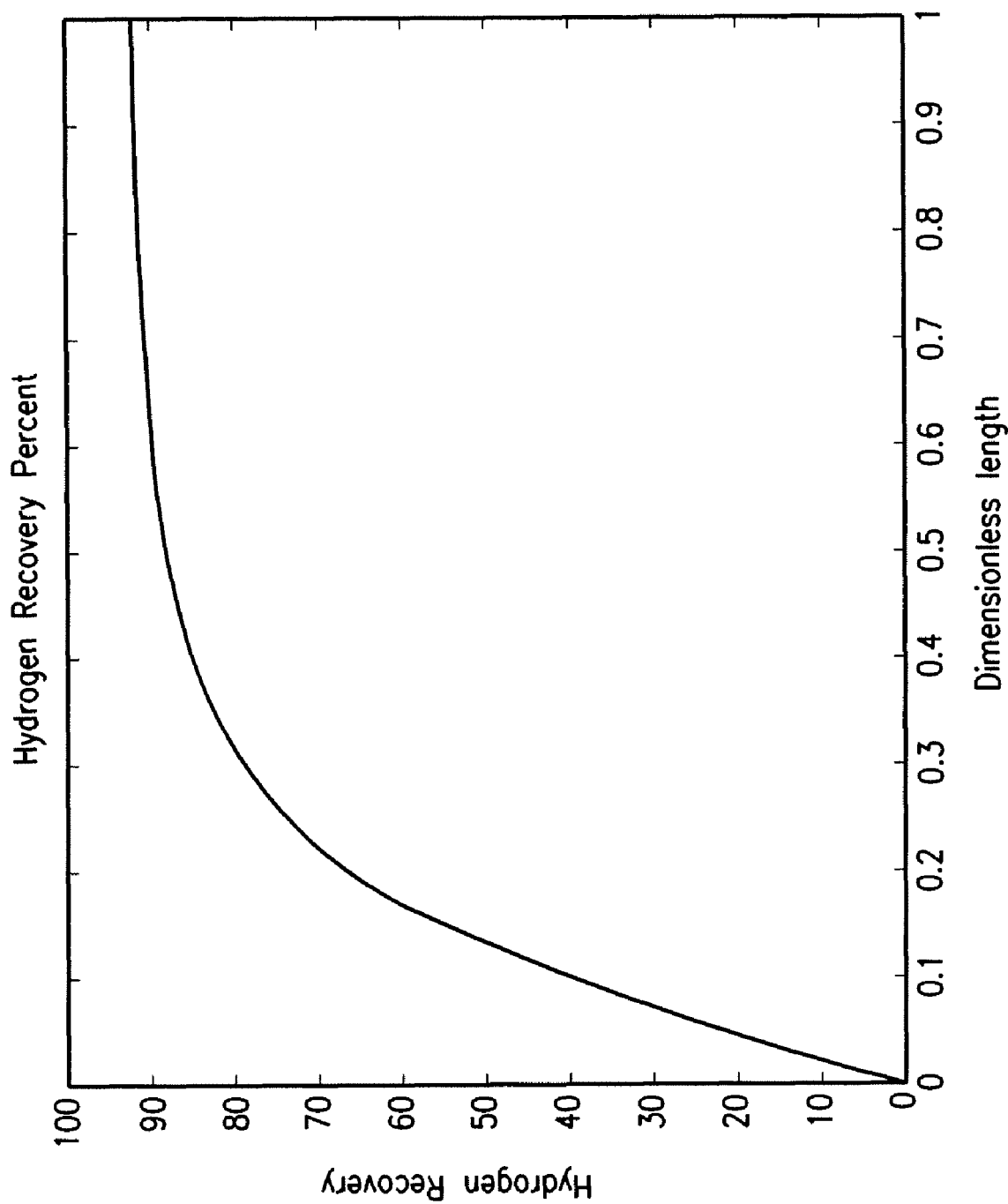
FIG. 12 shows hydrogen recovery (%) in HAMR. (Conditions same as in FIG. 10)
Figure 13:
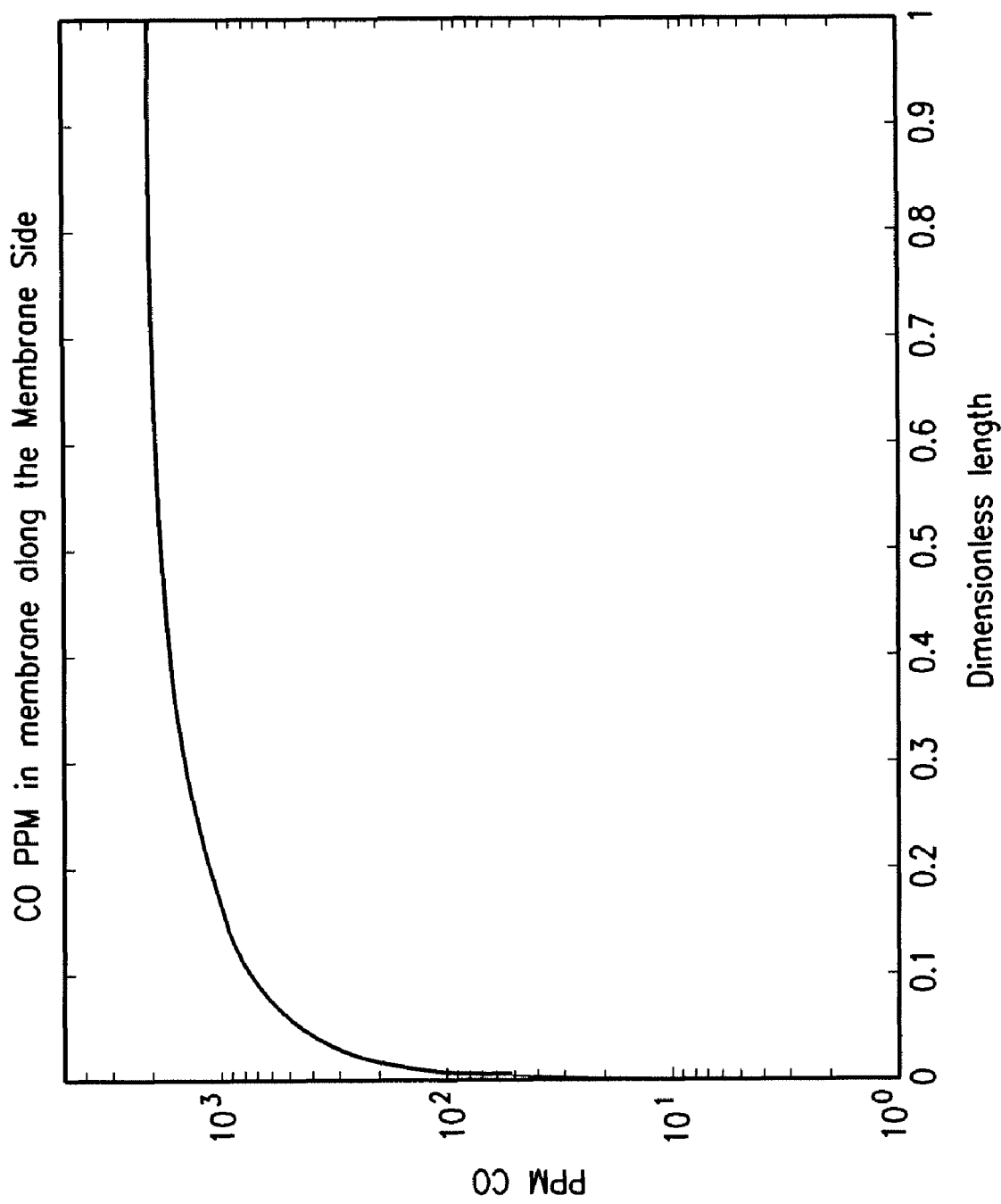
FIG. 13 shows permeate CO concentration (in ppm) in HAMR. (Conditions same as in FIG. 10)
Figure 14:
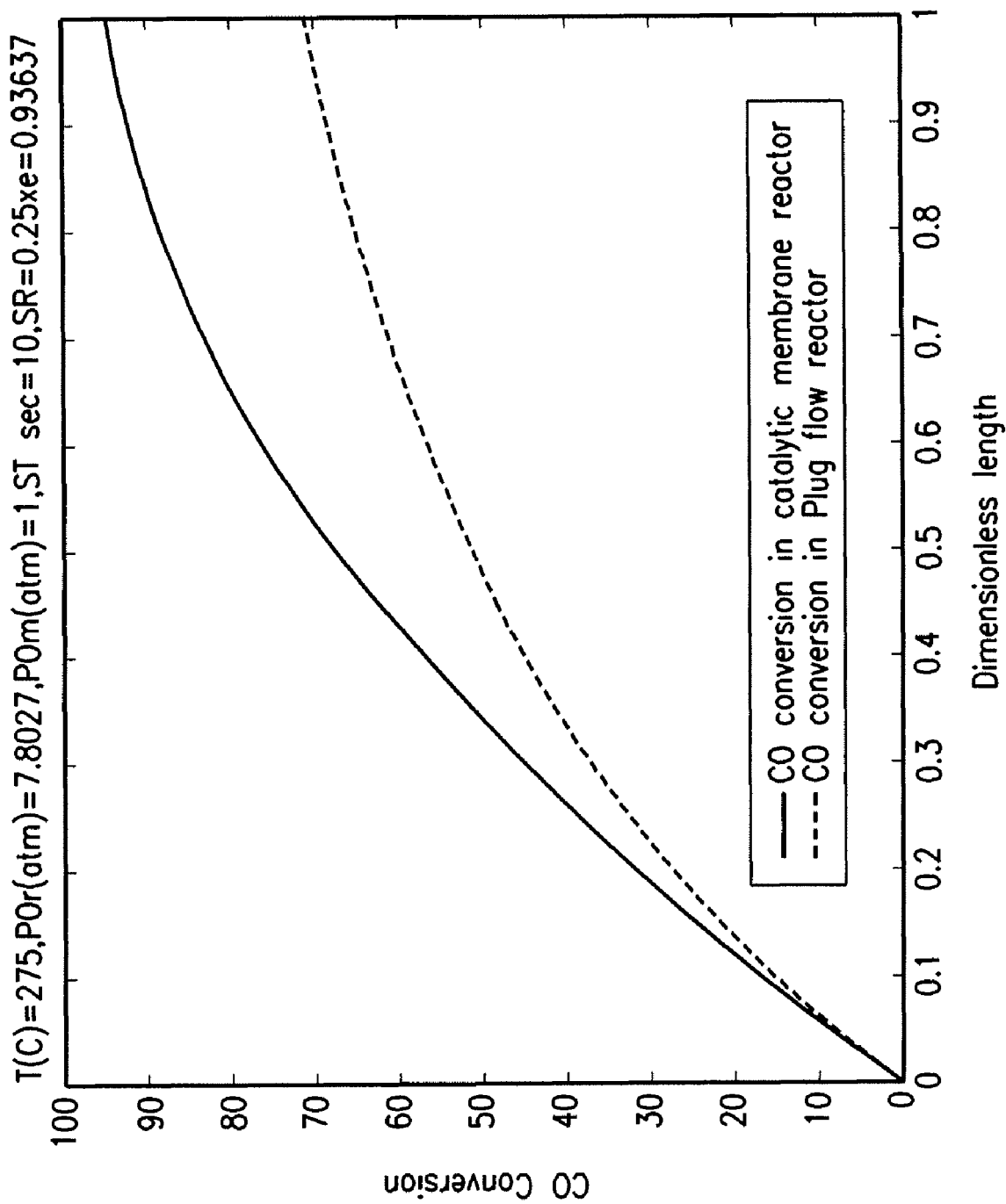
FIG. 14 shows CO conversion vs. reactor length for HAMR vs. packed bed reactors. T=275° C., $P_0r$=7.8027 atm, $P_0m$=1 atm, ST=10 sec, SR=0.25, Xe=0.93637, $H_2$ permeance=5× $10^{-6}$ mole/($cm^2$·sec·atm), $H_2$/CO=1,000, $CO_2$/CO=10.
Figure 15:
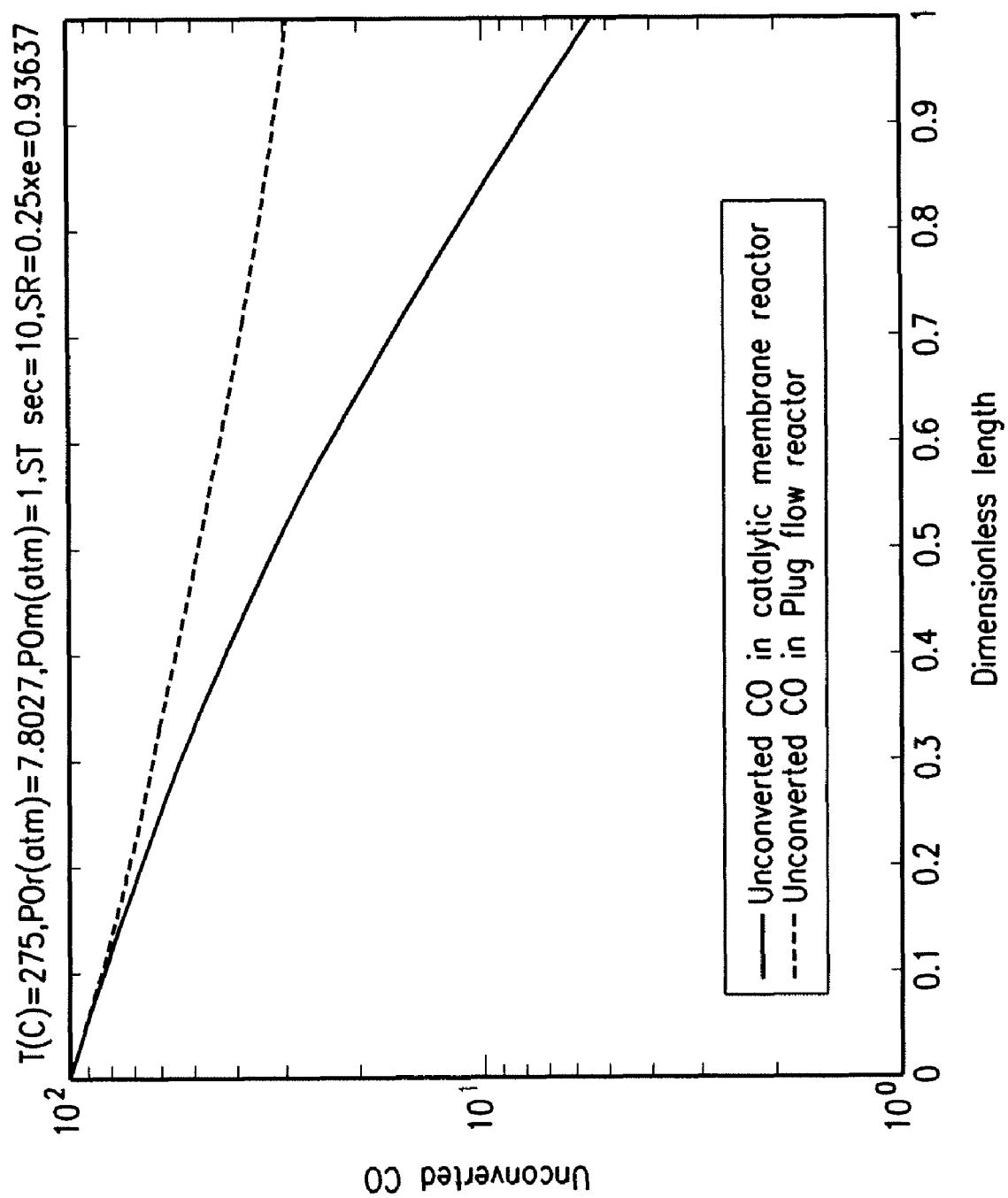
FIG. 15 shows unconverted CO vs. reactor length for HAMR vs. packed bed reactors. (Conditions same as in FIG. 14)
Figure 16:
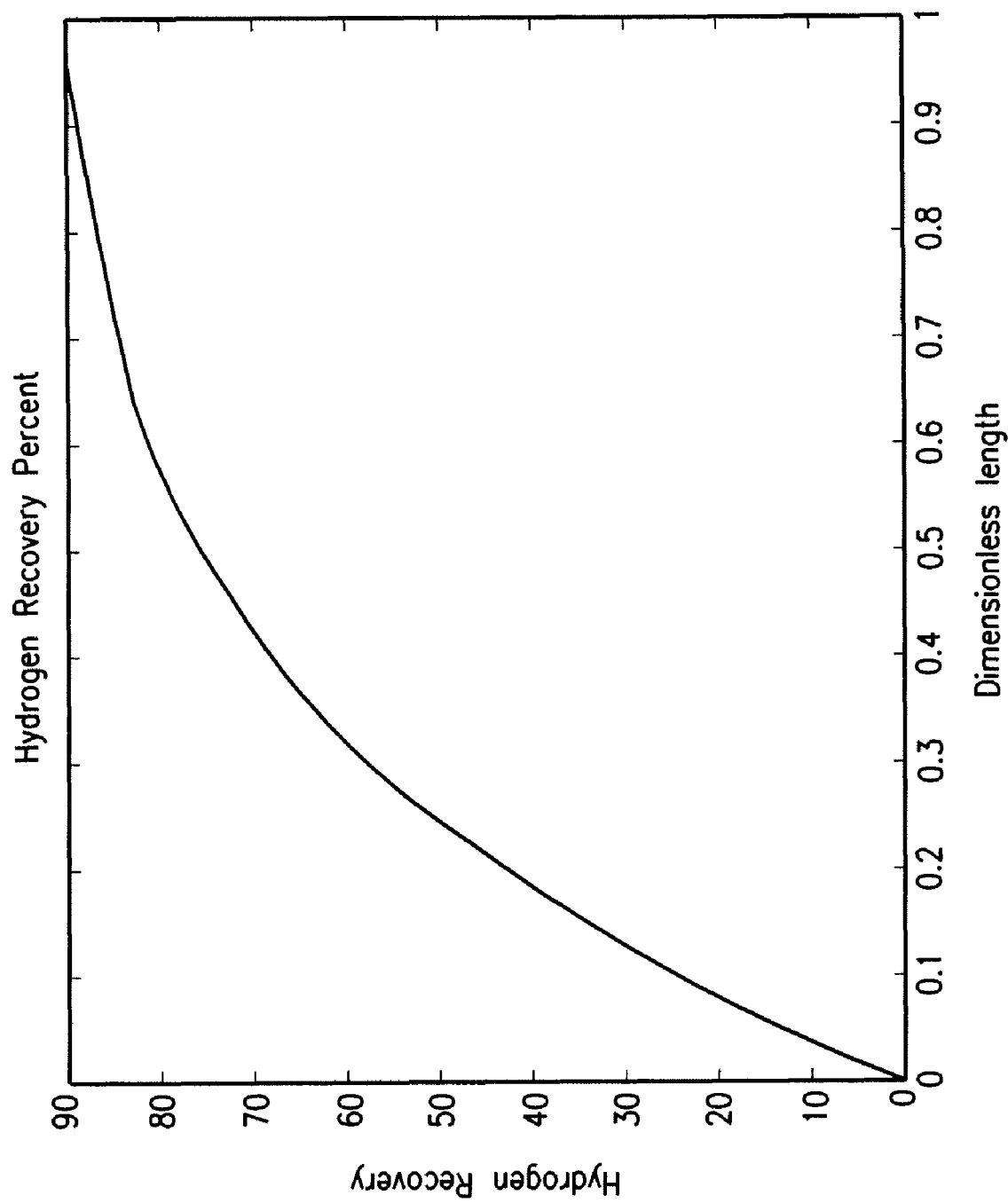
FIG. 16 shows hydrogen recovery (%) in HAMR. (Conditions same as in FIG. 14)
Figure 17:
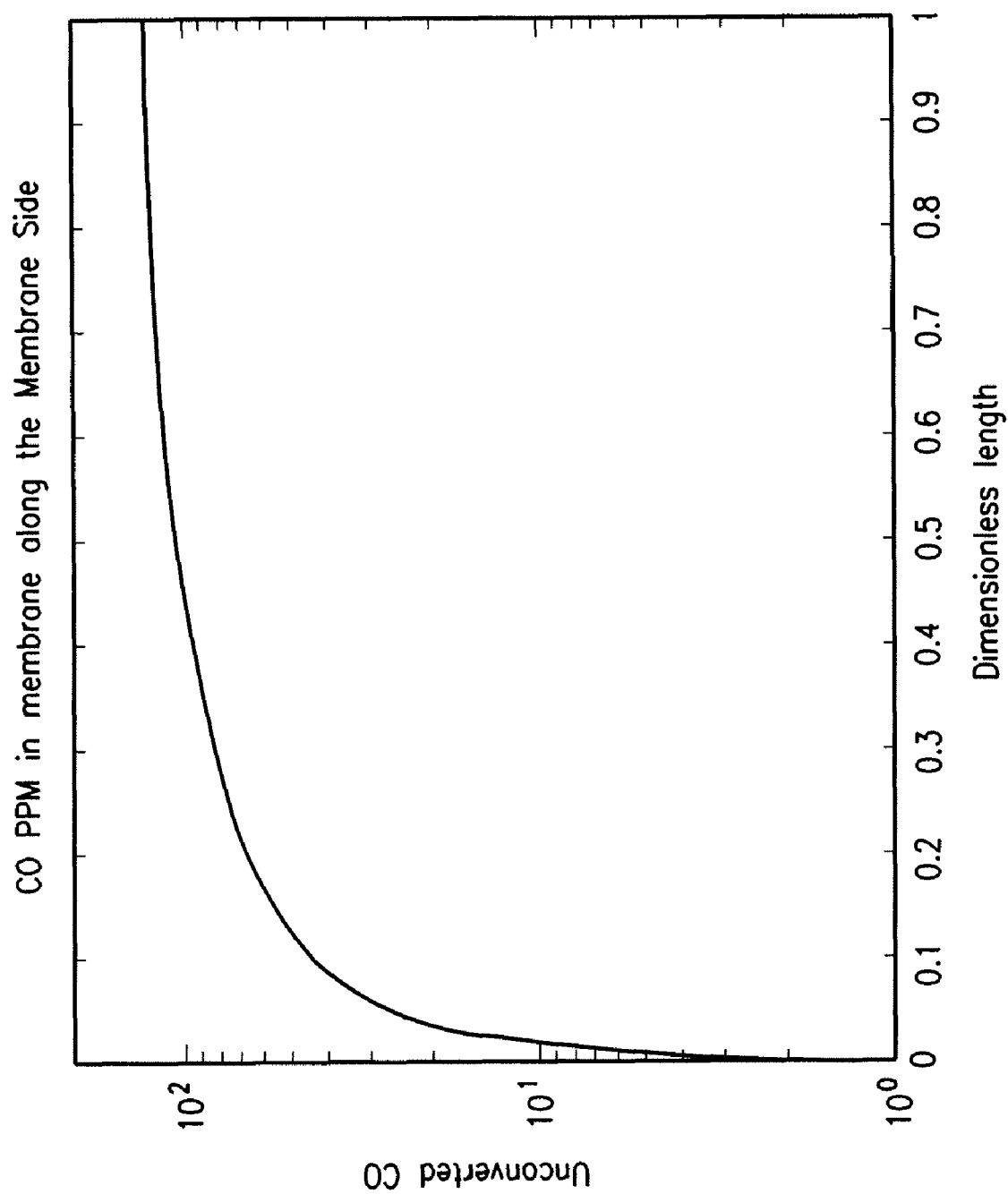
FIG. 17 shows permeate CO concentration (in ppm) in HAMR. (Conditions same as in FIG. 14)
Figure 18:
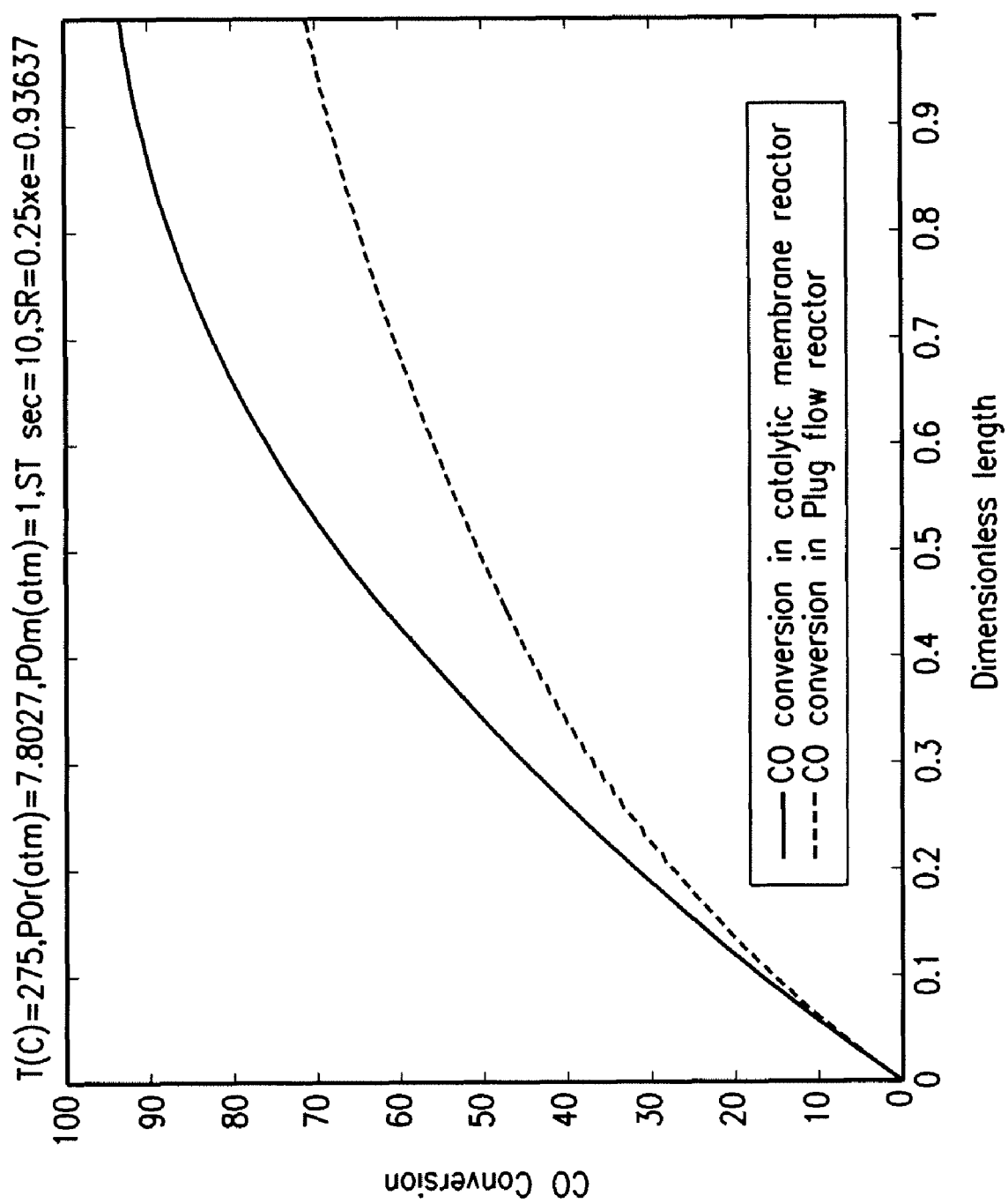
FIG. 18 shows CO conversion vs. reactor length for HAMR vs. packed bed reactors. T=275° C., $P_0r$=7.8027 atm, $P_0m$=1 atm, ST=10 sec, SR=0.25, Xe=0.93637, $H_2$ permeance=5× $10^{-6}$ mole/($cm^2$·sec·atm), $H_2$/CO=100, $CO_2$/CO=2.
Figure 19:
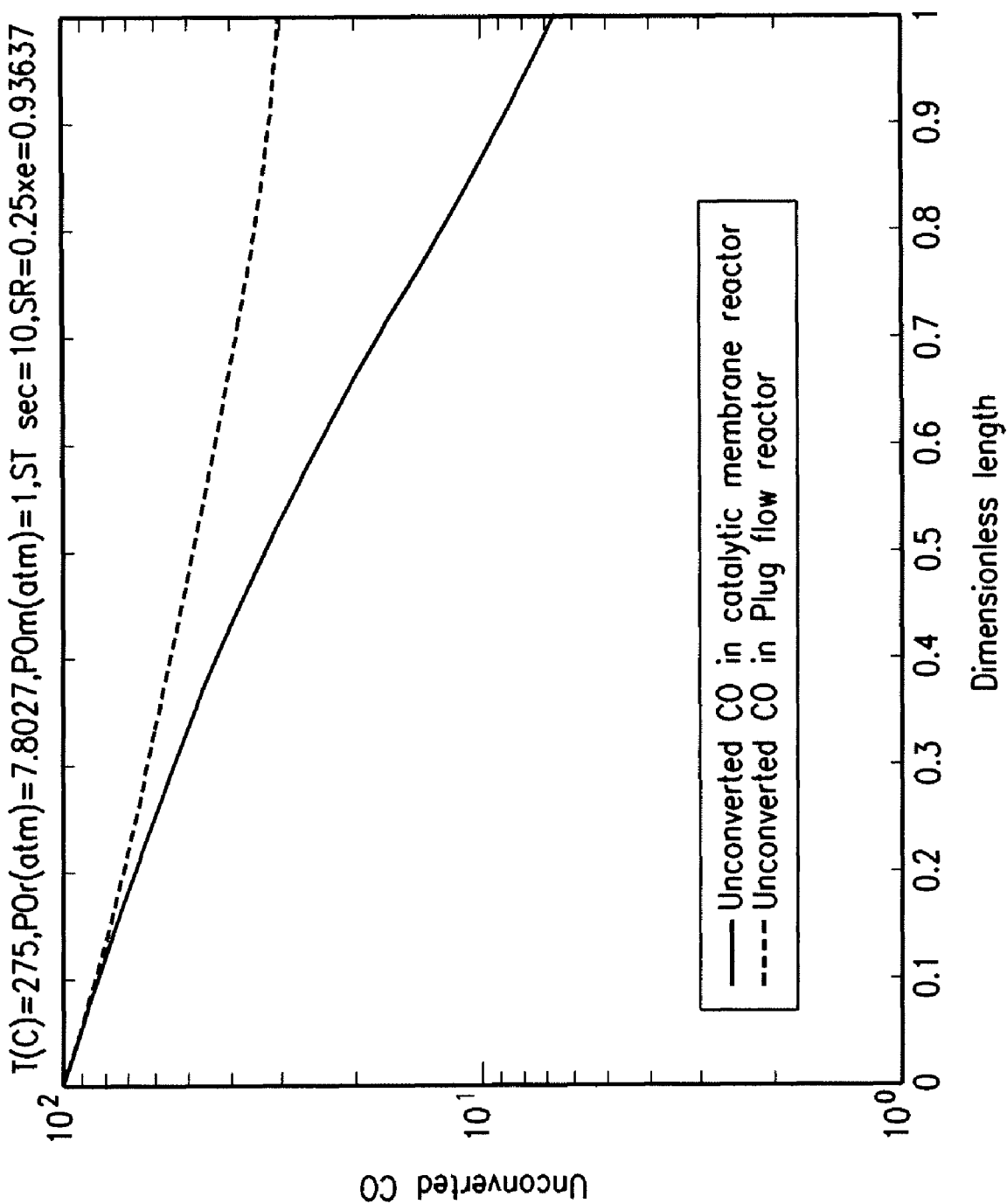
FIG. 19 shows unconverted CO vs. reactor length for HAMR vs. packed bed reactors. (Conditions same as in FIG. 18)
Figure 20:
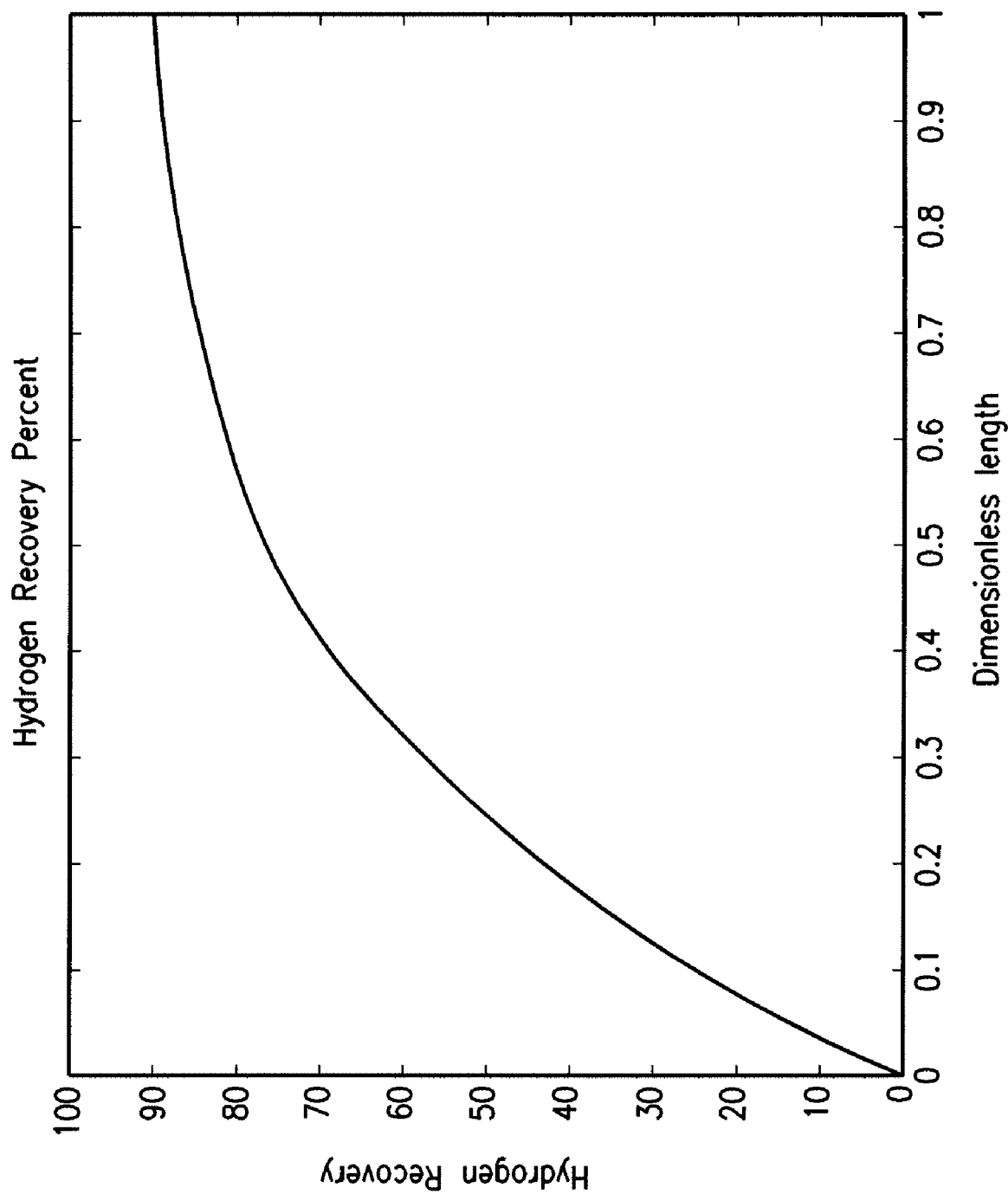
FIG. 20 shows hydrogen recovery (%) in HAMR. (Conditions same as in FIG. 18)
Figure 21:
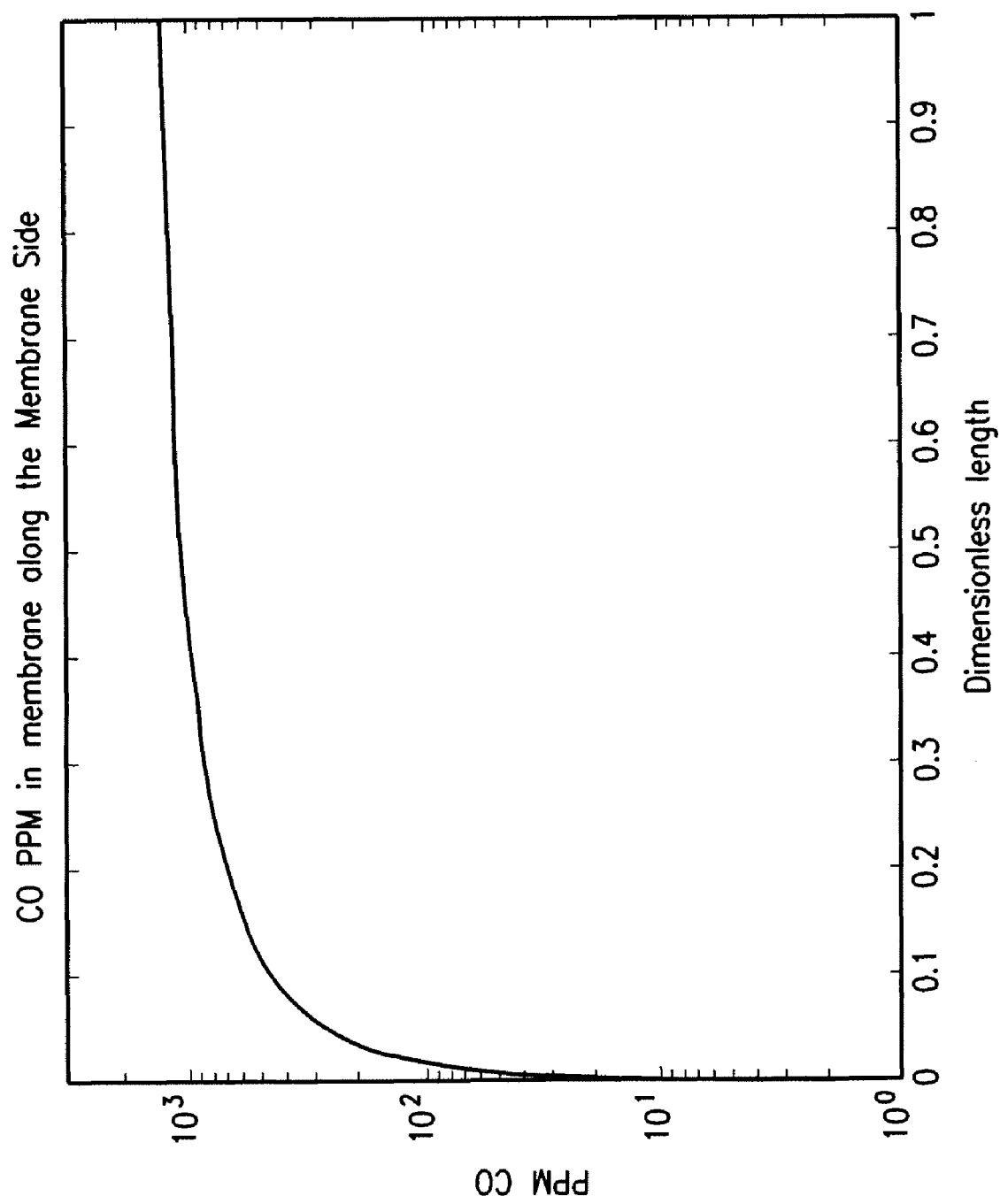
FIG. 21 shows permeate CO concentration (in ppm) in HAMR. (Conditions same as in FIG. 18)
Figure 22:
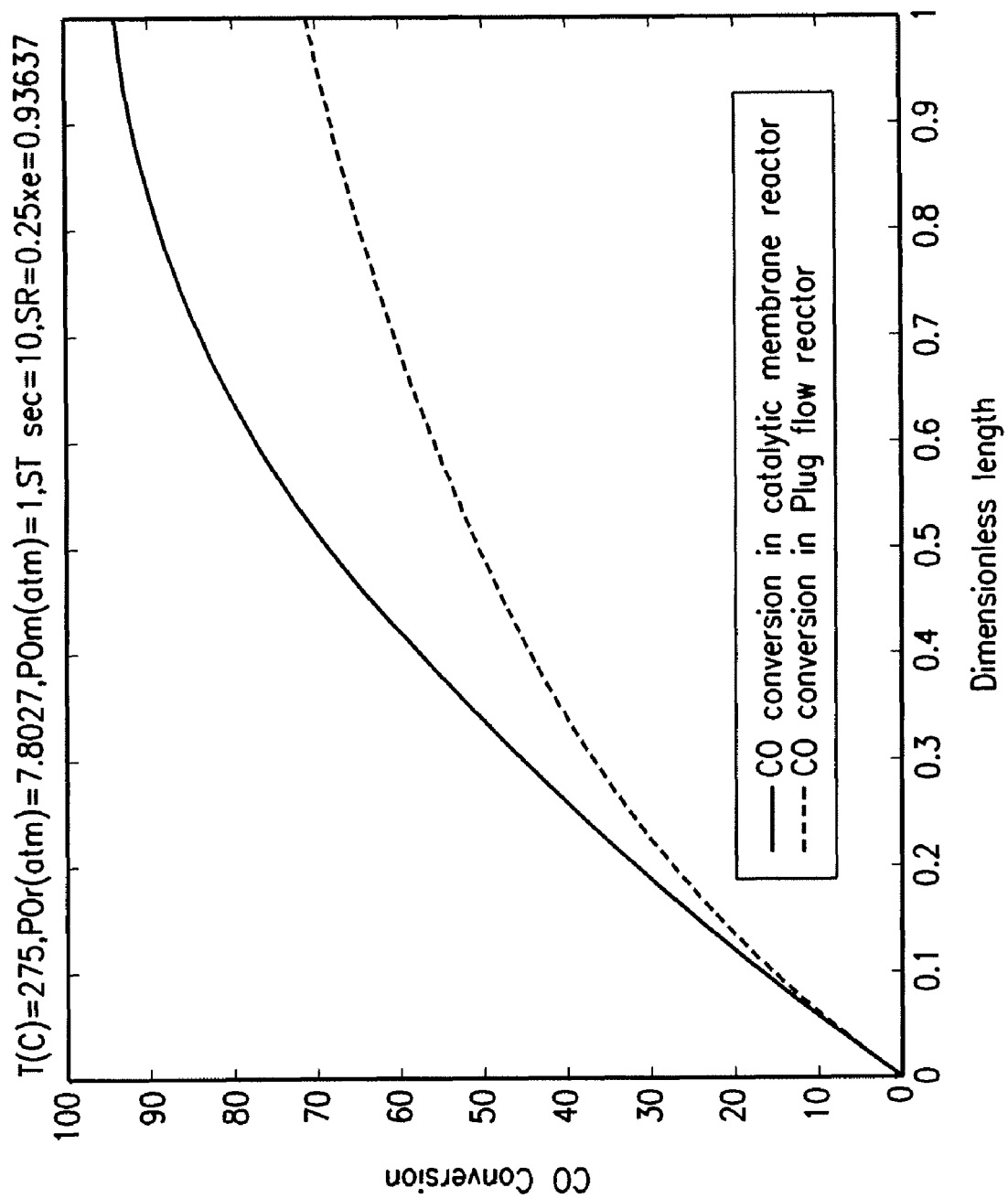
FIG. 22 shows CO conversion vs. reactor length for HAMR vs. packed bed reactors. T=275° C., $P_0r$=7.8027 atm, $P_0m$=1 atm, ST=10 sec, SR=0.25, Xe=0.93637, $H_2$ permeance=5× $10^{-6}$ mole/($cm^2$·sec·atm), $H_2$/CO=100, $CO_2$/CO=10.
Figure 23:
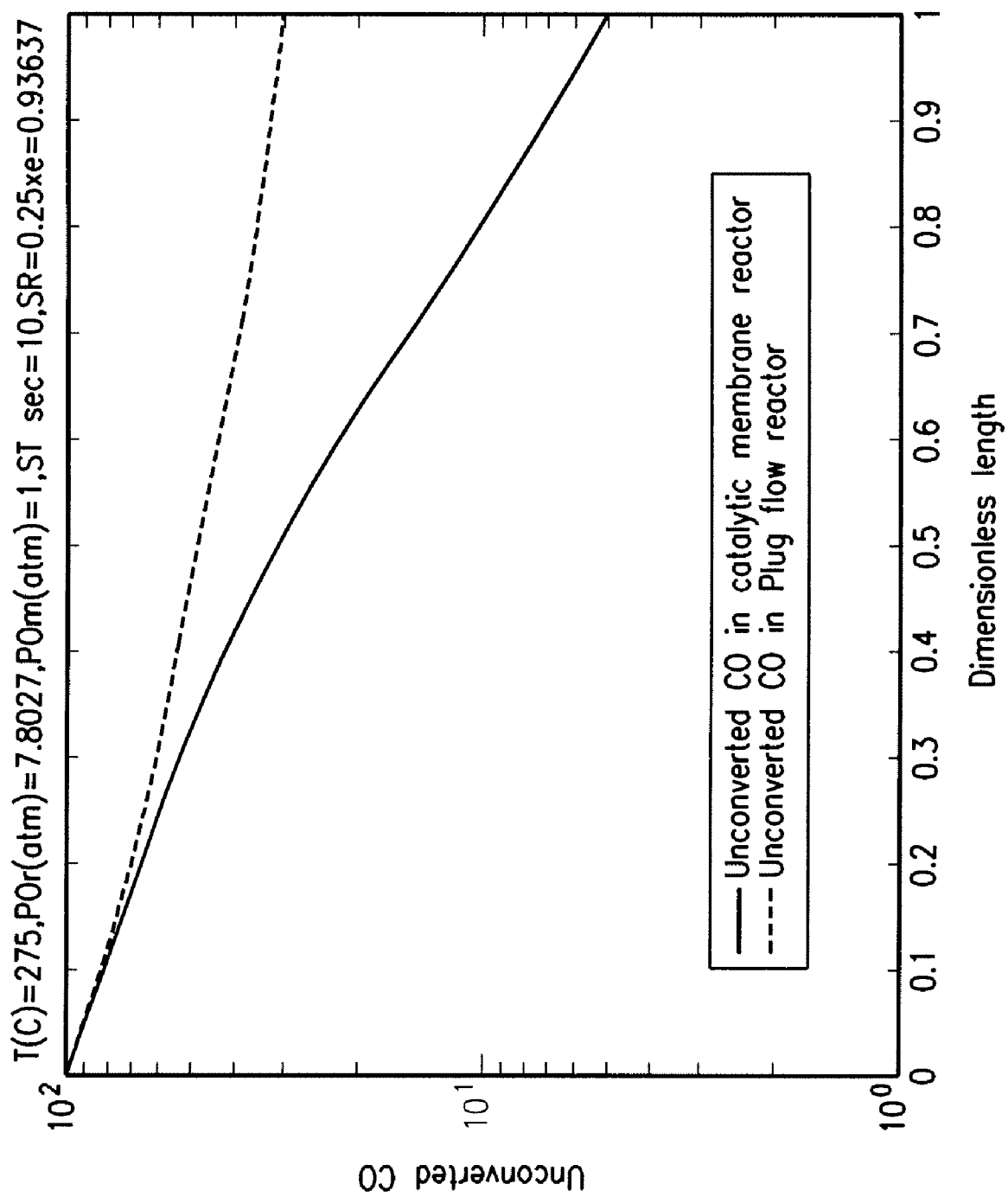
FIG. 23 shows unconverted CO vs. reactor length for HAMR vs. packed bed reactors. (Conditions same as in FIG. 22)
Figure 24:
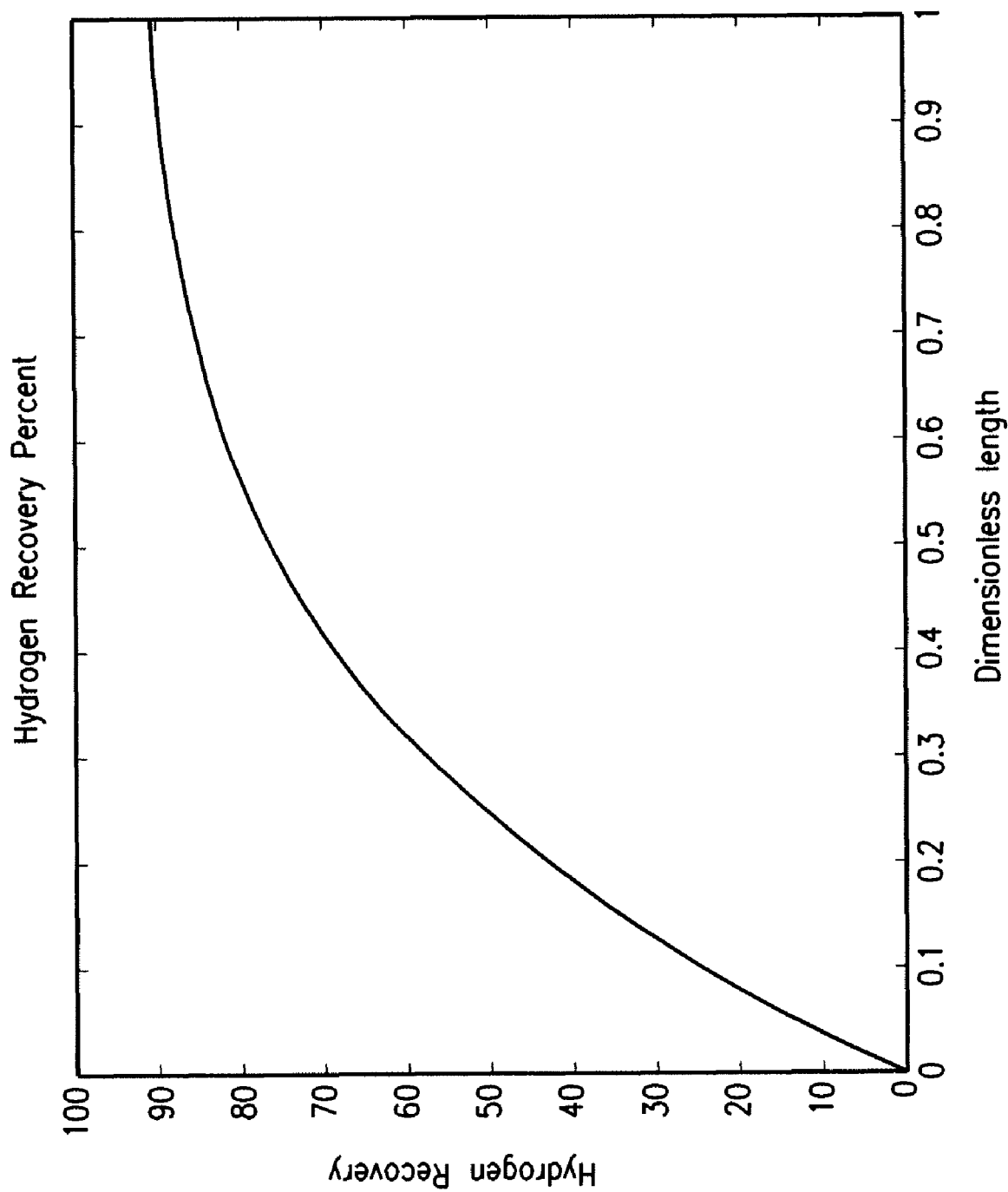
FIG. 24 shows hydrogen recovery (%) in HAMR. (Conditions same as in FIG. 22)
Figure 25:
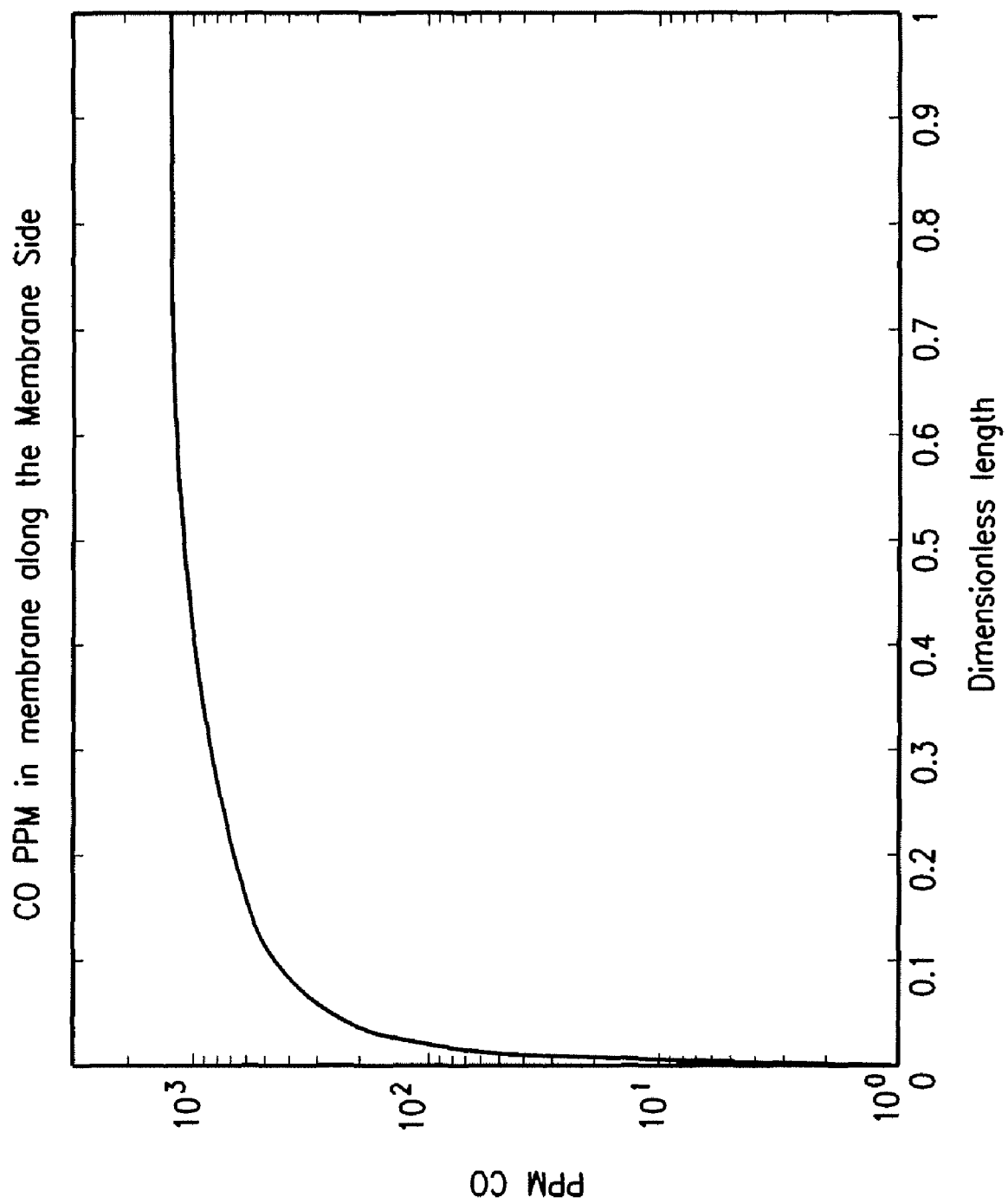
FIG. 25 shows permeate CO concentration (in ppm) in HAMR. (Conditions same as in FIG. 22)
Figure 26:
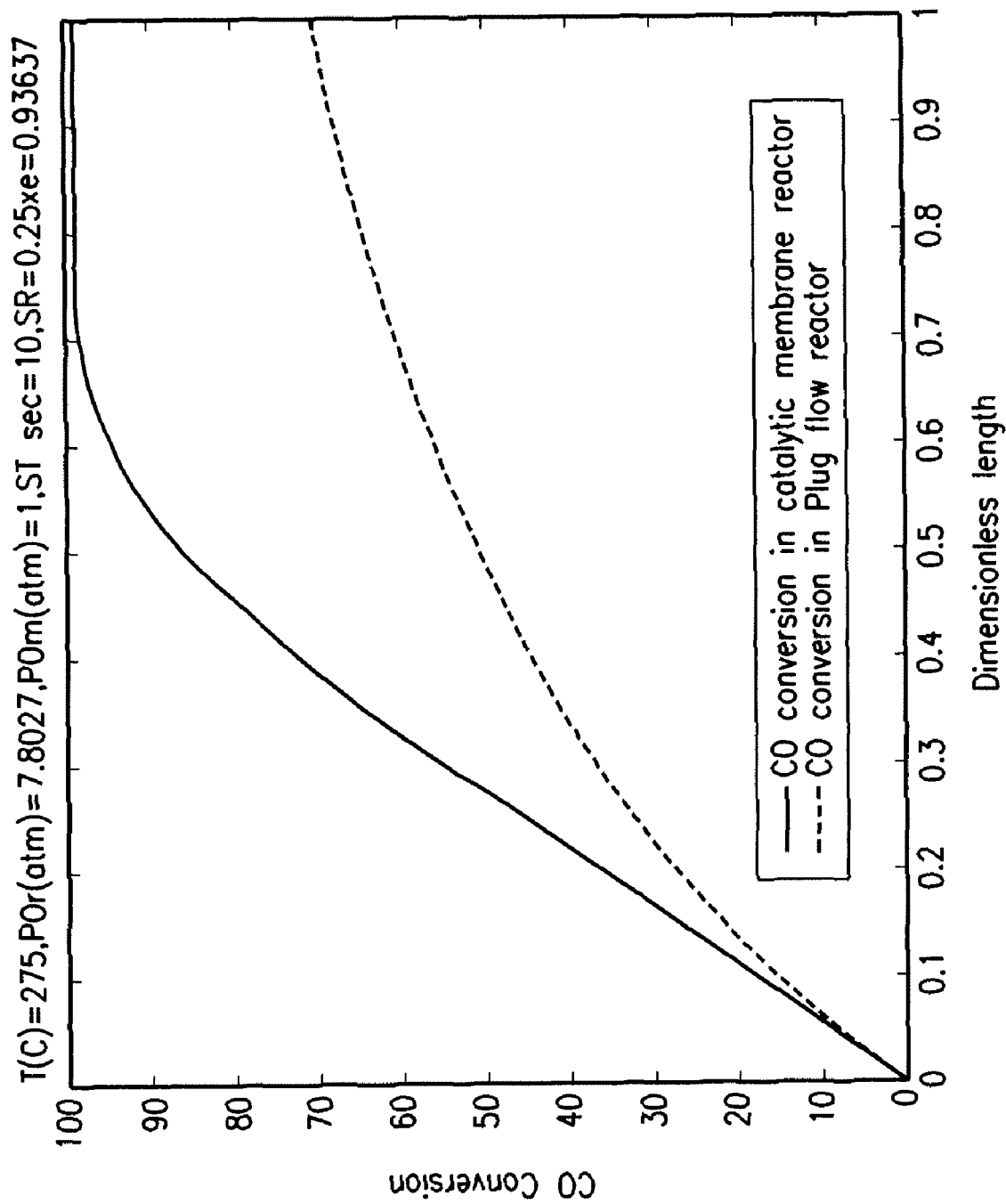
FIG. 26 shows CO conversion vs. reactor length for HAMR vs. packed bed reactors. T=275° C., $P_0r$=7.8027 atm, $P_0m$=1 atm, ST=10 sec, SR=0.25, Xe=0.93637, $H_2$ permeance=5× $10^{-6}$ mole/($cm^2$·sec·atm), $H_2$/CO=100, $CO_2$/CO=100.
Figure 27:
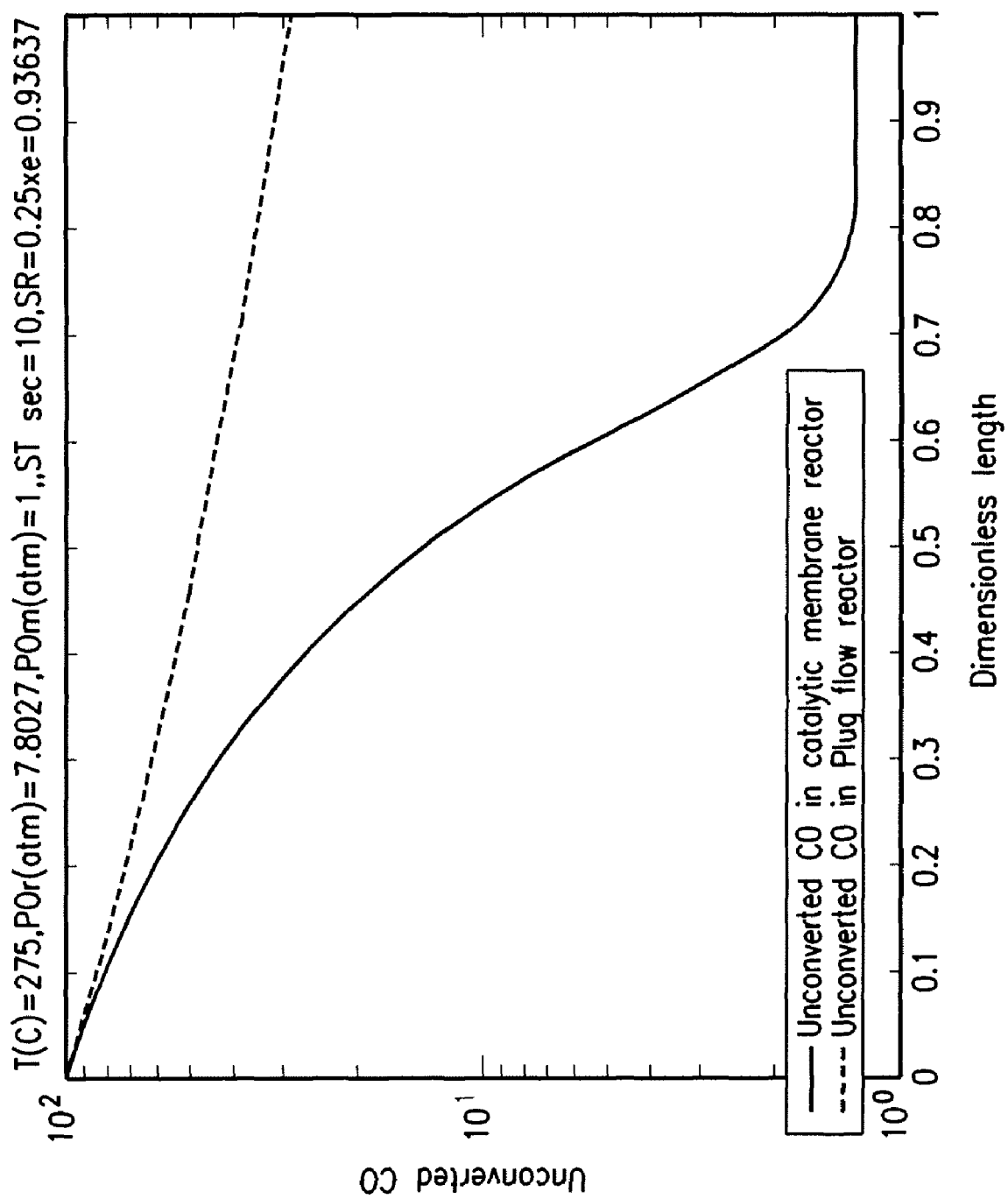
FIG. 27 shows unconverted CO vs. reactor length for HAMR vs. packed bed reactors. (Conditions same as in FIG. 26)
Figure 28:
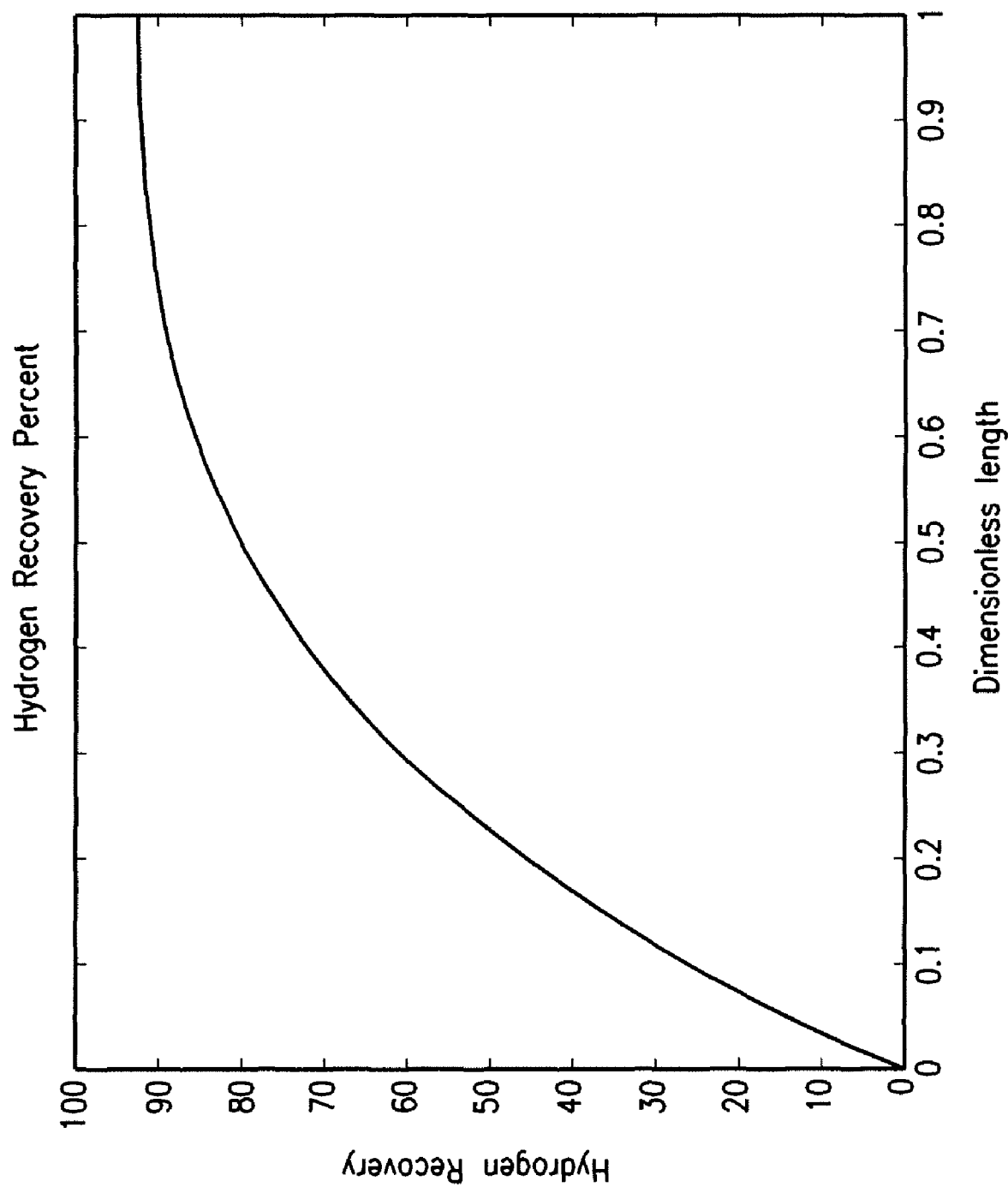
FIG. 28 shows hydrogen recovery (%) in HAMR. (Conditions same as in FIG. 26)
Figure 29:
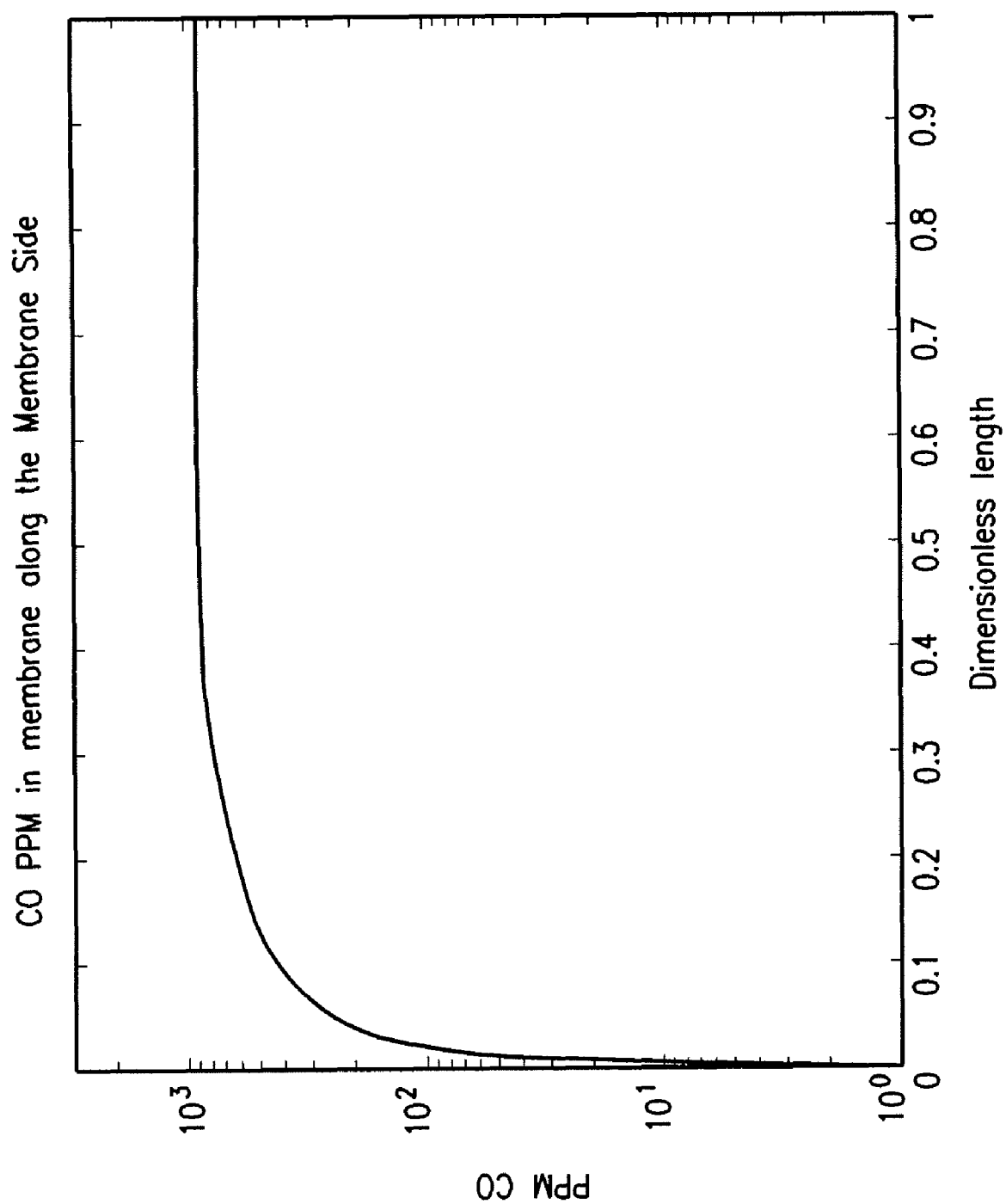
FIG. 29 shows permeate CO concentration (in ppm) in HAMR. (Conditions same as in FIG. 26)

A new HAMR system involving a hybrid packed bed catalytic membrane reactor coupling the methane steam reforming reaction through a porous ceramic membrane with a $CO_2$ adsorption system was investigated. The present HAMR system is of potential interest to pure hydrogen production for PEM fuel cells for various mobile and stationary applications. The reactor characteristics were investigated for a range of temperature and pressure conditions relevant to the aforementioned applications. The HAMR system exhibited enhanced methane conversion, hydrogen yield, and product purity and showed good promise for reducing the hostile operating conditions of conventional methane steam reformers and for meeting the product purity requirements for PEM operation.

In another study, the use of hydrotalcite as an adsorbent was investigated in an adsorption-enhanced WGS membrane ($H_2$ selective) reactor. One of the major thrusts of hydrotalcite is its reversible adsorption of $CO_2$ at intermediate temperature (200 to 300° C.) and in the presence of steam, which are uniquely suitable for the low temperature shift (LTS) of the WGS reaction. Depending upon the permeance and selectivity of the membrane, 5% to 30% conversion enhancement over the conventional WGS packed bed reactor was obtained. The membrane selectivity of $CO_2/CO$ also played an important role. For a highly hydrogen selective membrane (i.e., with minimum or no permeation of $CO_2$), 5% conversion enhancement was obtained. However, when $CO_2/CO$ selectivity increased to 100, the enhancement was increased to 30%.

Accordingly, the invention provides various hybrid adsorptive membrane reactors and related apparatus. The basic components of a reactor include: (a) a chamber, (b) an inlet for introducing one or more reactants into the chamber, (c) a catalyst disposed in the chamber for facilitating a reaction of the reactants to produce at least one desired product and at least one by-product, (d) a membrane disposed in the chamber for selectively permitting the desired product and the by-product to pass through the membrane, (e) an adsorbent disposed in the chamber for adsorbing the by-product, and (f) an outlet for allowing the desired product to exit the chamber.

Conventional membrane reactors are well-known in the art. See, e.g., "Hydrogen Production from Methane Steam Reforming Assisted by Use of Membrane Reactor," Natural Gas Conversion, pp 509-515, Elsevier Science Publishers B. V., Amsterdam (1991). In contrast to the conventional membrane reactors, a reactor of the invention couples the chemical reaction and membrane separation with product adsorption. This reactor can be used for equilibrium- or selectivity-limited reactions such as esterification, WGS, steam reforming, and various dehydrogenation, dehydration, and condensation reactions. The reactants can be either liquids or gases, e.g., steam and methane, natural gas, or naphtha.

For example, the most common industrial process for the production of hydrogen involves steam reforming and WGS reactions. Steam reforming is the reaction between methane or naphtha (e.g., heptane) and steam to produce $H_2$ (desired product) and CO (by-product). WGS is the reaction between CO and steam to produce $H_2$ (desired product) and $CO_2$ (by-product).

Any of the commonly used catalysts can be employed in a reactor of the invention. Examples of catalysts for steam reforming and WGS reactions include nickel-alumina, nickel-magnesium alumina, and the noble metal catalysts.

A membrane of the invention preferably has high permeation rates and permselectivities towards reaction products. Examples of membranes for steam reforming and WGS reactions include CMS, silicon carbide, Pd and its alloys, aluminum nitride, and various dense, and other nanoporus membranes. In some embodiments, the product (desired product or by-product) permeance of such an membrane may be in the range of 1.153e-7 to 1.153e-5 mole/($cm^2$·sec·atm), the permselectivity of desired product/reactant may be in the range of 10-200, and the permselectivity of desired product/by-product may be in the range of 10-200.

In some embodiments, the membrane may be attached to a supporting substrate as a top layer. The supporting substrate (e.g., a ceramic support) is mechanically strong, is stable under reaction conditions, and shows high permeation rates such that it does not limit the membrane throughput.

An adsorbent of the invention is used to sorb a by-product either by physical or chemical sorption and release the sorbed by-product under reduced partial pressure of the by-product. The adsorbent should be effectively non-catalytic and otherwise inert as to reactants and products as well as to any purge or pressurizing gases so as to avoid any significant occurrence of side reactions. An exemplary adsorbent for carbon dioxide is a hydrotalcite such as $Al_{0.71}Mg_{0.29}(OH)_2(CO_3)_{0.15}$. Other adsorbents include various activated aluminas and carbons, zeolites, CaO, various commercial dolomites, drierite, and other inorganic desiccant compounds.

In some embodiments, the catalyst is disposed in the feed side of the membrane, while the adsorbent is disposed in the permeate side of the membrane. The feed side of the membrane is where the reactants are fed and the permeate side of the membrane is the other side. In this case, a membrane highly selective for the product is preferred. For example, the permselectivity of product/reactant may be larger than 50.

In other embodiments, a mixture of the adsorbent and the catalyst is disposed in the feed side of the membrane.

In still other embodiments, while a mixture of the adsorbent and the catalyst is disposed in the feed side of the membrane, an additional amount of the adsorbent is disposed in the permeate side of the membrane.

In yet other embodiments, the adsorbent is disposed in a separate compartment away from the catalyst and the membrane. See, for example, Case IIA in Example I below.

In some embodiments, the catalyst and adsorbent are preferably in granular form or pelletized so that they can be readily mixed and not tend to stratify during the operation. Such granules can be suspended in a porous matrix or in a free form. Other methods of securing the catalyst and adsorbent in fixed beds can be employed, provided they do not impede access of the reactants and products to the surfaces of these materials.

A process of the invention generally includes the steps of (a) introducing one or more reactants into a reactor of the invention, (b) contacting the catalyst with the reactants to facilitate a reaction of the reactants to produce at least one desired product and at least one by-product, (c) selectively passing the desired product and the by-product through the membrane, (d) adsorbing the by-product with the adsorbent, and (e) withdrawing the desired product from the reactor.

Preferably, a process of the invention is carried out at 75-750° C., e.g., 75-95, 110-175, 150-200, 200-300, 250-325, 350-500, 500-650, or 650-750° C.

In some embodiments, the pressure of the reactants is in the range of 0-2,500 psig, e.g., 0-20, 20-100, 100-250, 250-500, 500-1,000, or 1,000-2,500 psig upon entering into the reactor.

The preferred molar ratio of reactants upon entering into a reactor may vary according to the type of the reaction. For example, for a steam-methane reforming reaction, the molar ratio of $H_2O:CH_4$ upon entering into a reactor is preferably in the range of 2-5. For a steam-naphtha (heptane) reforming reaction, the molar ratio of $H_2O:C_7H_{16}$ upon entering into a reactor is preferably in the range of 7-14. For a WGS reaction, the molar ratio of $H_2O:CO$ upon entering into a reactor is preferably in the range of 1-4.

In some embodiments, an apparatus of the invention contains at least two reactors of the invention. In operation of such an apparatus, each reactor is used as described above, and the reactors are offset in point of time such that, at all times, a desired product is being withdrawn from at least one of the reactors.

As used herein, a range of X-Y includes X, Y, and any number between X and Y.

The following examples are intended to illustrate, but not to limit, the scope of the invention. While such examples are typical of those that might be used, other procedures known to those skilled in the art may alternatively be utilized. Indeed, those of ordinary skill in the art can readily envision and produce further embodiments, based on the teachings herein, without undue experimentation.

Figure 56A:
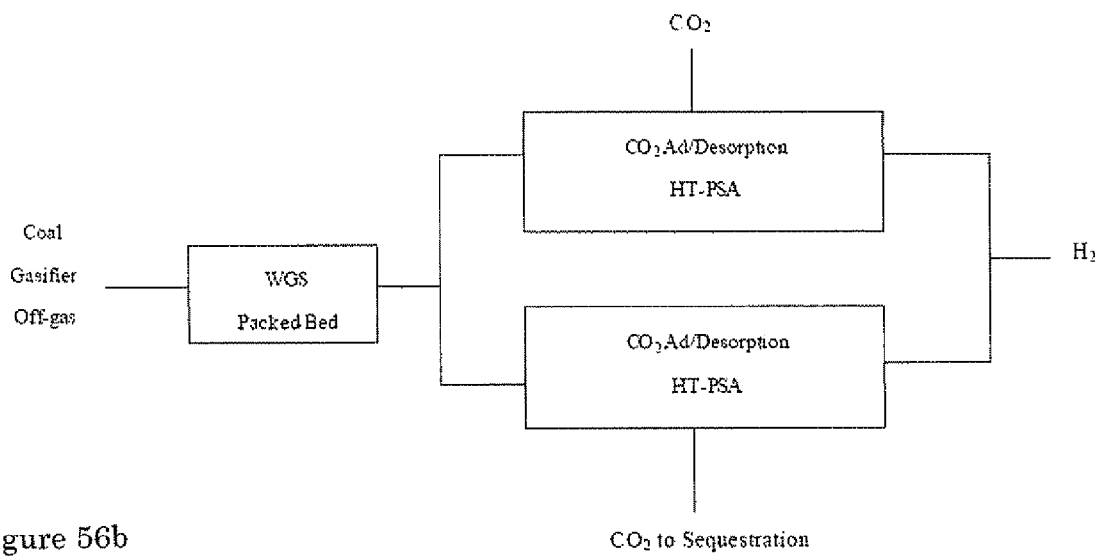
FIG. 56a shows conventional WGS and HT Adsorber.
Figure 56B:
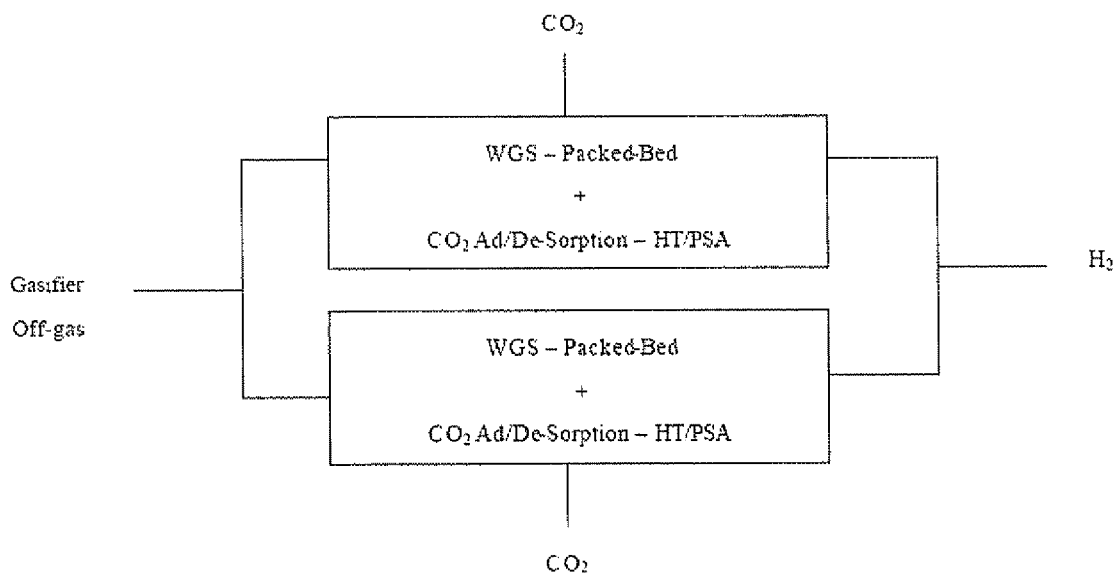
FIG. 56b shows Adsorption Enhanced WGS Reactor.
Figure 57A:
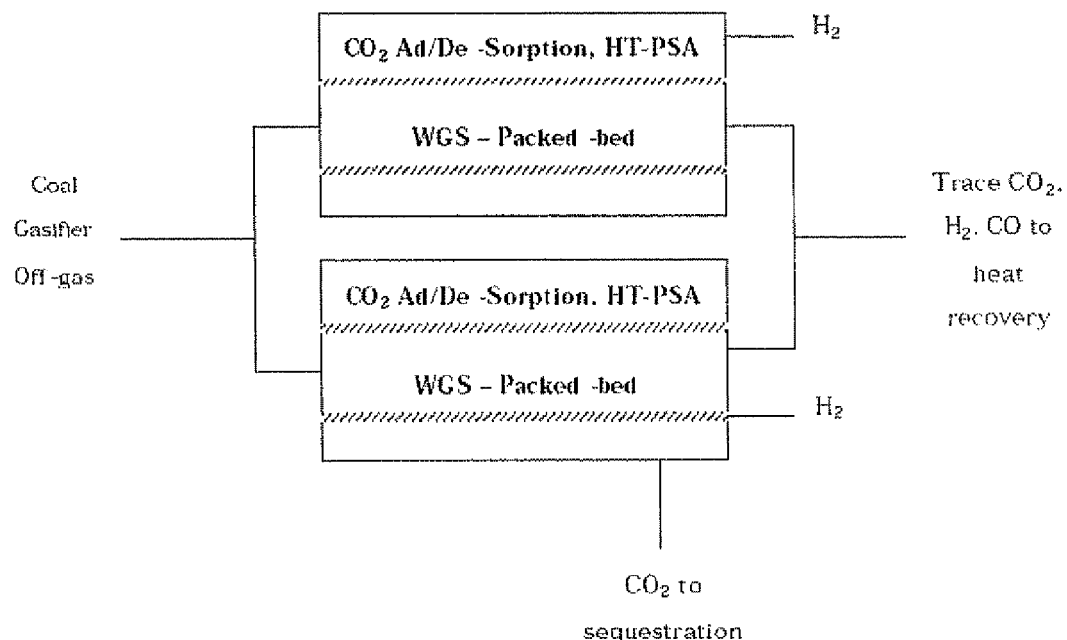
FIG. 57a shows Adsorption Enhanced WGS Membrane Reactor.

Example I $CO_2$ Selective Ceramic Membrane for Water-Gas-Shift Reaction with Concomitant Recovery of $CO_2$ Two process schemes were investigated for the use of hydrotalcites as $CO_2$ adsorbents to enhance WGS reaction: Case I (FIG. 56b) involved the adsorption-enhanced WGS packed bed reactor (AR) and Case II (FIG. 57a) involved the adsorption-enhanced WGS membrane reactor (HAMR). They are presented here along with Base Case (FIG. 56a) (WGS Packed Bed Reactor in conjunction with $CO_2$ removal via pressure swing adsorption (PSA)). Both cases were to improve the WGS reactor efficiency via the concomitant removal of $CO_2$ for sequestration. The AR system has been discussed in the literature (see, e.g., Waldron et al. (2001) AIChE J. 47:1477 and Hufton et al. (1999) AIChE J. 45:248). The HAMR system included a packed bed catalytic membrane reactor (hydrogen selective) coupling the WGS reaction (in a porous hydrogen selective membrane) with $CO_2$ removal with an adsorbent in the permeate side. The reactor characteristics were investigated for a range of permeance and selectivity relevant to the aforementioned application. The HAMR system showed enhanced CO conversion, hydrogen yield, and product purity, and provided good promise for reducing the hostile operating conditions of conventional WGS reactors, and for meeting the $CO_2$ sequestration objective.

Figure 57B:
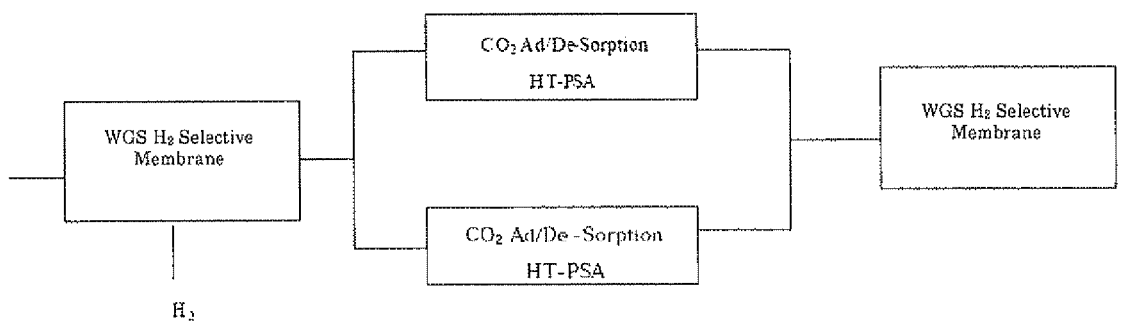
FIG. 57b shows WGS Membrane Reactor with Interstage $CO_2$ Adsorber.

In Base Case, the hydrotalcite adsorber was used as a 2nd stage separator for the removal of $CO_2$ for sequestration. As a conventional adsorber, it did not involve in the WGS reaction. Case I involved the use of the hydrotalcite adsorbent mixed with the WGS catalyst in a packed bed; thus, the reaction product $CO_2$ could be removed in situ to enhance the WGS reaction. Since the adsorbent was used in the process, multiple beds with switching bed operation were usually required to reach a steady state production of hydrogen. Case II integrated a hydrogen and $CO_2$ selective membrane (used as a WGS membrane reactor) which was packed with hydrotalcite for $CO_2$ removal in the permeate side. Thus, both reaction products, i.e., hydrogen and $CO_2$, could be removed via the membrane. In addition to the removal of $CO_2$, the hydrotalcite adsorption in the permeate side could enhance the $CO_2$ permeance in order to produce a high purity hydrogen product stream efficiently. Again, the use of adsorbent mandated switching bed type operation as in Case I. Case IIA (FIG. 57b) was also proposed as a modifier of Case II. Instead of using a hybrid single stage reactor, Case IIA employed an interstage hydrotalcite adsorbent as a separator. Although the process scheme required an additional stage, the adsorber could be operated independent of the WGS reactor.

The carbon molecular hydrogen selective membrane (available from M&P) demonstrated its efficacy for this purpose. Such membrane can be tailored with a high hydrogen selectivity (i.e., $K(H_2/CO_2) \geq 10$) or a balanced selectivity with $K(H_2/CO_2) < 10$. For Case II, a compromised membrane is recommended, while for Case IIA, a highly hydrogen selective membrane is preferred. Other alternative membranes can be considered here. For instance, a $CO_2$ selective hydrotalcite membrane has the advantage of a high selectivity of the dense membrane made with non-metallic materials. Hydrotalcite, a well-known $CO_2$ affinity adsorbent, was used in the simulation as an example.

The simulation of both Case I and II for comparison with Base Case would offer the preferred performance of the hydrotalcite adsorbent and its operating condition for each case. Further, its operating economic analysis would define the performance requirement of the hydrotalcite adsorbent.

A HAMR system involving a hybrid-type packed bed catalytic membrane reactor coupling the WGS reaction through a porous carbon membrane with a $CO_2$ adsorption system was investigated. This HAMR system showed behavior more advantageous than either the membrane or the conventional reactors in terms of the attained yields and selectivities. In addition, the HAMR system allowed potentially for significantly greater process flexibility than either the membrane or the adsorptive reactor system. The membrane, for example, could be used to separate the catalyst from the adsorbent phases, thus allowing for in situ continuous regeneration of the adsorbent. This would offer a significant advantage over the adsorptive reactors which are, by definition, discontinuous systems and require the presence of multiple beds (one being in operation while the other being regenerated) to simulate continuous operation. The HAMR system showed, furthermore, significant potential advantages with respect to the conventional MR system. Beyond the improved yields and selectivities, the HAMR system had the potential for producing a fuel cell grade hydrogen product without $CO_2$, which is of significance for the hydrogen production from coal gasification.

Theory

A mathematical model for Case II, i.e., HAMR system, is presented and analyzed, for a range of temperature and pressure conditions without any intention to be bound by such theory. The behavior of the HAMR system is compared with Base Case, i.e., conventional packed bed reactor. The feed into the WGS HAMR reactor is the exit stream from a conventional steam reformer.

Kinetics for WGS Reaction

For the WGS reaction, a catalytic reaction rate first proposed by Ovesen et al. (1996) J. Catal. 158:170 is utilized as follows:

$$CO + H_2O \rightleftharpoons CO_2 + 3H_2 \tag{1}$$

$$r = A\exp\left(-\frac{86500}{RT}\right)\frac{P_{CO}P_{H_2O}^{1.4}}{P_{CO_2}^{0.7}P_{H_2}^{0.9}}\frac{1}{P_t^{0.4}}(1-\beta) \tag{2}$$

$$\beta = \frac{1}{Ke}\frac{P_{CO_2}P_{H_2}}{P_{CO}P_{H_2O}} \tag{3}$$

$$Ke = \exp\left(\frac{4577.8}{T} - 4.33\right)$$

The Mathematical Model of the HAMR System

A schematic of the HAMR system is shown in FIG. 1. In this figure, the catalyst is packed in the interior of the membrane (signified by the superscript F, for feed side), while the adsorbent is packed in the exterior membrane volume (signified by the superscript P, for permeate side). There are, of course, a number of other potential reactor configurations. For example, the adsorbent and catalyst can be loaded together in the internal membrane space, while the adsorbent may also be loaded in the external membrane space. Or the catalyst and adsorbent may only be loaded in the internal membrane space. To simplify matters, in the development of the model, it is assumed that external mass transfer resistances are negligible for the transport through the membrane, as well as for the reaction steps, and that internal diffusion limitations for the catalyst, and internal or external transport limitations for the adsorbent are accounted for by overall rate coefficients. Also, plug-flow conditions are assumed to prevail for both the interior and exterior membrane volumes, as well as ideal gas law conditions. The HAMR system is assumed, furthermore, to operate under quasi-steady conditions with reaction/transport processes in the catalyst and transport properties through the membrane relaxing much faster than the slow changes in the adsorbent state due to saturation.

It is assumed further that the reactor utilizes a porous, inactive CMS membrane, and that transport through the membrane is Fickian. Here, mass transfer through the porous membrane is described through the following equation:

$$F_j = U_j(P_j^F - P_j^P) \tag{4}$$

where $F_j$ is tie molar flux (mol/m²·s), $P_j^F$ partial pressure of component j on the membrane feed-side (bar), $P_j^P$ partial pressure of component j on the membrane permeate-side (bar) and Uj the membrane permeance for component j (mol/m²·bar·s). To simplify calculations in this preliminary "proof of concept" phase, it is assumed that Uj depends only on the membrane properties, like the thickness and the pore characteristics of the membrane layer. For CMS membranes, Uj, in addition, depends both on the upstream and downstream pressures. For the reactor calculations here, however, it is taken to be pressure-independent.

The mass balance on the feed side of the reactor packed with WGS catalyst and, potentially, with an adsorbent is described by the following equation for CO, $H_2$, $H_2O$, and an inert species (potentially used as a sweep gas or a blanketing agent—for the WGS reaction, a practical sweep gas would be either steam or hydrogen, however):

$$\frac{dn_j^F}{dV} = -\alpha_m U_j(P_j^F - P_j^P) + (1-\varepsilon^F)\beta_c\rho_c R_j^F \tag{5}$$

where $n_j^F$ is the molar flow rate for species j (mol/s), V the feed-side reactor volume variable (m³), $\alpha_m$ the membrane area per feed side reactor volume (m²/m³), $e^F$ the feed side bed porosity, $\beta_c$ the fraction of the solid volume occupied by catalysts ($\beta_c$=1, when no adsorbent is present—then, Eqn. 5 is also valid for $CO_2$), $\rho_c$ the catalyst density (Kg/m³), and $R_j^F$ the reaction rate expression, which is either described by Eqn. 1 above (mol/Kg·s), or is equal to zero if j is an inert species.

For $CO_2$, when adsorbent is present, the following equation applies:

$$\frac{dn_{CO_2}^F}{dV} = -\alpha_m U_{CO_2}(P_{CO_2}^F - P_{CO_2}^P) + \\ (1-\varepsilon^F)\beta_c\rho_c R_{CO_2}^F - (1-\varepsilon^F)(1-\beta_c)\rho_a G_{CO_2}^F \tag{6}$$

where $\rho_a$ is the adsorbent density (Kg/m³), and $G_{CO_2}^F$ is the rate of $CO_2$ adsorption (mol/Kg·s). One finds a number of approaches in the literature for describing $G_{CO_2}^F$. Ideally, both external and internal mass transport as well as finite rates of adsorption would be explicitly accounted for. Traditionally, in the modeling of adsorptive reactors, simpler models have been utilized, instead (Ding and Alpay (2000) Chem. Eng. Sci. 55:3929 and Ding and Alpay (2000) Chem. Eng. Sci. 55:346). Two such models have received the most attention. They are: (i) the model based on the assumption of instantaneous local adsorption equilibrium (ILE) between the gas and the adsorbent phases (Ding and Alpay (2000) Chem. Eng. Sci. 55:3929, Ding and Alpay (2000) Chem. Eng. Sci. 55:346, and Park and Tsotsis (2004) System. Chem. Eng. Proc. 43:1171), and the linear driving force models (LDF), according to which (Karger and Ruthven (1992) Diffusion in zeolites and other microporous solids, New York, Wiley), $G_{CO_2}^F$ is described by the following expression:

$$G_{CO_2}^F = k_\alpha(C_{seq} - C_s) \tag{7}$$

where $C_{seq}$ is the adsorption equilibum $CO_2$ concentration on the adsorbent (mol/Kg), $C_s$ is the existing adsorbed $CO_2$ concentration (mol/Kg), and $k_\alpha$ (s⁻¹) is a parameter which "lumps" together the effects of external and intraparticle mass transport and the sorption processes, and which, as a result, is often a strong function of temperature and pressure (Ding and Alpay (2000) Chem. Eng. Sci. 55:3929 and Ding and Alpay (2000) Chem. Eng. Sci. 55:346)—although, typically, in modeling, is taken as temperature/pressure-independent. For calculating $C_{eq}^2$, for $CO_2$ adsorption on a potassium-promoted hydrotalcite (LDH), it has been shown (Ding and Alpay (2000) Chem. Eng. Sci. 55:3929 and Ding and Alpay (2000) Chem. Eng. Sci. 55:346) that this adsorbent follows a Langmuir adsorption isotherm both under dry and wet conditions, described by the following equation:

$$C_{seq} = \frac{m_{CO_2} b_{CO_2} P_{CO_2}}{1 + b_{CO_2} P_{CO_2}} \quad (8)$$

where $m_{CO_2}$ (mol/Kg) is the total adsorbent capacity, and $b_{CO_2}$ (bar$^{-1}$) the adsorption equilibrium constant described in the van't Hoff equation:

$$b_{CO_2} = b_{CO_2}(T_0)\exp(-\Delta H_\alpha / R(1/T - 1/T_0)) \quad (9)$$

where the heat of adsorption $\Delta H_\alpha$ under wet conditions for a region of temperatures from 481-753 K is calculated to be −17 kJ/mol, while $b_{CO_2}$ at 673 K is equal to 23.6 bar (Ding and Alpay (2000) Chem. Eng. Sci. 55:3929 and Ding and Alpay (2000) Chem. Eng. Sci. 55:346).

Eqns. 5 and 6 are complemented by the initial conditions:

$$V=0; \; n_j^F = n_{j0}^F = (F_0^F x_{j0}^F P_0^F)/RT \quad (10)$$

where $F_0^F$ is the volumetric flow rate at the inlet of the reactor feed-side (m$^3$/s), $x_{j0}^F$ the inlet mole fraction for species j, and $P_0^F$ the inlet total pressure on the feed-side (bar).

Assuming that the catalyst particles and adsorbent particles have the same size, pressure drop in a packed bed can be calculated using Ergun equation:

$$-\frac{dP^F}{dV} = 10 \times 10^{-7} \frac{f^F (G^F)^2}{g_c d_P^F \rho_F} \quad (11a)$$

$$f^F = \left(\frac{1-\varepsilon^F}{\varepsilon^F}\right)\left(1.75 + \frac{150(1-\varepsilon^F)\mu^F}{N_{Re}^F}\right) \quad (11b)$$

$$N_{Re}^F < 500(1-\varepsilon^F) \quad (11c)$$

$$N_{Re}^F = \frac{d_P^F G^F}{\mu^F} \quad (11d)$$

where $P^F$ is the pressure in feed side (bar), $\mu^F$ the viscosity in feed side (poise), $d_P^F$ the particle diameter in feed side (cm), $G^F$ the superficial mass velocity in feed side (gr/(cm$^2$·sec), Z the reactor length (cm), and $\rho_F^F$ the fluid density in feed side (gr/cm$^3$)

By dividing both sides of the Ergun equation by the cross-sectional area ($A^F$) of the reactor feed side, the pressure drop per unit volume of the reactor can be expressed as:

$$-\frac{dP^F}{dV} = 10 \times 10^{-7} \frac{f^F (G^F)^2}{A^F g_c d_P^F \rho_F} \quad (12a)$$

at $V = 0, \; P^F = P_0^F$ \quad (12b)

For the permeate side, the equation for CO, $H_2$, $H_2O$, and the inert (if utilized) is as follows:

$$\frac{dn_j^P}{dV} = \alpha_m U_j (P_j^F - P_j^P) \quad (13)$$

For $CO_2$ on the permeate side, when adsorbent is present, $$\frac{dn_{CO_2}^P}{dV} = \alpha_m U_{CO_2}(P_{CO_2}^F - P_{CO_2}^P) - (1 - \varepsilon^P)\gamma \rho_a G_{CO_2}^P \quad (14)$$

where $\epsilon^P$ is the permeate side bed porosity (when $\epsilon^P = 1$ no adsorbent is present and 14 reduces to Eqn. 13) and $\gamma$ the ratio of the cross-sectional area on the permeate side to cross-sectional area on the feed side.

Eqns. 13 and 14 are complemented by the initial conditions:

$$V=0; \; n_j^P = n_{j0}^P = (F_0^P x_{j0}^P P_0^P)/RT \quad (15)$$

where $F_0^P$ is the volumetric flow rate at the inlet of the reactor permeate-side (m$^3$/s), $x_{j0}^P$ the inlet mole faction for species j on the permeate side, and $P_0^P$ the inlet total pressure on the permeate side (bar).

Pressure drop in the permeate side again can be calculated by Ergun equation:

$$-\frac{dP^P}{dV} = 10 \times 10^{-7} \frac{f^P (G^P)^2}{A^P g_c d_P^P \rho_F^P} \quad (16a)$$

at $V=0, \; P^P = P_0^P$
in which $$f^P = \left(\frac{1-\varepsilon^P}{\varepsilon^P}\right)\left(1.75 + \frac{150(1-\varepsilon^P)\mu^P}{N_{Re}^P}\right) \quad (16c)$$

$$N_{Re}^P < 500(1-\varepsilon^P) \quad (16d)$$

$$N_{Re}^P = \frac{d_P^P G^P}{\mu^P} \quad (16e)$$

The reactor conversion (based on CO, typically the limiting reagent) is defined by the following equation:

$$X_{CO} = \frac{n_{CO0}^F - (n_{CO,ex}^F + n_{CO,ex}^P)}{n_{CO_40}^F} \quad (17)$$

where $n_{CO,ex}^F$ and $n_{CO,ex}^P$ are the CO molar flour rates at the exit of the reactor feed and permeate-sides correspondingly (mol/s).

The product hydrogen yield is defined by the following equation:

$$Y_{H_2} = \frac{n_{H_2,ex}^F + n_{H_2,ex}^P}{n_{CO0}^F} \quad (18)$$

where $n_{H_2,ex}^F$ and $n_{H_2,ex}^P$ are the hydrogen molar flow rates at the exit of the reactor feed- and permeate-sides correspondingly (mol/s). In the HAMR simulations, the hydrogen recovery ratio is also calculated. The hydrogen recovery ratio is defined as the fraction of product hydrogen that is recovered in the membrane permeate side and the amount of CO impurity (in ppm) that the permeate hydrogen stream contains.

For all simulations presented here, the basic assumption was that the WGS HAMR and the conventional packed bed reactor followed as a second stage an isothermal steam reformer which operated under the following conditions:
P=100 psig
T=750° C.
$CH_4:H_2O:H_2=1:3:0.1$
The exit from the steam reformer was assumed to be at equilibrium and was used intact (without any water make-up) as the feed to the WGS reactors. The conditions in the WGS reactors were as follows:
T=275° C.
P=100 psig
The membrane was hydrogen selective and the ideal separation factors (ratios of individual permeances) were assumed as follows:
$(H_2/CO_2)=(H_2/CO)=(H_2/H_2O)=(H_2/CH_4)=100:1$ The effect of permeance was first investigated. FIGS. 2-5 are for the case where the hydrogen permeance was equal to $1\times10^{-6}$ mole/(cm$^2\cdot$sec$\cdot$atm). For FIGS. 6-9, the hydrogen permeance was taken equal to $5\times10^{-6}$ mole/(cm$^2\cdot$sec$\cdot$atm). FIGS. 10-13 are for a hydrogen permeance of $10\times10^{-6}$ mole/(cm$^2\cdot$sec$\cdot$atm).

It is obvious from FIGS. 2-13 that the HAMR system clearly outperformed the conventional WGS reactor. The membrane permeance had a very significant effect on reactor performance. Very desirable hydrogen recoveries and CO contaminant levels were attained for the higher permeances. In terms of the overall performance, the above results point out that there is an optimal value of permeance that provides a good performance in terms of yield and hydrogen recovery without unduly impacting the CO contaminant levels in the hydrogen product. It should be noted that the above values of permeances and separation factors were attained with CMS membranes available from M&P.

It should be noted that the CO contaminant levels in the hydrogen product can be further reduced by improving the membrane CO separation characteristics. FIGS. 14-17 are from a simulation run with a hydrogen membrane permeance of $5\times10^{-6}$ mole/(cm$^2\cdot$sec$\cdot$atm) and the following separation characteristics:
$(H_2/CO_2)=(H_2/H_2O)=(H_2/CH_2)=100:1$
$(H_2/CO)=1,000:1$ For the next set of runs, the effect of the membrane's separation characteristics were investigated. The other conditions remained the same and the permeance was taken equal to $5\times10^{-6}$ mole/(cm$^2\cdot$sec$\cdot$atm). For FIGS. 18-21, the membrane was assumed to exhibit the following separation factors:
$(H_2/CO)=(H_2/H_2O)=(H_2/CH_4)=100:1$
$(H_2/CO_2)=50:1$ For FIGS. 22-25, the membrane was assumed to exhibit the following separation factors:
$(H_2/CO)=(H_2/H_2O)=(H_2/CH_4)=100:1$
$(H_2/CO_2)=10:1$ For FIGS. 26-29, the membrane was assumed to exhibit the following separation factors:
$(H_2/CO)=(H_2/H_2O)=(H_2/CH_4)=100:1$
$(H_2/CO_2)=1:1$ From FIGS. 18-29, it is noted that the separation characteristics had a significant effect on reactor performance. As the $CO_2:H_2$ permeance ratio decreased, hydrogen yield, recovery, and purity all improved.

The HAMR combines the reaction and membrane separation steps with adsorption on the membrane permeate sides using the hydrotalcite material. This HAMR system is of potential interest to pure hydrogen production for hydrogen production from coal gasification off-gas. The reactor performance was investigated for a range of membrane characteristics and compared with the behavior of the traditional packed bed reactor. The HAMR outperformed the conventional reactor system. It showed enhanced CO conversion, hydrogen yield, and product purity, and provided good promise for meeting the product purity requirements for PEM operation.

Example II

A High Efficiency, Low Temperature Reformer for Hydrogen Production

Description of the Technology

The technology involves the use of a high-efficiency, low-temperature reactor for steam reforming. With this reactor system, $H_2$ production can be operated at 350 to 400° C., as opposed to >800° C. The essence of the process is the employment of a unique membrane- and adsorption-enhanced reformer, which can preferentially allow $H_2$ permeation and $CO_2$ adsorption simultaneously, the two ultimate reaction products from steam reforming. Thus, the reformer can produce a $H_2$ product continuously until the adsorbent is saturated for regeneration via PSA. This unique reactor configuration can be viewed as a simplified MR under PSA operation, suitable for a scaled-down version of the steam reforming process. MR technology and sorption-enhanced PSA proposed in the literature allow only one of the reaction products, such as $H_2$ or $CO_2$, to be removed; the reaction rate enhancement that results is not sufficient, however, to achieve significant reforming at such low temperatures.

Figure 30:
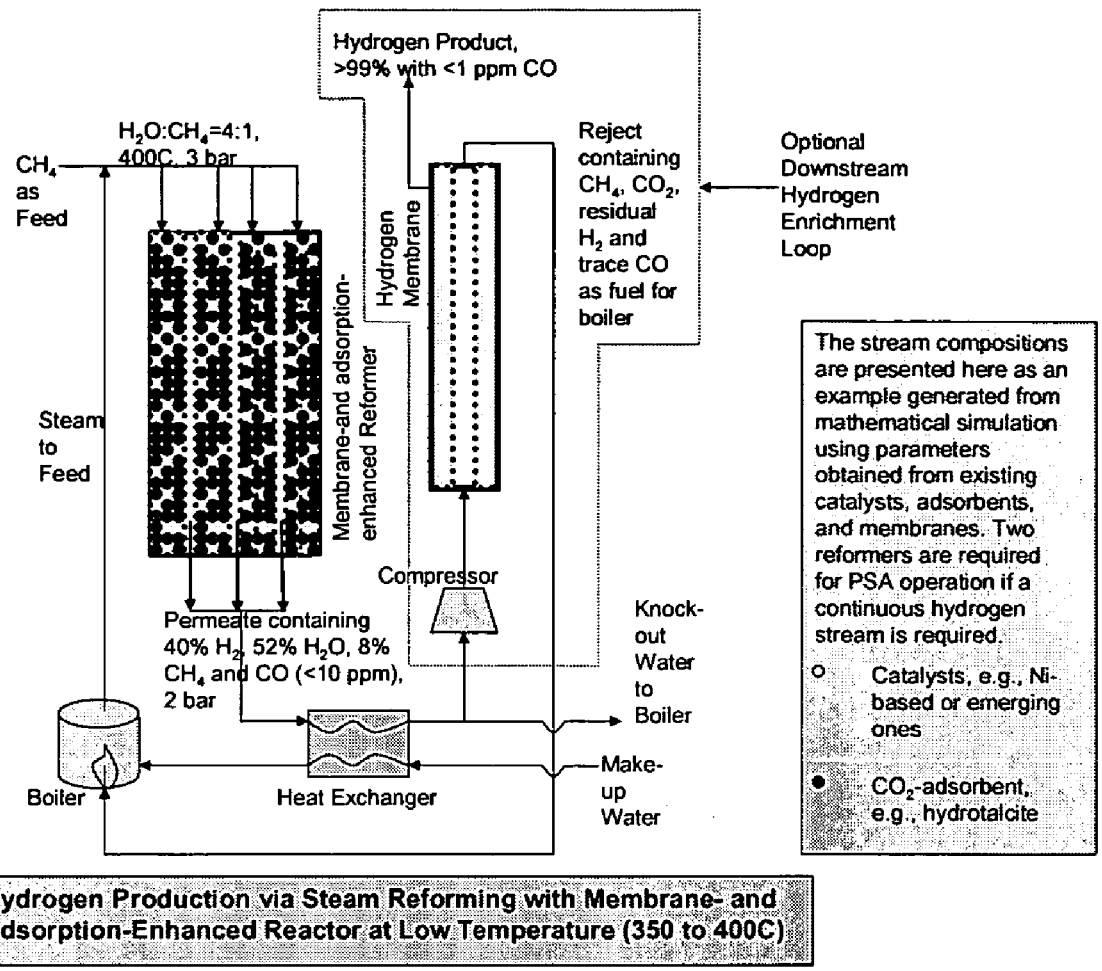
FIG. 30 is a schematic diagram showing hydrogen production via steam reforming with membrane- and adsorption-enhanced reactor at low temperature (350-400° C.).

The membrane utilized is a CMS nanoporous membrane originally developed by USC and currently offered commercially by M&P for lab and field-testing. Its unique $H_2$ permselectivity at the proposed temperature is ideal for this application. (As noted above, Pd membranes are also known for their unique $H_2$ permselectivity; however, several barriers related to material stability remain to be overcome. Moreover, their viable operating temperature range is incompatible with the proposed temperature range for reactor operation). The adsorbent selected is a hydrotalcite-based adsorbent, which has been intensively studied (Yang et al. (2002) Chem. Eng. Sci. 57:2945 and Kim et al. (2004) Ind. Eng. Chem. Res. 43:4559); its $CO_2$ affinity at this operating condition has also been well-documented in the literature (see Yang et al. (2002) Chem. Eng. Sci. 57:2945 for additional references). A mathematical model has been developed and a numerical simulation has been performed to support the technical feasibility of the process. FIG. 30 shows a schematic of the process together with the results of process design calculations using this model. Combining the adsorbent with the reforming catalyst in a packed bed MR utilizing the CMS membranes results in hydrocarbon conversion four times higher than the thermodynamic equilibrium conversion level; thus, efficient reforming can be accomplished at this low temperature range. The reformed product is low in CO (e.g., <10 ppm), and is, therefore, ready as a feedstock for fuel cell applications. The product, if desired, can be further enriched by processing it in a down-stream $H_2$ separator (see process scheme in FIG. 30).

The Advantages

Existing processes for hydrogen production are (i) extremely energy-intensive due to the requirement of steam (as a reactant) supply at this high temperature, and the need for providing the energy for the endothermic reforming reaction (1'), (ii) complicated due to the requirement of WGS reaction and CO polishing in addition to reforming, and (iii) capital-intensive due to the requirement for using special metallurgical alloys for the high-temperature reactor operation. These disadvantages handicap the scaling-down of existing reforming processes, targeting fuel cell-based mobile and distributed electricity generation applications.

In comparison with the conventional reforming process, the proposed process is ultra-compact, offering the following advantages:

(1) No WGS reactor is required.

(2) No post-treatment for CO clean-up is necessary. The CO level is expected to meet the specifications with the low temperature reformer and the in situ removal of $H_2$ and $CO_2$.

(3) All heating and cooling requirements involve the temperature range of up to 400° C. vs. >800° C. of existing reforming.

(4) The process is ultra-compact, comprising two simplified MR for PSA operation, one heat exchanger, and one steam generator/boiler. Further down-stream $H_2$ enrichment, if desired, can be achieved by a simplified treatment-train comprising one membrane separator and one compressor.

HAMR is also fuel-flexible. Using the mathematical model, its application to the case of liquid hydrocarbon fuels such as naphtha has been simulated. According to Darwish et al. ((2004) Fuel 83:409), naphtha can be represented as $C_mH_n$, where m=7.3 and n=15.5. In the simulations presented here, naphtha is represented as a heptane molecule; other authors in their reactor simulations of naphtha reforming (Chen et al. (2003) AIChE J. 49:1250, Chen et al. (2003) Ind. Eng. Chem. Res. 42:6549, and Chen et al. (2004) Ind. Eng. Chem. Res. 43:1323) have also used heptane as a model compound to represent naphtha. For such a fuel, in addition to reactions (1') and (2') above, the following reaction also takes place:

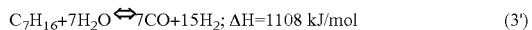

$$C_7H_{16} + 7H_2O \leftrightarrow 7CO + 15H_2; \Delta H = 1108 \text{ kJ/mol} \quad (3')$$

The reforming temperature for liquid hydrocarbons is lower, i.e., ~600° C., and no thermodynamic equilibrium conversion limitation exists in this temperature range according to the literature (Darwish et al. (2004) Fuel 83:409). Unfortunately, the methanation reaction (the reverse of the reforming reaction (1') above) becomes significant and results in the formation of $CH_4$ in addition to significant unconverted CO. In the proposed dual-enhanced process, the removal of $H_2$ as a product in conjunction with the adsorption of $CO_2$ in situ can aggressively promote the conversion of CO to $H_2$ via the WGS reaction (2') above; thus, the methanation reaction is kept at a minimum, while the CO contaminant in the final product is extremely low. The simulations (see Table 1') with HAMR using M&P CMS membranes at temperatures from 300-400° C. indicate that heptane steam reforming benefits significantly from being carried out in such a reactor. As noted in Table 1', the $H_2$ yield in the proposed reactor system (defined as the mol of $H_2$ produced per mol of heptane fed) is many times higher than the corresponding yield of a PBR containing the same amount of catalyst and operating with the same feed as the HAMR system. For a range of operating conditions, the $H_2$ product contains only a minor amount of $CH_4$ (~3%) and very little CO (<10 ppm), which makes it usable in a fuel cell without further treatment. More importantly, the $CO_2$ is concentrated in the reject stream and is, therefore, ready for sequestration.

TABLE 1'

Simulations with Naphtha Reforming.
Steam Reforming of Liquid Hydrocarbon:
Conventional Packed Bed vs Proposed Reactor
$H_2O:C = 4:1, T = 400° C.$

| Reactor Type | Composition (%) | Reactor Pressure (atm) | | |
|---|---|---|---|---|
| | | 2 | 3 | 4 |
| Packed Bed Reactor | CO | 0.30 | 0.29 | 0.25 |
| | $CO_2$ | 22.23 | 21.61 | 22.11 |
| | $H_2$ | 35.11 | 19.31 | 31.20 |
| | $N_2$ | 0.00 | 0.00 | 0.00 |
| | $CH_4$ | 42.37 | 58.79 | 46.44 |
| | $C_7H_{16}$ | 0.00 | 1.73E−45 | 0.00 |
| Proposed Reactor | CO | 2.91E−04 | 6.91E−04 | 0.004 |
| | $CO_2$ | 0.00 | 0.00 | 0.00 |
| | $H_2$ | 98.18 | 96.07 | 91.95 |
| | $N_2$ | 0.00 | 0.00 | 0.00 |
| | $CH_4$ | 1.81 | 3.93 | 8.04 |
| | $C_7H_{16}$ | 2.65E−04 | 3.06E−04 | 3.889E−04 |
| Yield | | | | |
| Packed Bed | $H_2$ | 3.79 | 3.17 | 2.53 |
| | $CH_4$ | 4.57 | 4.73 | 4.89 |
| Proposed Reactor | $H_2$ | 20.55 | 18.94 | 16.29 |
| | $CH_4$ | 0.39 | 0.79 | 1.45 |

Theoretical max. for $H_2$ yield is 22, i.e., 22 mol $H_2$ produced per mole heptane feed
Theoretical max. for $CH_4$ yield is 7, i.e., 7 mol $CH_4$ produced per mole heptane feed In the simulations, the naphtha reforming reaction was taken to be irreversible. This is the assumption also made in prior studies (Chen et al. (2003) AIChE J. 49:1250, Chen et al. (2003) Ind. Eng. Chem. Res. 42:6549, and Chen et al. (2004) Ind. Eng. Chem. Res. 43:1323) under similar pressure and temperature conditions. The primary effect of $H_2$ removal through the CMS membrane is through its influence on the reaction rate. The reaction rate for heptane reforming has a non-monotonic dependence on $H_2$ partial pressure (Tottrup (1982) Appl. Catal. 4:377), i.e.; there is a certain value of $H_2$ partial pressure that maximizes the rate. Removing $H_2$ from the reactor through the membranes has the effect in that it maintains the $H_2$ pressure everywhere in the reactor at or near this optimum level, thus favorably impacting the rate of $H_2$ production. In fact, the thermodynamic simulations indicate that equilibrium limitations arise for temperatures less than 400° C. (although in the reactor simulations, this has not been taken into consideration, since the published rate data do not account for such effects). Under such conditions, additional beneficial effects from the HAMR system are expected, since removing the $H_2$ tends to shift the reaction equilibrium towards the product side. It is the synergy between adsorbent and membrane that makes it possible to attain CO levels in the $H_2$ product <10 ppm. The ability to attain very high $H_2$ yields at low temperatures (<400° C.) vs. the significantly higher temperatures normally practiced in conventional reformers has two additional advantages. One such advantage involves lowering the rate of coke production, and, the potential for catalyst deactivation. The other relates to energy savings (since the feed mixture needs to be heated to a lower temperature), and potentially to the ability to utilize waste heat that may be available in the flue-gas/exhaust of the power producing devices (fuel cells, internal combustion engines, turbines, etc.).

Novel CMS Membranes

Figure 31:
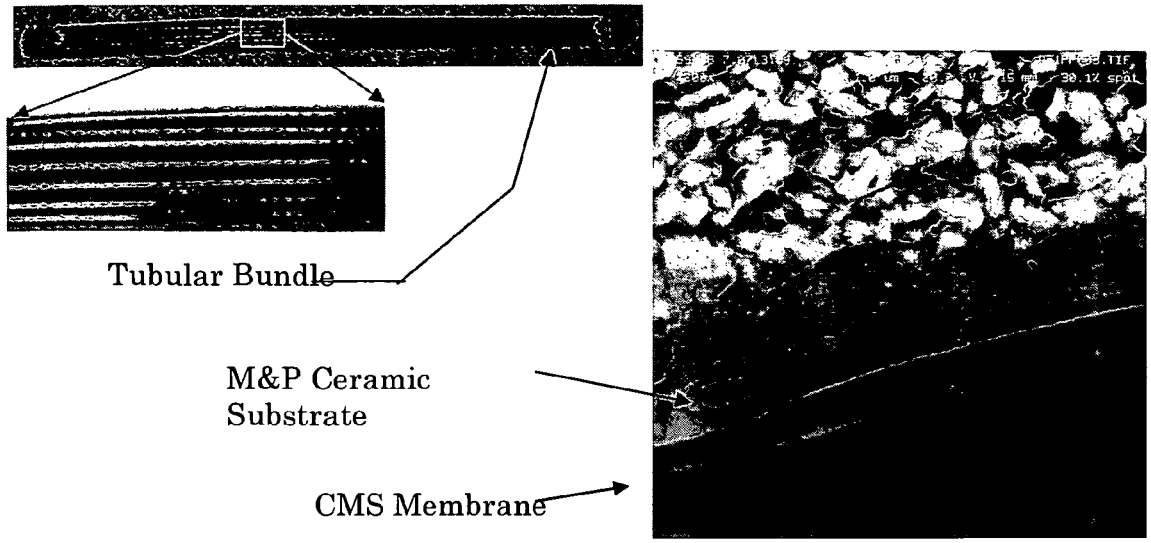
FIG. 31 shows a Media and Process Technology, Inc. (M&P) CMS membrane.
Figure 32A:
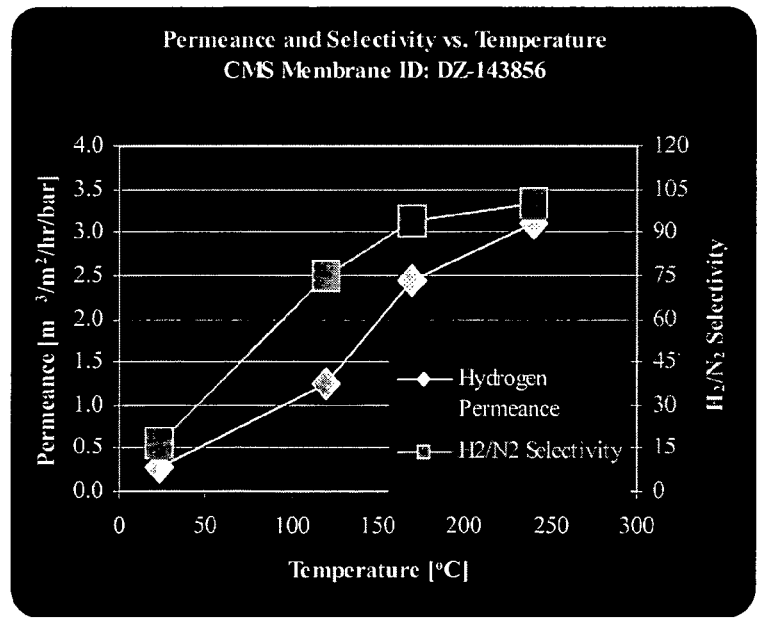
FIG. 32*a* shows temperature dependence of the permeance and selectivity of an M&P CMS membrane (targeting 50 to 250° C. applications).
Figure 32B:
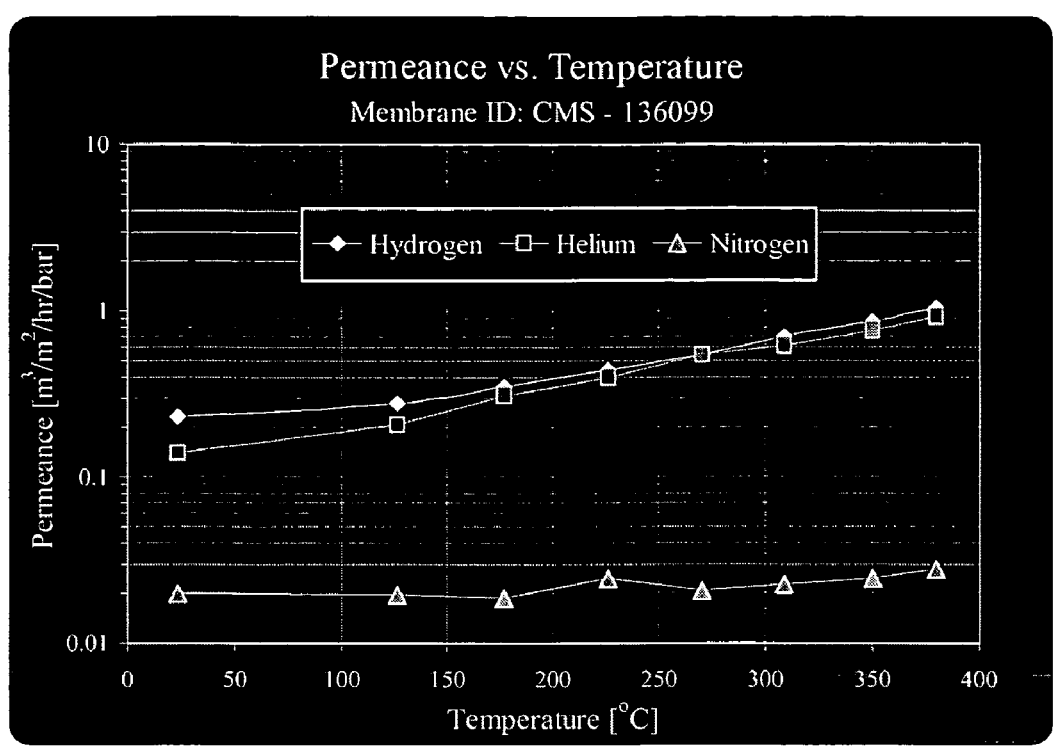
FIG. 32*b* shows temperature dependence of the permeance of an M&P CMS membrane.
Figure 33:
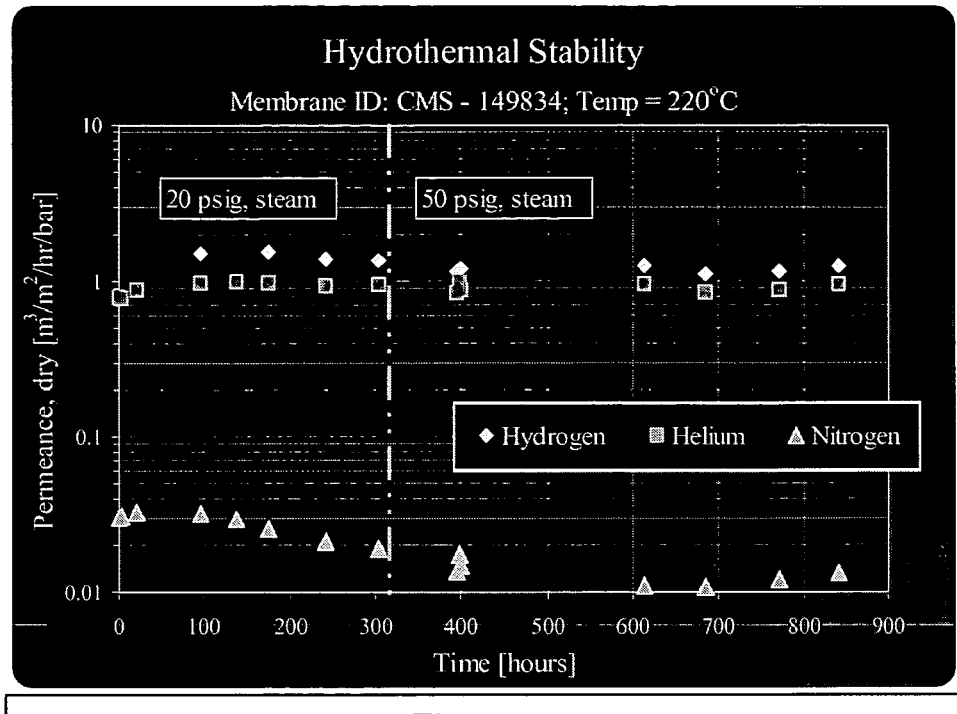
FIG. 33 shows hydrothermal stability of a CMS membrane at 30 to 50 psig steam and 220° C.
Figure 34:
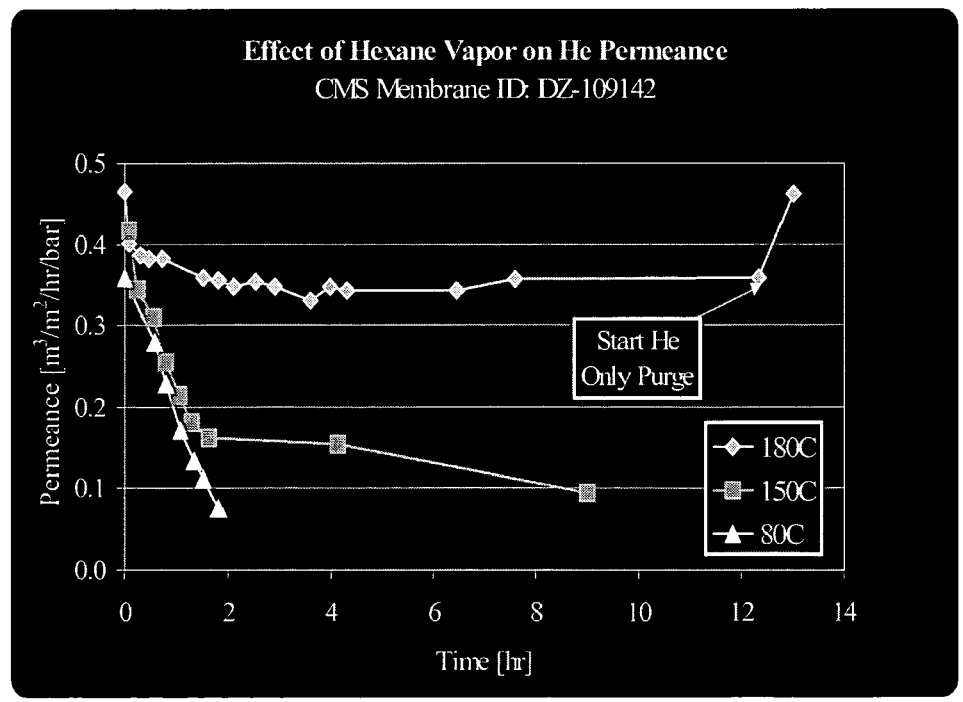
FIG. 34 shows resistance to poisoning of CMS membranes.

CMS membranes represent a "next generation" membrane material, because they vastly improve on the limits of the selectivity vs. permeability relationship set by the polymeric membranes for gas separations. However, in the past, these membranes have been limited purely to an academic novelty for three primary reasons, specifically: (i) they suffer several process-related problems including membrane performance deterioration due to temporary and/or permanent poisoning by organics and other impurities, (ii) they are very fragile, when unsupported (as hollow fiber/tubular products), and (iii) they can be very costly given the high performance polymers generally required as precursors. M&P recently developed a commercially viable CMS membrane based upon the R&D work by USC. To do so required innovative solutions to the above application-related barriers. To overcome the fragility and cost problems, the M&P CMS membrane consists of an ultrathin (0.5 to 3 μm thick) CMS layer supported on M&P high performance, high-strength hollow-fiber ceramic membranes (see FIG. 31). In the design, the tube spacing can be arbitrarily selected to maintain the flexibility of the reactor design, if the catalyst is packed in the shell side. For applications >300° C. in the presence of steam, graphite seals with ceramic-glass potting ends are utilized. Membrane $H_2$ permeances ranging from 0.8 to >5 $m^3/m^2/hr/bar$ (27 to 168 scfh/$ft^2$ at 10 bar) have been demonstrated. Selectivities for $H_2$ to $N_2$ are 25 to >100 even at temperatures up to 400° C. Nitrogen is used here to represent gas components rejected by this CMS membrane, including $CO_2$ and CO and light hydrocarbons. Water, as $H_2$, is permeable through the membrane. A typical permeance vs. temperature for $H_2$ and $N_2$ is presented in FIGS. 32a and 32b as well as Table 2'. The $H_2$ permeance increase is consistent with activated diffusion via molecular sieving. The maximum in selectivity is due to the $N_2$ permeance, which at low temperatures displays Knudsen type diffusivity (i.e., decreases with temperature) but at higher temperatures becomes activated as molecular sieving begins to dominate (about 150-400° C. for this membrane). As is well-known, carbon, particularly microporous carbon, reacts with steam at sufficiently high temperatures. Although 180 to 400° C. is generally considered low for carbon steam gasification, long-term thermal and hydrothermal stability testing has been conducted to demonstrate the CMS/C membrane suitability for the proposed reaction environment. FIG. 33 shows the $H_2$ permeance and $H_2/N_2$ selectivity of one of the membranes in a hydrothermal stability test conducted at 220° C. in a 25-day test run (other tests indicate similar hydrothermal stability at 350° C.). The test result demonstrates the hydrothermal stability of the CMS membrane. In addition, although porous carbon poisoning by organic vapors is well-known, it can be prevented by operation at high temperatures, e.g., >200° C., as shown in FIG. 34. Thus far, no other membrane has offered a similar functional performance in this intermediate temperature range (180-400° C.). This temperature range is too high for even the most advanced polymer-based membranes. As for inorganic membranes (e.g., silica, zeolite, and others), operating temperatures >>300° C. are required to achieve appreciable (economical) permeances. The cost of the CMS membranes is ≦$800/$m^2$ (≦$80/$ft^2$), which is significantly lower than the cost of competing (e.g., Pd) membranes.

TABLE 2'

Performance of Various M&P CMS Membranes Including $H_2$ Selective Membranes and Membranes Showing High Selectivity for Organic Vapors.

| Part ID [-] | Temperature [° C.] | $H_2$ Permeances [$m^3/m^2$/hr/bar] | α-$H_2/N_2$ α-$H_2/CO_2$ [-] |
|---|---|---|---|
| DZ-142322 | 140 | 1.21 | 69 |
| | | | 28 |
| DZ-143856 | 170 | 2.41 | 94 |
| | | | 14 |
| DZ-148020 | 220 | 1.1 | 85 |
| DZ-149834 | 220 | 1.1 | 85 |
| Other Membranes | | | |
| DZ-193454 | 35 | 19.2 | 1.9 |
| | | Ethane: 18.0 | 1.2 |
| | | Iso-Butane: 2.39 | He/$N_2$: 0.75 |

Adsorbent

In some embodiments, the HAMR system utilizes LDH adsorbents, which have emerged as standard $CO_2$ adsorbents for high temperature applications, i.e., up to ~400° C. Although many different compositions of LDH can be formulated, one example is $Al_{0.71}Mg_{0.29}(OH)_2(CO_3)0.15$. According to the literature and prior studies (Yang et al. (2002) Chem. Eng. Sci. 57:2945 and Kim et al. (2004) Ind. Eng. Chem. Res. 43:4559), about 1.5 to 2.0 wt % $CO_2$ can be adsorbed with this type of adsorbents at the proposed temperature. Preliminary simulations indicate that this existing hydrotalcite adsorbent is adequate for application in the HAMR system.

Design Simulations

The performance of the HAMR system depends upon many system/intrinsic and operating parameters. Key system/intrinsic parameters include catalyst reaction rate, $H_2$ permeation rate, adsorption capacity vs. pressure, catalyst and adsorbent volumes, and their relative ratio. The operating variables include temperature and pressure of the reactor, contact time, and membrane (steam) purge rate. The mathematical model based upon the existing system and intrinsic parameters has produced outstanding reforming performance. This design tool allows defining of a suitable range of the operating variables for a given application and generation of performance vs. time information for determining when the adsorbent requires pressure swing desorption for regeneration. Further, mathematical simulations can be performed to incorporate both adsorption and desorption steps to determine the net $H_2$ yield and purity for the proposed application and for process optimization and economic analysis.

Example III

A High Efficiency, Low Temperature Reformer for Hydrogen Production

Introduction

A novel reactor system, termed HAMR, was investigated. The HAMR concept couples the reaction and membrane separation steps with adsorption on the reactor and/or membrane permeate side (Park (2001) Models and Experiments with Pervaporation Membrane Reactors Integrated with a Water Removal Adsorbent System, Ph.D. Thesis, University of Southern California, Los Angeles, Calif., Park and Tsotsis (2004) System. Chem. Eng. Proc. 43:1171, and Park (2004) Korean J. Chem. Eng. 21:782). The HAMR system investigated previously involved a hybrid pervaporation MR system and integrated the reaction and pervaporation steps through a membrane with water adsorption. Coupling reaction, pervaporation, and adsorption significantly improved the performance. Most recently, Elnashaie and co-workers (Chen and Elnashaie (2004) Ind. Eng. Chem. Res. 43:5449, Prasad and Elnashaie (2004) Ind. Eng. Chem. Res. 43:494, Prasad and Elnashaie (2003) Ind. Eng. Chem. Res. 42:4715, and Chen et al. (2003) Chem. Eng. Sci. 58:4335) mathematically analyzed the behavior of a circulating fluidized-bed HAMR system utilizing Pd membranes. This reactor is assumed to operate at steady state by recirculating the catalyst and adsorbent through a second reactor for regeneration. The ability of Pd membranes to withstand the rigors of the fluidized-bed steam reforming environment and of the adsorbents to undergo continuous recirculation and regeneration still remains the key challenge. In addition, this system is not well-suited for onboard or small-scale applications.

The HAMR configuration can be potentially used with equilibrium- or selectivity-limited reactions in which one of the products can be adsorbed while another (or the same) product can be simultaneously removed via a membrane. What limits the application of the concept is the availability of efficient adsorbents that are also stable at reaction conditions. Esterification reactions (like the ethanol reaction with acetic acid to produce ethyl acetate previously studied (Park (2001) Models and Experiments with Pervaporation Membrane Reactors Integrated with a Water Removal Adsorbent System, Ph.D. Thesis, University of Southern California, Los Angeles, Calif. and Park and Tsotsis (2004) System. Chem. Eng. Proc. 43:1171)), through the use of water adsorbents, and the production of hydrogen (through steam reforming or the WGS reactions) are two key potential applications.

Here, a HAMR system involving a hybrid packed bed catalytic MR, coupling the methane steam reforming reaction through a porous ceramic membrane with a $CO_2$ adsorption system was investigate. This HAMR system exhibited behavior that is more advantageous than either the MRs or ARs, in terms of the attained yields and selectivities.

Theory

A mathematical model for the HAMR system is presented and analyzed for a range of temperature and pressure conditions without any intention to be bound by such theory. The behavior of the HAMR system is compared with the conventional packed bed reactor, as well as an MR and an AR system.

Kinetics for Methane Steam Reforming

For the methane steam reaction, a catalytic reaction scheme first proposed by Xu and Froment ((1989) AIChE J. 35:88) is utilized. This scheme has found widespread application. According to Xu and Froment (see also Elnashaie et al. (1990) Chem. Eng. Sci. 45:491 and Nam et al. (2000) Korean J. Chem. Eng. 17:288), the methane steam reforming reaction consists of two major endothermic reforming reaction steps, together with the exothermic WGS reaction (see Table 1), with the overall reaction being highly endothermic. The rate expressions, heats of reaction, and thermodynamic constants for the three reaction steps are shown in Table 1. The kinetic parameters, as reported by Xu and Froment, are shown in Table 2.

TABLE 1

Rate Expressions and Thermodynamic Properties for the Methane-Steam-Reforming Reaction[α,B]

| i reaction | rate expression | heat of reaction at 298 K, $\Delta H_R^0$ (kJ/mol) | equilibrium constant, $K_{eqi}$ |
|---|---|---|---|
| 1 $CH_4 + H_2O \rightarrow CO + 3H_2$ | $r_1 = (k_1/P_{H_2}^{2.5})(P_{CH_4}P_{H_2O} - P_{H_2}^3 P_{CO}/K_{eq1})/DEN^2$ | 206.1 | $K_{eq1} = \exp[30.114 - 26830/T]$ |
| 2 $CO + H_2O \rightarrow CO_3 + H_2$ | $r_2 = (k_3/P_{H_2})(P_{CO}P_{H_2O} - P_{H_2}P_{CO_2}/K_{eq3})/DEN^2$ | -41.15 | $K_{eq2} = \exp[-4.036 + 4400/T]$ |
| 3 $CH_4 + 2H_2O \rightarrow CO_2 + 4H_2$ | $r_3 = (k_3/P_{H_2}^{3.5})(P_{CH_4}P_{H_2O}^2 - P_{H_2}^4 P_{CO_2}/K_{eq3})/DEN^2$ | 164.9 | $K_{eq3} = K_{eq1}K_{eq3}$ |

[α]$DEN = 1 + K_{CO}P_{CO} + K_{H_2}P_{H_2} + K_{CH_4}P_{CH_4} + K_{H_2O}P_{H_2O}/P_{H_2}$

TABLE 2

Kinetic Parameters for the Methane-Steam-Reforming Reaction[B]

| kinetic parameter | preexponential terms, $k_{i0}$, $K_{i0}$ | activation energies or heats of chemisorption, $E_a$, $\Delta H$ (kJ/mol) | units |
|---|---|---|---|
| $k_1$ | $4.225 \times 10^{15}$ | 240.1 | kmol · bar$^{0.5}$/kg of catalyst/h |
| $k_2$ | $1.955 \times 10^5$ | 67.13 | kmol/kg of catalyst/h/bar |
| $k_3$ | $1.020 \times 10^{15}$ | 243.9 | kmol · bar$^{0.5}$/kg of catalyst/h |
| $K_{CO}$ | $8.23 \times 10^{-5}$ | -70.65 | bar$^{-1}$ |
| $K_{H_2}$ | $6.12 \times 10^{-9}$ | -82.90 | bar$^{-1}$ |
| $K_{CH_4}$ | $6.65 \times 10^{-4}$ | -38.28 | bar$^{-1}$ |
| $K_{H_2O}$ | $1.77 \times 10^5$ | 88.68 | |

Formation rates for the $H_2$, CO, and $CO_2$ products and the disappearance rates for $CH_4$ and $H_2O$ are given by the following equations:

$$R_{H_2} = +3r_1 + r_2 + 4r_3 \quad (1)$$

$$R_{CO} = +r_1 - r_2 \quad (2)$$

$$R_{CO_2} = +r_2 + r_3 \quad (3)$$

$$R_{CH_4} = -r_1 - r_3 \quad (4)$$

$$R_{H_2O} = -r_1 - r_2 - 2r_3 \quad (5)$$

Mathematical Model of the HAMR System

Figure 35:
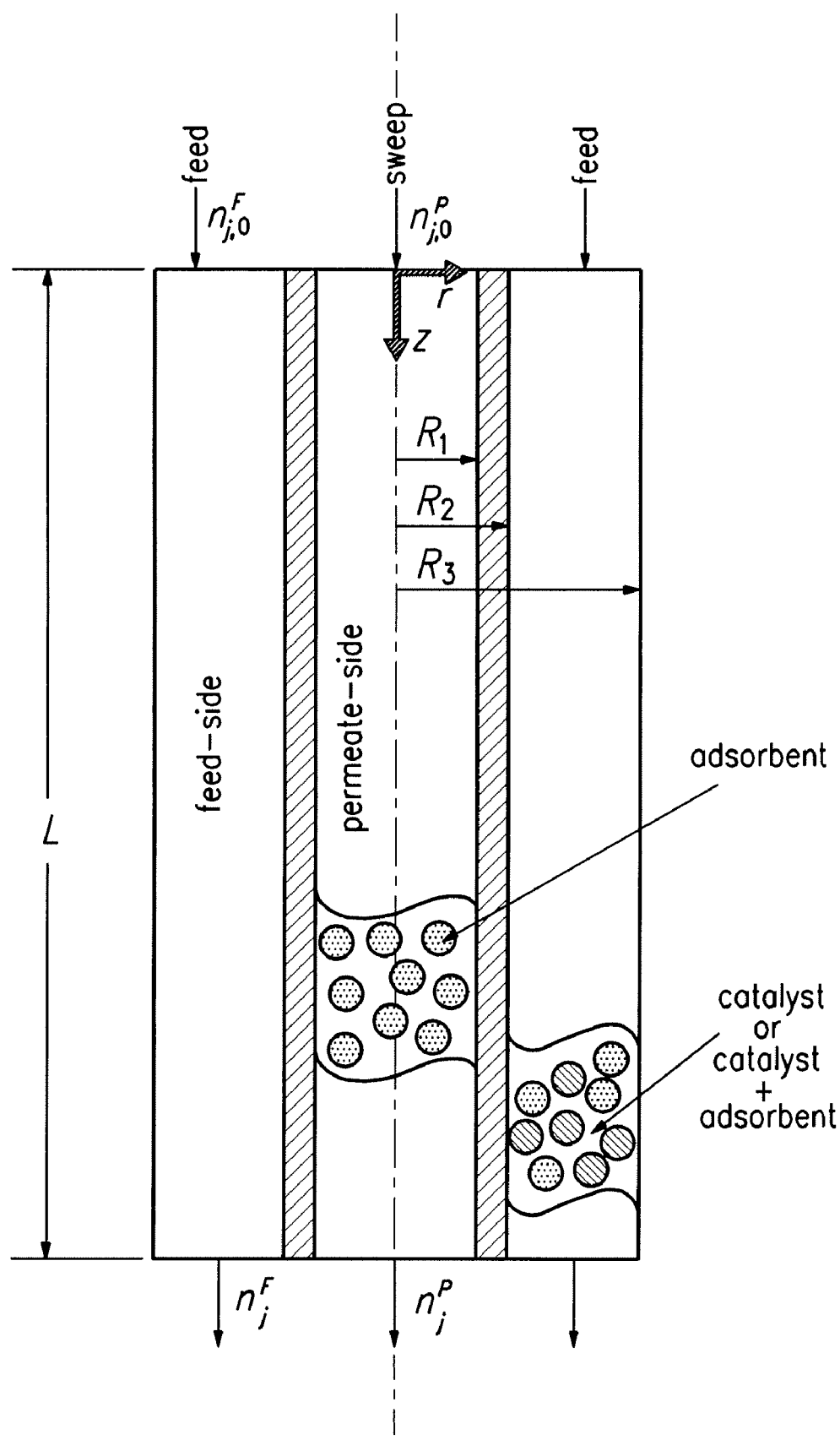
FIG. 35 is a schematic diagram of a HAMR system.

A schematic of the HAMR system is shown in FIG. 35. In this figure, the catalyst and adsorbent are packed in the exterior of the membrane (signified by the superscript F, or the feed side), with additional adsorbent also packed in the interior of the membrane volume (signified by the superscript P, or the permeate side). There are, of course, a number of other potential reactor configurations, as previously noted. For example, the catalyst may be loaded in the feed side, while the adsorbent may also be loaded in the permeate side, or the catalyst and adsorbent may only be loaded in the feed side, with no adsorbent or catalyst being present in the permeate side, which is the configuration that is analyzed here. To simplify matters, in the development of the model, it is assumed that the reactor operates isothermally, that external mass transfer resistances are negligible for the transport through the membrane as well as for the catalysts, and that internal diffusion limitations for the catalyst, and internal or external transport limitations for the adsorbent, are accounted for by the overall rate coefficients. Moreover, plug-flow conditions are assumed to prevail for both the interior and exterior membrane volumes as well as ideal gas law conditions.

In the simulations, the experimentally measured transport characteristics of a microporous SiC membrane (Ciora et al. (2004) Chem. Eng. Sci. 59:4957) is utilized. These membranes have been shown previously to be thermally and hydrothermally stable under conditions akin to the steam reforming reaction conditions (Ciora et al. (2004) Chem. Eng. Sci. 59:4957). Further details about their preparation and characterization can be found in the original publication. The SiC membranes are highly permselective toward hydrogen, with gases with larger kinetic diameters permeating only by Knudsen diffusion through membrane pinholes and cracks (Ciora et al. (2004) Chem. Eng. Sci. 59:4957). Mass transfer through the porous membrane is described by the following empirical equation:

$$F_j = U_j(P_j^F - P_j^P) \qquad (6)$$

where Fj is the molar flux (mol/m$^2$·s), $P_j^F$ the partial pressure of component j on the membrane feed side (bar), $P_j^P$ the partial pressure of component j on the membrane permeate side (bar), and Uj the membrane permeance for component j (mol/m$^2$·bar·s). Equation 6 is, of course, a simplified empirical expression for describing flux through a nanoporous membrane for which the size of the pores approaches that of the diffusing molecules.

The mass balance on the feed side of the reactor packed with methane steam reforming catalyst and, potentially, an adsorbent is described by the following equations for $CO_2$, $CO$, $H_2$, $H_2O$, $CH_4$, and an inert species (potentially used as a sweep gas or a blanketing agent; for catalytic steam reforming, a practical sweep gas would be either steam or hydrogen, however):

$$\epsilon^F \frac{\partial C_j^F}{\partial t} + \frac{\partial n_j^F}{\partial V} = -\alpha_m U_j(P_j^F - P_j^P) + (1-\epsilon_b^F)\beta_c \rho_c R_j^F - \qquad (7)$$

$$(1-\epsilon_b^F)(1-\beta_c)\rho_a G_j^F + \epsilon_b^F (A^F)^2 \frac{\partial}{\partial V}\left(D_L^F \frac{\partial C_j^F}{\partial V}\right);$$

$$j = 1, 2, \ldots, n$$

In Eqn. 7, $n_j^F$ is the molar flow rate (mol/s) for species j and $C_j^F$ is the gas-phase concentration (kmol/m$^3$) equal to $n_j^F/Q^F$, where $Q^F$ is the volumetric flow rate (m$^3$/s). V is the feed side reactor volume variable (m$^3$), AF the cross-sectional area for the reactor feed side (m$^2$), $\alpha_m$ the membrane area per feed side reactor volume (m$^2$/m$^3$), $\epsilon_b^F$ the bed porosity on the feed side, $\epsilon^F$ the total feed side bed porosity (it includes the bed porosity and catalyst porosity), $\beta_c$ the fraction of the solid volume occupied by catalysts ($\beta_c=1$ when no adsorbent is present), $\rho_c$ the catalyst density (kg/m$^3$), $\rho_a$ the adsorbent density (kg/m$^3$), and $R_j^F$ the reaction rate expression, which either is described by Eqns. 1-5 (mol/kg·s) or is equal to zero if j is an inert species. Assuming that the adsorbent only adsorbs $CO_2$, $G_j^F$ is zero for all other components except $CO_2$. $D_L^F$ (m$^2$/s) is the axial dispersion coefficient given by the following equation (Edwards and Richardson (1968) Chem. Eng. Sci. 23:109) generally applicable for describing dispersion phenomena through packed beds:

$$D_L^F = 0.73 D_m^F + \frac{0.5 u^F d_p^F}{1 + 9.49(D_m^F/u^F d_p^F)} \qquad (8)$$

where $D_m^F$ is molecular diffusivity (m$^2$/s), $u^F$ is the velocity at the feed side (m/s), and $d_p^F$ is the particle diameter in the feed side (m).

A number of approaches are found in the literature for describing $G_{CO_2}^F$. Ideally, both external and internal mass transport and finite rates of adsorption would be accounted for explicitly. Traditionally, in the modeling of ARs, simpler models have been utilized instead (Ding and Alpay (2000) Chem. Eng. Sci. 55:3929 and Ding and Alpay (2000) Chem. Eng. Sci. 55:3461). Two such models have received the most attention. They are (i) the model based on the assumption of an instantaneous local adsorption equilibrium between the gas and adsorbent phases (Park and Tsotsis (2004) System. Chem. Eng. Proc. 43:1171, Ding and Alpay (2000) Chem. Eng. Sci. 55:3929, Ding and Alpay (2000) Chem. Eng. Sci. 55:3461, and Park (2004) Korean J. Chem. Eng. 21:782) and (ii) the LDF models, according to which (Karger and Ruthven (1992) Diffusion in Zeolites and Other Microporous Solids, Wiley Publishers, New York) $G_{CO_2}^F$ is described by the following expression:

$$\frac{dC_s}{dt} = G_{CO_2}^F = k_a(C_{seq} - C_s) \qquad (9)$$

where $C_{seq}$ is the adsorption equilibrium $CO_2$ concentration on the adsorbent (mol/kg) corresponding to the prevailing gas phase concentration, $C_s$ is the existing adsorbed $CO_2$ concentration (mol/kg), and $k_a$ (s$^{-1}$) is a parameter that "lumps" together the effects of external and intraparticle mass transport and the sorption processes and that, as a result, is often a strong function of temperature and pressure (Ding and Alpay (2000) Chem. Eng. Sci. 55:3461) although, typically, in modeling, it is taken as temperature/pressure-independent. To calculate $C_{seq}$, the data reported by Ding and Alpay ((2000) Chem. Eng. Sci. 55:392927 and (2000) Chem. Eng. Sci. 55:3461) for $CO_2$ adsorption on potassium-promoted LDH are utilized. Their data show that the $CO_2$ adsorption on this adsorbent follows a Langmuir adsorption isotherm under both dry and wet conditions, described by the following equation:

$$C_{seq} = \frac{m_{CO_2} b_{CO_2} P_{CO_2}}{1 + b_{CO_2} P_{CO_2}} \qquad (10)$$

where $m_{CO_2}$ (mol/kg) is the total adsorbent capacity and $b_{CO_2}$ (bar$^{-1}$) the adsorption equilibrium constant, which is described by the van't Hoff equation:

$$b_{CO_2} = b_{CO_2}(T_0)\exp[-\Delta H_a/R(1/T - 1/T_0)] \qquad (9)$$

The heat of adsorption, $\Delta H_a$ (kJ/mol), under wet conditions for a region of temperatures from 481 to 753 K is calculated to be −17 kJ/mol, while $b_{CO_2}$ at 673 K is equal to 23.6 bar (Ding and Alpay (2000) Chem. Eng. Sci. 55:3461). Eqns. 7 and 9 must be complemented by initial and boundary conditions. For simplicity, it is assumed that the reactor, prior to the initiation of the reaction/adsorption step, has undergone a start-up procedure as described by Ding and Alpay ((2000) Chem. Eng. Sci. 55:3929) that involves (i) heating the reactor to the desired temperature under atmospheric pressures by feeding $H_2$ on the reactor feed side and the chosen sweep gas on the permeate side, (ii) supplying water to the system so that the feed $H_2O/H_2$ ratio is the same as the $H_2O/CH_4$ ratio to be used during the reaction step, (iii) pressurizing the feed and permeate sides to the desired pressure conditions, and (iv) switching from $H_2$ to $CH_4$ to initiate the reaction/adsorption step. In the simulations, the conditions prevailing at the start of step (iv) are those prevailing at steady state during step (iii).

In addition, during step (iv) the following conventional boundary conditions prevail (Xiu et al. (2004) Chem. Eng. Res. Des. 82:192, Xiu et al. (2003) Chem. Eng. J. (Amsterdam, Neth.) 95:83, Xiu et al. (2003) Chem. Eng. Sci. 58:3425, Xiu et al. (2002) AIChE J. 48:817, and Xiu et al. (2002) Chem. Eng. Sci. 57:3893):

$$\text{at } V = 0; \frac{\partial x_j^F}{\partial V} = -\frac{u_0^F(x_{j0}^F - x_j^F)}{A^F \epsilon_b^F D_L^F} \tag{12a}$$

$$\text{at } V = V_R; \partial x_j^F / \partial V = 0 \tag{12b}$$

where $u_0^F$ is the inlet superficial velocity (m/s), $V_R$ the total reactor volume (m³), $x_j^F$ the mole fraction, and $x_{j0}^F$ the inlet mole fraction for species j.

Assuming that the catalyst and adsorbent particles have the same size, the pressure drop in a packed bed can be calculated using the Ergun equation:

$$-\frac{dP^F}{dV} = 10^{-6} \frac{f^F(G_m^F)^2}{A^F g_c d_P^F \rho_F^F} \tag{13}$$

$$\text{at } V = 0, \quad P^F = P_0^F \tag{13a}$$

$$f^F = \left(\frac{1 - \epsilon_b^F}{(\epsilon_b^F)^3}\right)\left(1.75 + \frac{150(1 - \epsilon_b^F)}{N_{Re}^F}\right) \tag{13b}$$

$$N_{Re}^F < 500(1 - \epsilon_b^F) \tag{13c}$$

$$N_{Re}^F = d_P^F G_m^F / \mu^F \tag{13d}$$

where $P^F$ is the feed-side pressure (bar), $P_0^F$ the inlet feed side pressure, $\mu^F$ the viscosity (Pa·s), $d_P^F$ the particle diameter in the feed side (m), $G_m^F = \rho_F^F u^F$ the superficial mass flow velocity in the feed side (kg/m²·s), $\rho_F^F$ the density of the fluid (kg/m³), and $g_c$ the gravity conversion factor equal to 1 in SI units.

Because the SiC membranes do not show substantial $CO_2$ permeation (Ciora et al. (2004) Chem. Eng. Sci. 59:4957), it is assumed that no adsorbent or catalyst is present in the permeate side. For the permeate side, the following equation is, therefore, utilized:

$$\frac{\partial C_j^F}{\partial t} + k\frac{\partial n_j^F}{\partial V} = \alpha_m k U_j (P_j^F - P_j^P) + (A^F)^2 \frac{\partial}{\partial V}\left(D_L^P \frac{\partial C_j^P}{\partial V}\right); \tag{14}$$

$$j = 1, 2, \ldots, n$$

where $k = A^F/A^P$, with $A^P$ being the cross-sectional area on the permeate side (m²), and $D_L^P$ (m²/s) is the axial Taylor-Aris dispersion coefficient on the permeate side (Levenspiel (1998) Chemical Reaction Engineering, 3rd ed., Wiley, New York) for empty tubes given as:

$$D_L^P = D_m^P + \frac{(u^P)^2(d_t^P)^2}{192 D_m^P} \tag{15}$$

where $D_m^P$ is the molecular diffusivity (m²/s), $u^P$ is the velocity at the permeate side (m/s), and $d_t^P$ is the membrane inside diameter (m). In the simulations, the conditions prevailing in the permeate side at the start of step (iv) are those prevailing at steady state during step (iii). In addition, during step (iv) the following conditions prevail in the permeate side:

$$\text{at } V = 0; \frac{\partial x_j^P}{\partial V} = -\frac{u_0^P(x_{j0}^P - x_j^P)}{A^F D_L^P} \tag{16a}$$

$$\text{at } V = V_R; \frac{\partial x_j^P}{\partial V} = 0 \tag{16b}$$

where $x_j^P$ is the mole fraction, $x_{j0}^P$ the inlet mole fraction for species j on the permeate side, and $u_0^P$ the superficial flow velocity (m/s) at the inlet. Because no adsorbent or catalyst is present in the permeate side, any potential pressure drops is ignored.

The reactor conversion (based on methane, which is typically the limiting reagent) is defined by the following equation:

$$X_{CH_4} = \frac{n_{CH_4,0}^F - (n_{CH_4,ex}^F + n_{CH_4,ex}^P)}{n_{CH_4,0}^F} \tag{17}$$

where $n_{CH_4,0}^F$ is the inlet molar flow rate of $CH_4$ and $n_{CH_4,ex}^F$ and $n_{CH_4,ex}^P$ are the methane molar flow rates at the exit of the reactor feed and permeate sides correspondingly (mol/s). The yield of product hydrogen, defined as the fraction of moles of methane fed into the reactor that have reacted to produce hydrogen, is given by the following equation:

$$Y_{H_2} = \frac{1}{4}\frac{(n_{H_2,ex}^F - n_{H_2,0}^F) + (n_{H_2,ex}^P - n_{H_2,0}^P)}{n_{CH_4,0}^F} \tag{18}$$

where $n_{H_2,ex}^F$ and $n_{H_4,ex}^P$ are the hydrogen molar flow rates at the exit of respectively the reactor feed and permeate sides and $n_{H_2,0}^F$ and $n_{H_2,0}^P$ the $H_2$ molar flow rates potentially present at the inlet of the reactor feed and permeate sides (molls). $Y_{H_2} = 1$ when all of the methane has reacted completely to produce $CO_2$ and $H_2$. Eqns. 6-18 can be written in dimensionless form by defining the following variables and groups:

$$\tau_\alpha = (k_a)^{-1}; \quad \tau_F = \frac{\epsilon^F V_R}{A^F u_0^F}; \quad \gamma = \frac{\tau_F}{\tau_\alpha}; \quad \eta = \frac{V}{V_R}; \quad u^F = \frac{Q^F}{A^F};$$

$$u_0^F = \frac{Q_0^F}{A^F}; \quad \xi^F = \frac{u^F}{u_0^F}; \quad \xi^P = \frac{u^P}{u_0^P}; \quad \Psi^F = \frac{P^F}{P_0^F}; \quad \Psi^P = \frac{P^P}{P_0^P};$$

$$\omega = \frac{P_0^P}{P_0^F}; \quad \alpha_j = \frac{MW_j}{MW_{H_2}}; \quad x_j^F = \frac{P_j^F}{P^F}; \quad x_j^P = \frac{P_j^P}{P^P}; \quad \tau = k_a t;$$

$$\delta_j = \frac{U_j}{U_{H_2}}; \quad K_{eq1}' = \frac{K_{eq1}}{(P_0^F)^2}; \quad K_{CO}' = K_{CO} P_0^F;$$

$$K_{H_2}' = K_{H_2} P_0^F; \quad \beta_{CO_2} = b_{CO_2} P_0^F;$$

$$Da = \frac{\beta_c(1 - \epsilon_b^F)\rho_c k_1(T_0) V_R RT}{A^F u_0^F (P_0^F)^{1.5}}; \quad Pe = \frac{A^F u_0^F}{U_{H_2} V_R \alpha_m RT};$$

$$\Theta^F = \frac{\epsilon_b^F A^F D_L^F}{u_0^F V_R}; \quad \Theta^P = \frac{A^F D_L^P}{u_0^P V_R};$$

$$Ha = \frac{(1 - \beta_c)(1 - \epsilon_b^F) V_R \rho_a k_a RT m_{CO_2}}{A^F u_0^F P_0^F}; \quad \Lambda = \frac{Ha}{Da};$$

-continued $$\Omega = (Da)(Pe); \quad \Xi = 10^{-6} f^F \frac{(u_0^F)^2 MW_{H_2} V_R}{A^F g_c d_P^F RT};$$

$$\lambda = \frac{A^P u_0^P}{A^F u_0^F}; \quad \theta_{seq}^F = \frac{C_{seq}^F}{m_{CO_2}}; \quad \theta_s^F = \frac{C_s^F}{m_{CO_2}}$$

The dimensionless equations equivalent to Eqns. 7-18 are $$\gamma \frac{\partial x_j^F}{\partial \tau} = -\left(\xi^F \frac{\partial x_j^F}{\partial \eta} + x_j^F \frac{\partial \xi^F}{\partial \eta} + \frac{x_j^F \xi^F}{\Psi^F} \frac{\partial \Psi^F}{\partial \eta}\right) - \quad (19)$$

$$\frac{Da \delta_j}{\Omega}\left(x_j^F - x_j^P \omega \frac{\Psi^P}{\Psi^F}\right) + Da \frac{1}{\Psi^F} R_F^{\prime j} - Da\Lambda \frac{1}{\Psi^F} G_F^{\prime j} +$$

$$\Theta^F \frac{\partial^2 x_j^F}{\partial \eta^2} + 2\Theta^F \frac{1}{\Psi^F}\left(\frac{\partial x_j^F}{\partial \eta}\right)\left(\frac{\partial \Psi^F}{\partial \eta}\right); \quad j = 1, 2, \ldots, n-1$$

$$\frac{\partial \xi^F}{\partial \eta} = -\frac{\xi^F}{\Psi^F} \frac{\partial \Psi^F}{\partial \eta} - \quad (20)$$

$$\frac{Da}{\Omega} \sum_j \delta_j\left(x_j^F - x_j^P \omega \frac{\Psi^P}{\Psi^F}\right) + Da \frac{1}{\Psi^F} \sum_j R_F^{\prime j} - \Lambda Da \frac{1}{\Psi^F} G_{CO_2}^{\prime F}$$

$$\frac{\gamma}{\epsilon^F \lambda k} \frac{\partial x_j^P}{\partial \tau} = -\left(\xi^P \frac{\partial x_j^P}{\partial \eta} + x_j^P \frac{\partial \xi^P}{\partial \eta} + \frac{x_j^P \xi^P}{\Psi^P} \frac{\partial \Psi^P}{\partial \eta}\right) + \quad (21)$$

$$\frac{Da \delta_j}{\lambda \Omega}\left(x_j^F \frac{\Psi^F}{\omega \Psi^P} - x_j^P\right) + \Theta^P \frac{\partial^2 x_j^P}{\partial \eta^2} +$$

$$2\Theta^P \frac{1}{\Psi^P}\left(\frac{\partial x_j^P}{\partial \eta}\right)\left(\frac{\partial \Psi^P}{\partial \eta}\right); \quad j = 1, 2, \ldots, n-1$$

$$\frac{\partial \xi^P}{\partial \eta} = -\frac{\xi^P}{\Psi^P} \frac{\partial \Psi^P}{\partial \eta} + \frac{Da}{\lambda \Omega} \sum_j \delta_j\left(x_j^F \frac{\Psi^F}{\omega \Psi^P} - x_j^P\right) \quad (22)$$

$$\partial \Psi^F / \partial \eta = -\Xi (\xi^F)^2 \Psi^F \sum_j x_j^F \alpha_j \quad (23)$$

$$d\theta_s^F / d\tau = \theta_{seq}^F - \theta_s^F \quad (24)$$

$$X_{CH_4} = \frac{x_{CH_4,0}^F - \left(x_{CH_4}^F \Psi^F \xi^F\right)_{ex} + \left(x_{CH_4}^P \lambda \Psi^P \omega \xi^P\right)_{ex}}{x_{CH_4,0}^F} \quad (25)$$

$$Y_{H_2} = \frac{1}{4} \frac{\left(x_{H_2}^F \Psi^F \xi^F\right)_{ex} - x_{H_2,0}^F + \left(x_{H_2}^P \lambda \Psi^P \omega \xi^P\right)_{ex} - x_{H_2,0}^F \lambda \omega}{x_{CH_4,0}^F} \quad (26)$$

where in dimensionless form:

$$G_{CO_2}^{\prime F} = (\theta_{seq}^F - \theta_s^F) \quad (27)$$

$$\theta_{seq}^F = \frac{\beta_{CO_2} x_{CO_2}^F \Psi^F}{1 + \beta_{CO_2} x_{CO_2}^F \Psi^F} \quad (28)$$

and $R_j'$ are dimensionless forms of $R_j$, which are described by Eqns. 1-5, with the dimensionless forms of the rates $r'_1$-$r'_3$ shown in Table 3.

TABLE 3

Dimensionless Rate Expressions for the Methane-Steam-Reforming Reaction[α]

| i | reaction | rate expression |
|---|---|---|
| 1 | $CH_4 + H_2O \rightarrow CO + 3H_2$ | $r'_1 = (1/DEN^2 x_{H_2}^{2.5} \Psi^{0.5})$ $[x_{CH_4} x_{H_2O} - (P_0 \Psi)^3 (x_{H_2}^3 x_{CO}/K_{eq1})]$ |
| 2 | $CO + H_2O \rightarrow CO_2 + H_2$ | $r'_2 = (k_2/k_1)[P_0^F]^{1.5} \Psi/DEN^3 x_{H_2}]$ $[x_{CO} x_{H_2O} - x_{H_2} x_{CO_2}/K_{eq3}]$ |
| 3 | $CH_4 + 2H_2O \rightarrow CO_2 + 4H_2$ | $r'_3 = (k_3/k_1)[1/DEN^2 x_{H_2}^{3.5} \Psi^{0.5}]$ $[x_{CH_4} x_{H_2O} - (P_0\Psi)^2(x_{H_2}^4 x_{CO_2}/K_{eq3})]$ |

[α]$DEN = 1 + K'_{CO} \Psi^F x_{CO} + K'_{H_2} \Psi^F x_{H_2} + K'_{CH_4} + K_{H_2O}(x_{H_2O}/x_{H_2})$.

Eqns. 20 and 22 that express the dimensionless velocity distributions are obtained by overall mass balances in the feed and permeate sides. In the absence of substantial pressure drop in the permeate side in Eqn. 21, $\Psi^P = 1$ and $\partial \Psi^P / \partial \eta = 0$. The initial conditions at the start of the adsorption/reaction step are those prevailing during step 3 previously described. In addition, the following boundary conditions also apply:

for $\tau > 0$, at $\eta = 0$:

$$\Psi^F = 1, \quad \Psi^P = 1 \quad (29a)$$

$$\xi^F = 1; \quad \xi^P = 1 \quad (29b)$$

$$\frac{\partial x_j^F}{\partial \eta} = -\frac{1}{\Theta^F}(x_{j0}^F - x_j^F); \quad j = 1, 2, \ldots, n \quad (29c)$$

$$\frac{\partial x_j^P}{\partial \eta} = -\frac{1}{\Theta^P}(x_{j0}^P - x_j^P); \quad j = 1, 2, \ldots, n \quad (29d)$$

for $\tau > 0$, at $\eta = 1$:

$$\frac{\partial x_j^F}{\partial \eta} = 0 \quad (30a)$$

$$\frac{\partial x_j^P}{\partial \eta} = 0 \quad (30b)$$

where $s = \Sigma n_{j0}^P / \Sigma n_{j0}^F = \lambda \omega (\Sigma x_{j0}^P / \Sigma x_{j0}^F)$ is the sweep ratio for the MR.

The system of coupled nonlinear partial differential Eqns. (19)-(24) and accompanying boundary conditions has been solved in MATLAB using the method of lines (Schiesser (1991) The Numerical Method of Lines: Integration of Partial Differential Equations, Academic Press, San Diego and Vande Wouwer et al. (2004) Ind. Eng. Chem. Res. 43:3469). The system of partial differential equations was converted to a set of ordinary differential equations by discretizing the spatial derivative in the η direction using a five-point-biased upwind finite-difference scheme to approximate the convective term. A fourth-order central-difference scheme has been used to approximate the diffusive term. For finite differences, the reactor volume is divided into n sections with n+1 nodes. The initial value ordinary differential equations and other explicit algebraic equations at a time r are simultaneously solved using ode45.m, a MATLAB builtin solver for initial value problems for ordinary differential equations.

Results and Discussion

The behavior of the HAMR and AR at two temperatures (400 and 480° C.) for which experimental data for the adsorption rates were previously reported by Ding and Alpay ((2000) Chem. Eng. Sci. 55:3929 and (2000) Chem. Eng. Sci. 55:3461) is reported here. The Xu and Froment steam reforming kinetics were used previously at temperatures as low as 450° C. (Xiu et al. (2004) Chem. Eng. Res. Des. 82:192, Xiu et al. (2003) Chem. Eng. J. (Amsterdam, Neth.) 95:83, Xiu et al. (2003) Chem. Eng. Sci. 58:3425, Xiu et al. (2002) AIChE J. 48:81, Xiu et al. (2002) Chem. Eng. Sci. 57:3893, Ding and Alpay (2000) Chem. Eng. Sci. 55:3929, Ding and Alpay (2000) Chem. Eng. Sci. 55:3461, Chen and Elnashaie (2004) Ind. Eng. Chem. Res. 43:544, Prasad and Elnashaie (2004) Ind. Eng. Chem. Res. 43:494, Prasad and Elnashaie (2003) Ind. Eng. Chem. Res. 42:4715, and Chen et al. (2003) Chem. Eng. Sci. 58:4335). Previously, it was also showed the same kinetics to be consistent with experimental data generated with a commercial Ni-based catalyst at temperatures as low as 450° C. (Vasileiadis (1994) Catalytic Ceramic Membrane Reactors for the Methane-Steam Reforming Reaction: Experiments and Simulation, Ph.D. Thesis, University of Southern California, Los Angeles, Calif.). The applicability of these kinetics at temperatures lower than 450° C. still remained to be proven, however.

Figure 36:
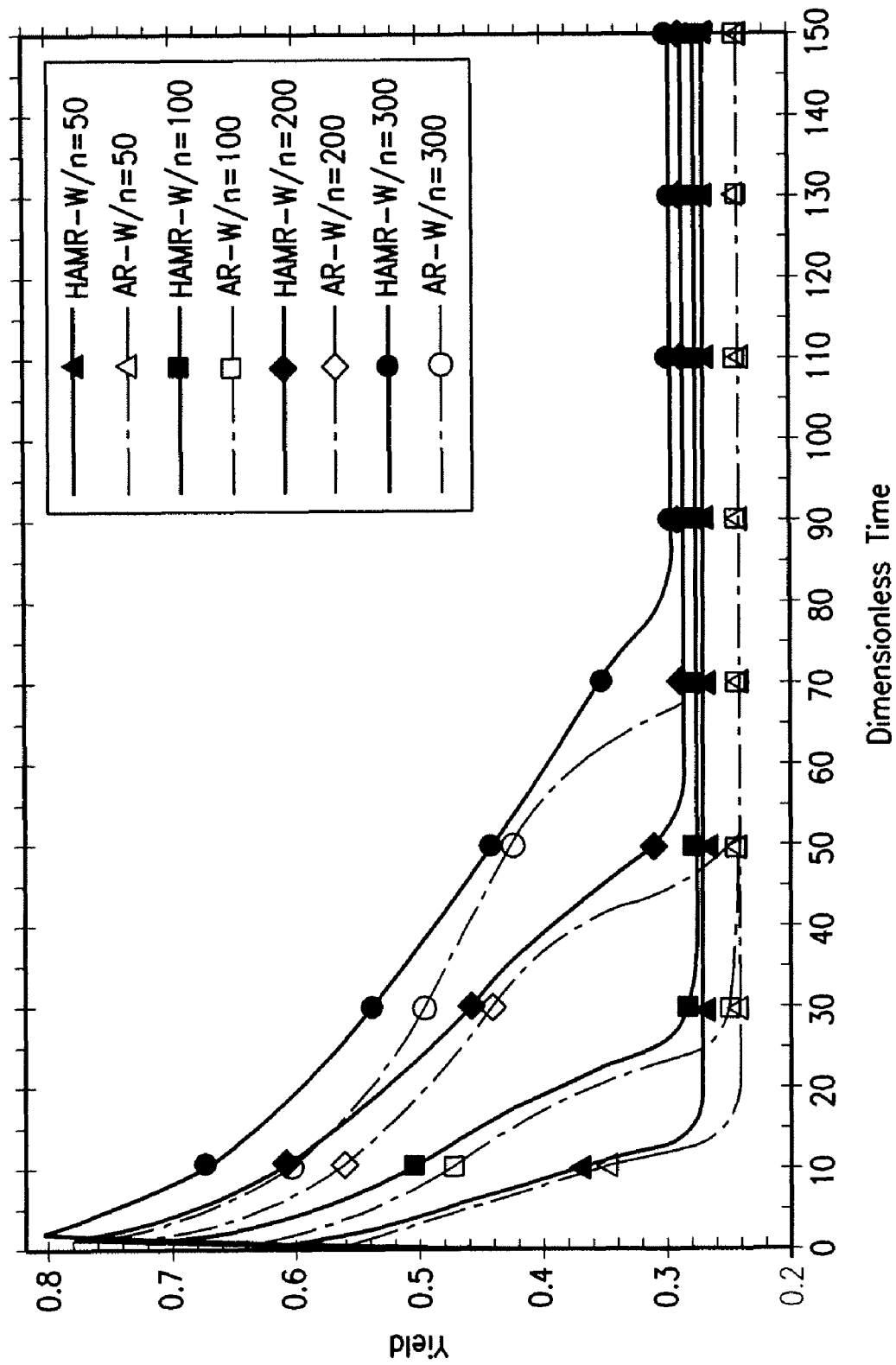
FIG. 36 shows $H_2$ yield for HAMR and AR systems for different $W_c/n_{CH_4,0}^F$.

FIG. 36 shows the hydrogen yield attained by both the ARs and HAMRs as a function of dimensionless time X for different values of $W_c/n_{CH_4,0}^F$ ($W_c$ is the total weight of the catalyst). The reactor temperature was 480° C., and a $CH_4/H_2O/H_2$ feed ratio of 1:3:0.1 was utilized. Steam was used as the sweep gas. The adsorption rates and constants were taken directly from Ding and Alpay ((2000) Chem. Eng. Sci. 55:3461), the reaction rate constants were from Xu and Froment ((1989) AIChE J. 35:88), and the membrane permeances were the experimental values measured with one of the SiC membranes. Table 4 lists the values of all of the other parameters utilized ($\lambda$, $\beta_c$, $\omega$, $V_R/A^F$, s, $P_0^F$, etc.). Initially, the hydrogen yield for both reactors reached high values, but it declined as the adsorbent became saturated and leveled off at the corresponding values for the conventional membrane (in the case of HAMR) or the plug-flow reactor (in the case of AR). The HAMR performed significantly better than the AR. For the conditions in FIG. 36, the catalyst was sufficiently active that the plug-flow reactor yields (the AR yields leveled off at these values) approached equilibrium (~24.2% under the prevailing conditions) for all of the four $W_c/n_{CH_4,0}^F$ values utilized. On the other hand, the yields for the AR and HAMR systems (prior to the adsorbent saturation) and the MR yields (the HAMR yields leveled off at these yields) strongly depended on $W_c/n_{CH_4,0}^F$ increasing as $W_c/n_{CH_4,0}^F$ increased, as expected.

TABLE 4

Parameter Values Used in Simulations

| parameter | value | dimension |
|---|---|---|
| $b_{CO_2}$ | 1.93 × 10¹ | bar⁻¹ |
| $d_p^F$ | 1.00 × 10⁻³ | m |
| Da | 2.62 | — (base case) |
| Ha | 7.01 | — (base case) |
| k | 2.00 | — |
| $m_{CO_2}$ | 5.80 × 10⁻¹ | mol/kg |
| Pe | 5.80 × 10⁻¹ | — (base case) |
| $P_0^F$ | 3.00 | bar |
| $P_0^P$ | 2.00 | bar |
| s | 1.00 × 10⁻¹ | — (base case) |
| T | 4.80 × 10² | ° C. (base case) |
| $u_0^F$ | 4.06 × 10⁻² | m/s |
| $u_0^P$ | 1.22 × 10⁻² | m/s |
| $U_{H_2}$ | 1.54 × 10⁻² | mol/m² · s · bar |
| $V_R/A^F$ | 2.54 × 10⁻¹ | m |
| $\alpha_m$ | 2.86 × 10² | m²/m³ |
| $\beta_c$ | 5.00 × 10⁻¹ | — |
| $\beta_{CO_2}$ | 1.93 × 10¹ | — |
| $\gamma$ | 2.80 × 10⁻¹ | — |
| $\delta_1$ | 1.00 | — |

TABLE 4-continued

Parameter Values Used in Simulations

| parameter | value | dimension |
|---|---|---|
| $\delta_2$ | 2.80 × 10⁻³ | — |
| $\delta_3$ | 2.10 × 10⁻¹ | — |
| $\delta_4$ | 3.55 × 10⁻¹ | — |
| $\epsilon^F$ | 4.00 × 10⁻¹ | — |
| $\Lambda$ | 2.67 | — |
| $\lambda$ | 5.00 × 10⁻¹ | — |
| $\mu^F$ | 2.87 × 10⁻⁵ | Pa · s |
| $\tau_F$ | 2.50 | — |
| $\tau_\alpha$ | 1.00 × 10¹ | — |
| $\Omega$ | 1.54 | — |
| $\omega$ | 6.60 × 10⁻¹ | — |

Figure 37:
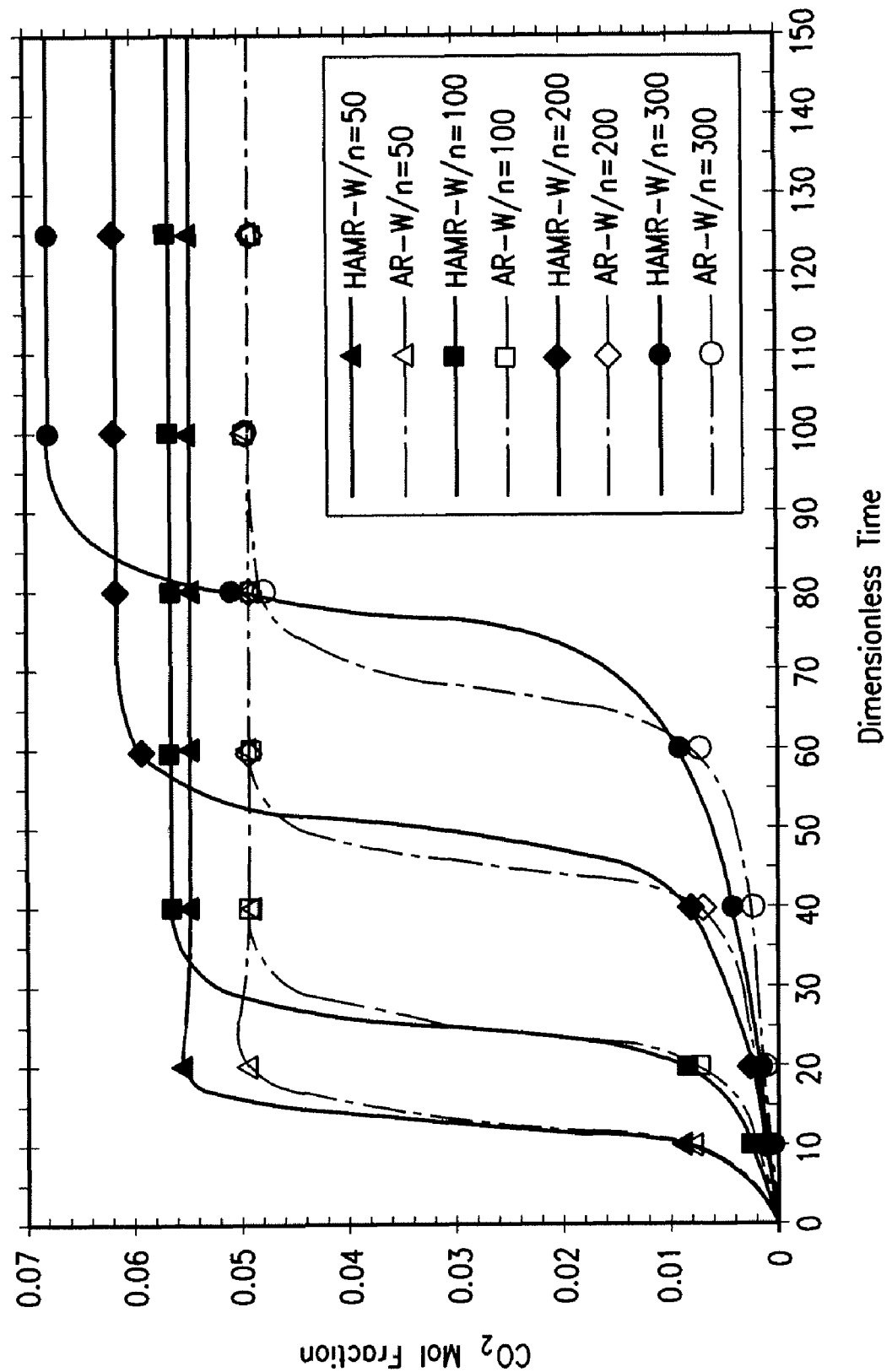
FIG. 37 shows $CO_2$ concentration (wet basis) profiles at the reactor outlet for AR and HAMR systems at different $W_c/n_{CH_4,0}^F$.
Figure 38:
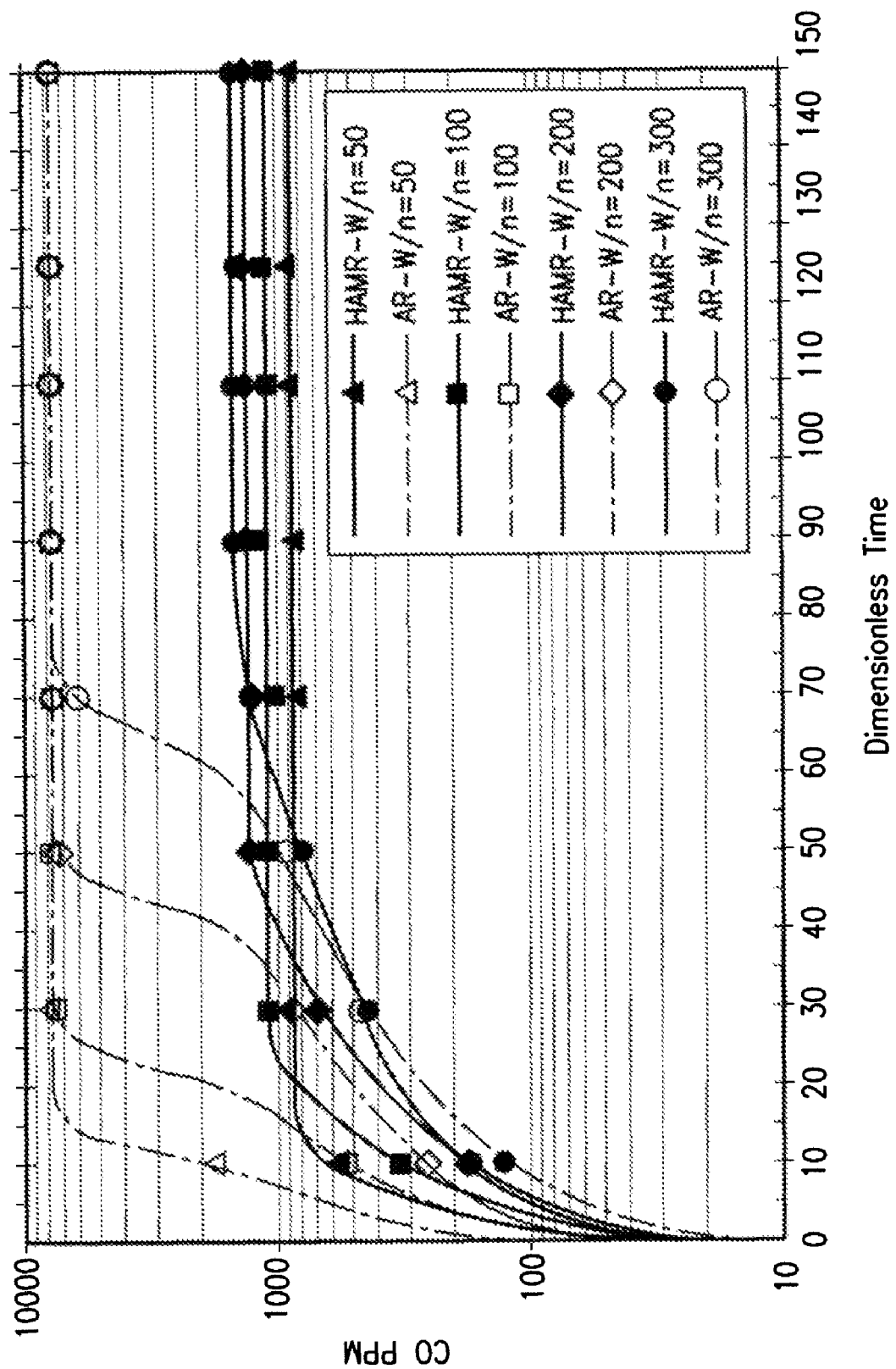
FIG. 38 shows CO concentration (wet basis, in ppm) profiles in the HAMR permeate side exit and AR exit for different $W_c/n_{CH_4,0}^F$.

FIG. 37 shows the $CO_2$ feed side exit concentration (wet basis) profiles for the HAMR and AR. Low concentrations were observed while the adsorbent remained unsaturated; the concentrations sharply increased, however, after the adsorbent was saturated. FIG. 38 shows the CO concentration (wet basis) profiles in the permeate side exit of the HAMR, together with the corresponding exit concentration values for the AR. Clear from FIG. 38 is the advantage that the HAMR system provided in terms of reduced CO concentrations in the hydrogen product over the AR system, in addition to improved hydrogen yields.

Figure 39:
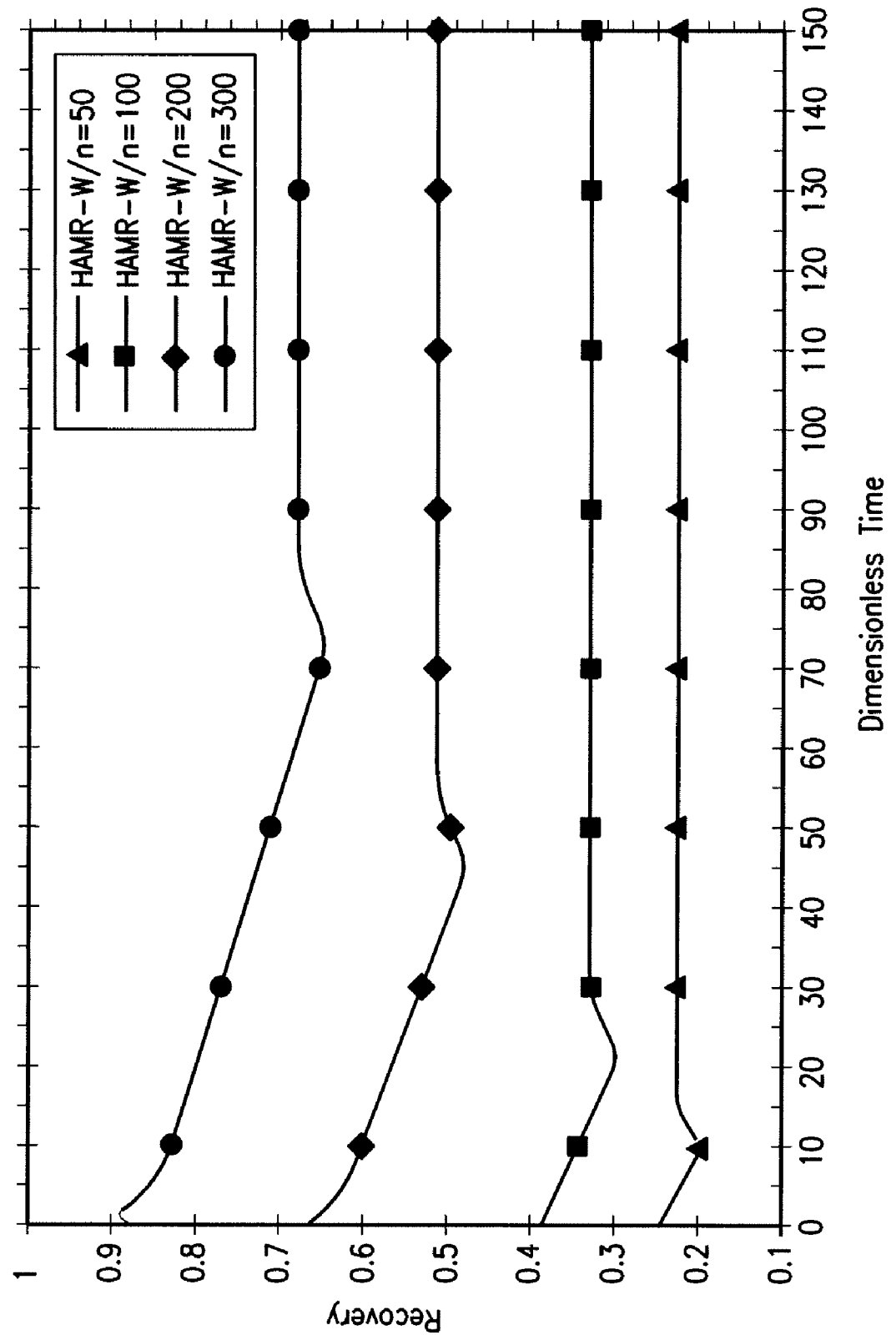
FIG. 39 shows hydrogen recovery for an HAMR system at different $W_c/n_{CH_4,0}^F$.

A potential disadvantage of the HAMR system, when compared to the AR system, is that only a fraction of the hydrogen product ended up in the permeate stream, while the rest remained mixed with the unreacted $CH_4$ and the CO and $CO_2$ products in the feed side stream. FIG. 39 shows the hydrogen recovery rate, which is defined as the fraction of the total hydrogen that is produced in the HAMR that ends up in the permeate stream, that is, the hydrogen molar flow in the permeate side divided by the total hydrogen molar flow (feed side plus permeate side). The increase in the hydrogen recovery, shown in FIG. 39, coincided with the $CO_2$ breakthrough, which resulted in a sharp decrease in the molar flow of hydrogen in the feed side (less hydrogen was produced there because the adsorbent no longer removed the $CO_2$ produced). Because the total hydrogen molar flow rate also declined, hydrogen recovery increased and finally leveled off at the corresponding steady state (AR or MR) levels. The hydrogen recovery is, of course, a strong function of the membrane permeation characteristics and the other operating conditions in the reactor, increasing with increasing membrane permeance and feed side pressure. Furthermore, it must be also taken into account, when comparing both reactors, that even for the AR system, the hydrogen must be eventually separated out of the exit stream and that similar hydrogen losses are likely to occur.

Figure 40:
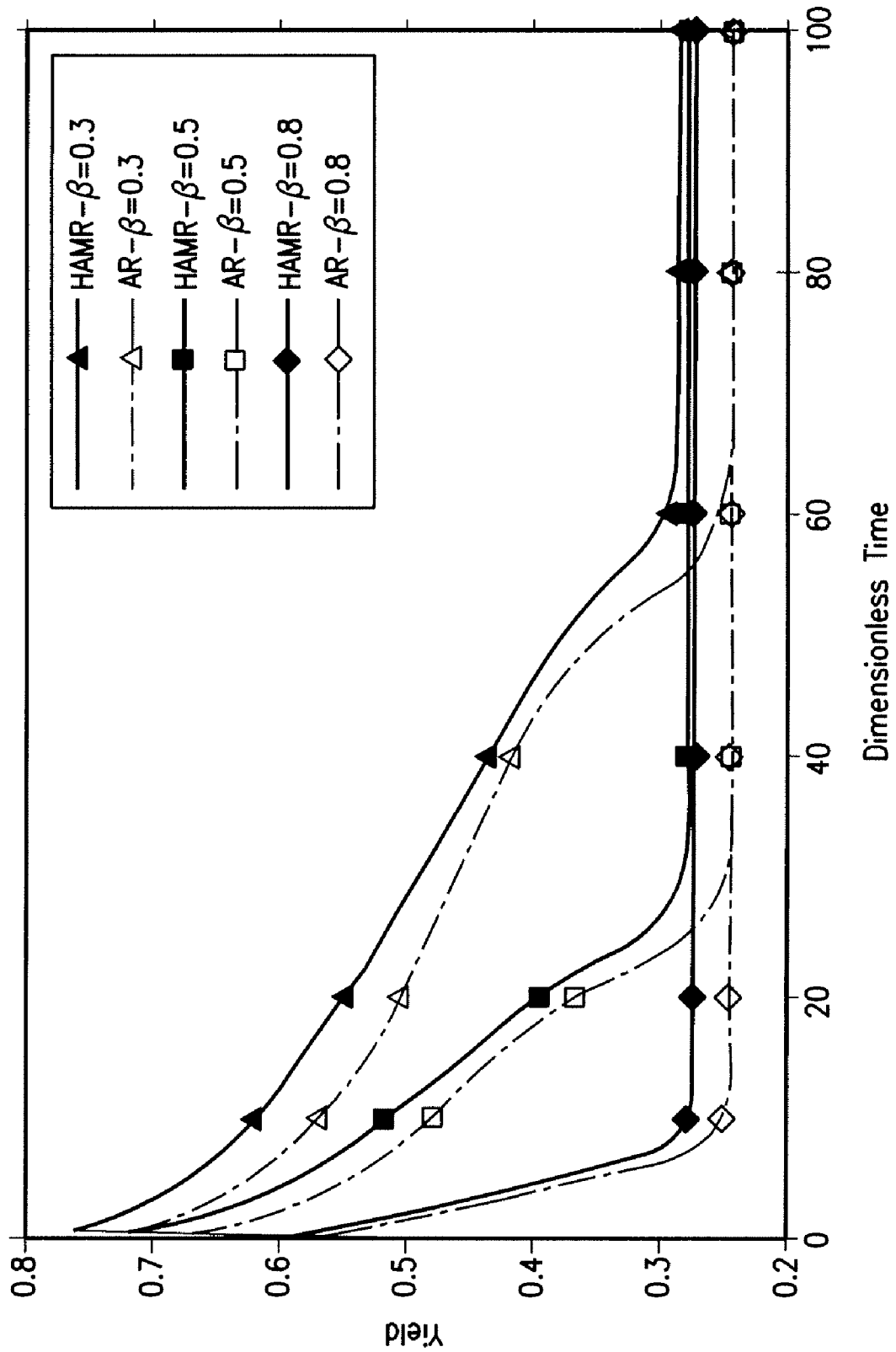
FIG. 40 shows effect of $\beta_c$ on hydrogen yield for HAMR and AR systems.
Figure 41:
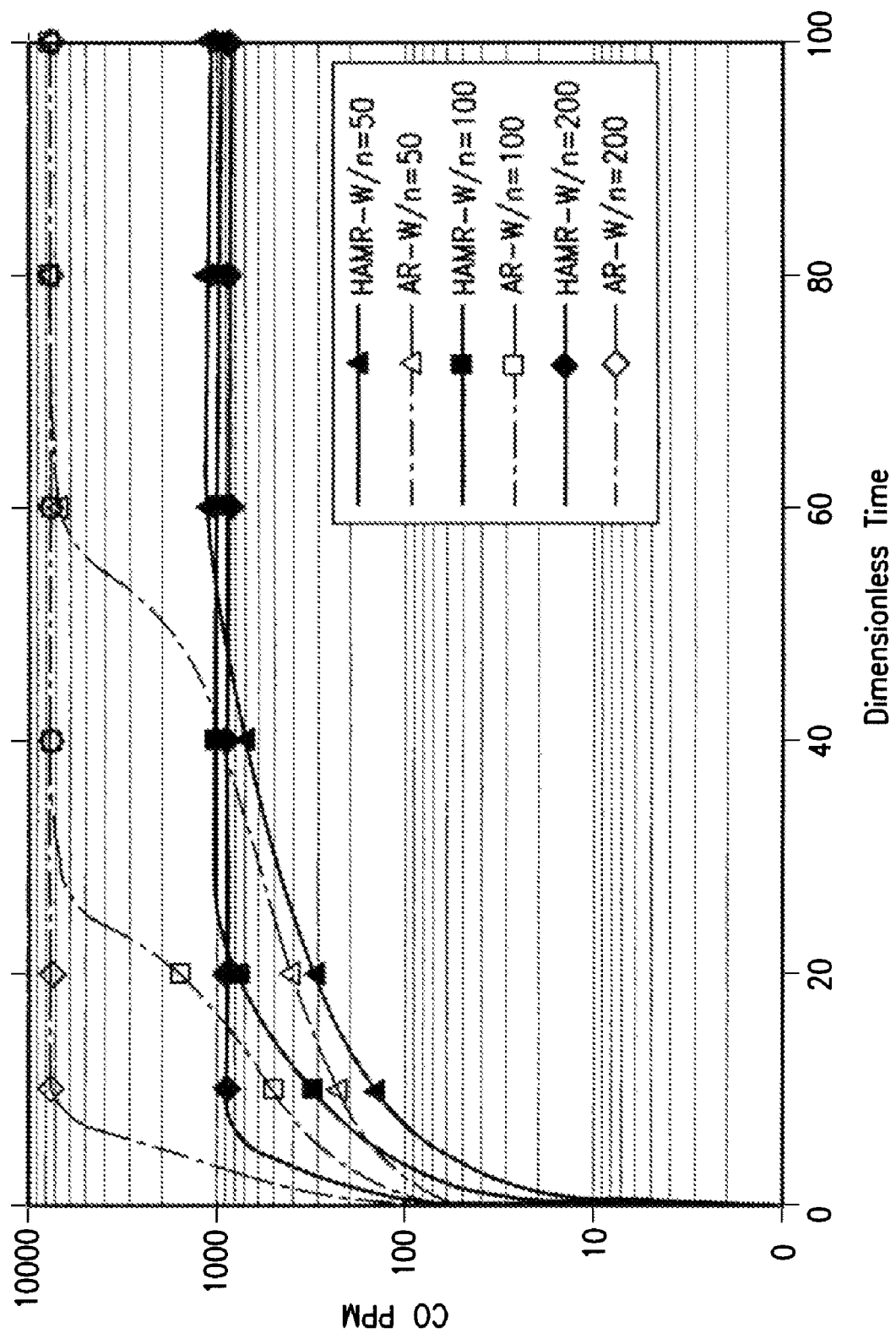
FIG. 41 shows effect of $\beta_c$ on CO exit concentration (wet basis, in ppm) for HAMR (permeate) and AR systems.

FIG. 40 shows the effect of $\beta_c$ (the fraction of reactor volume occupied by catalyst) on the hydrogen yields, while keeping the total volume occupied by the solids and the $W^c/n_{CH_4,0}^F$ constant. Decreasing $\beta_c$ (i.e., increasing the fraction of sorbent present), while maintaining $W_c/n_{CH_4,0}^F$ constant, had a significant beneficial effect on the hydrogen yield and also on the product purity for both the HAMR and AR systems (see FIG. 41 for the CO content of the hydrogen product).

Figure 42:
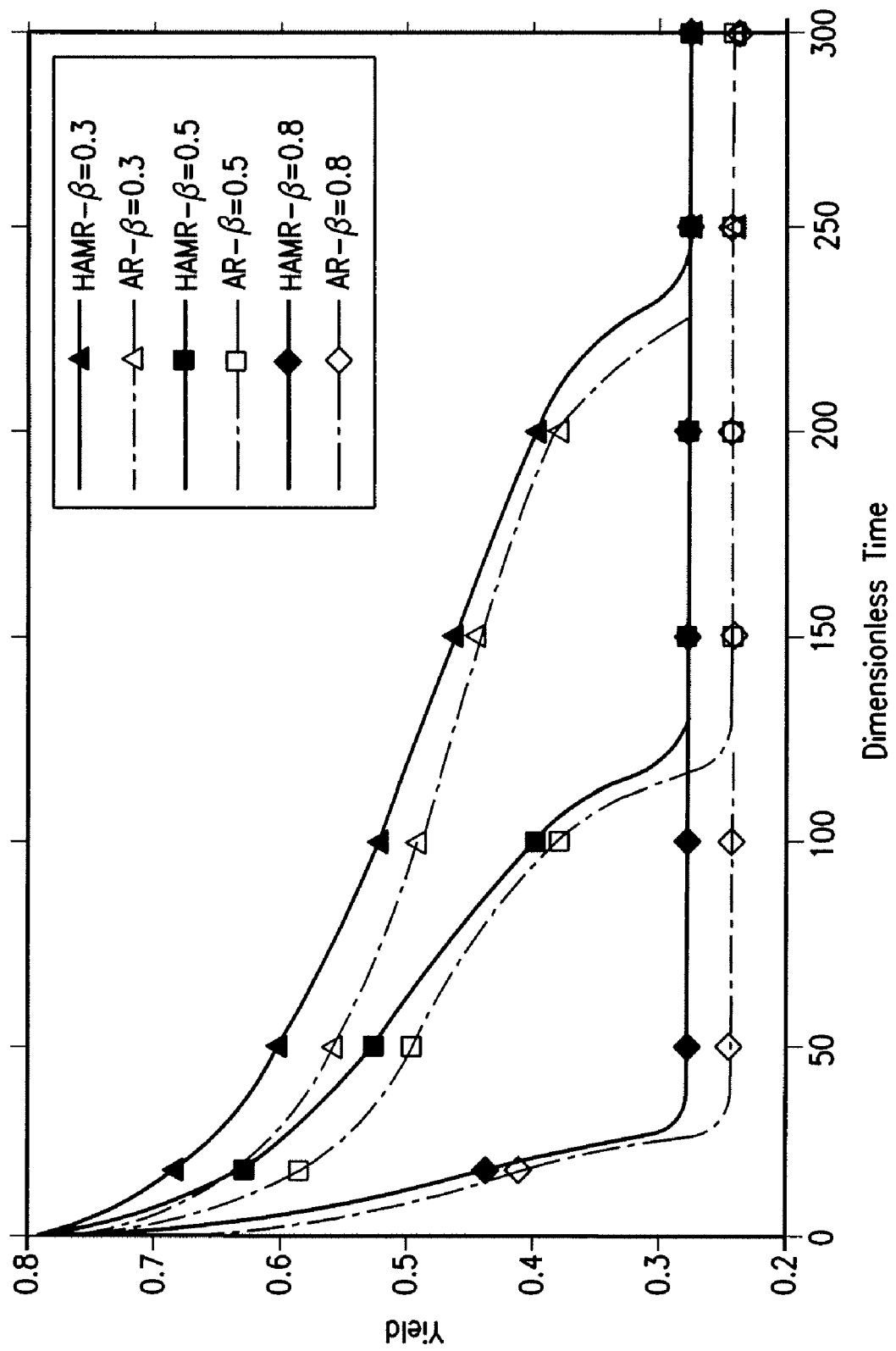
FIG. 42 shows effect of $\Lambda$ on hydrogen yield.

The effect of using an adsorbent with improved characteristics is shown in FIG. 42. The hydrogen yields for the HAMR and AR systems were compared for three values of $\Lambda$, one corresponding to the adsorbent of Ding and Alpay ((2000) Chem. Eng. Sci. 55:3461) (for the reactor temperature and pressure conditions utilized, this corresponds to $\Lambda$=2.67) and two other cases with corresponding A values 5 and 10 times larger. A more effective adsorbent significantly expanded the "time window" of operation for both the AR and HAMR systems before regeneration must commence. It also significantly increased the hydrogen yields attained.

Figure 43:
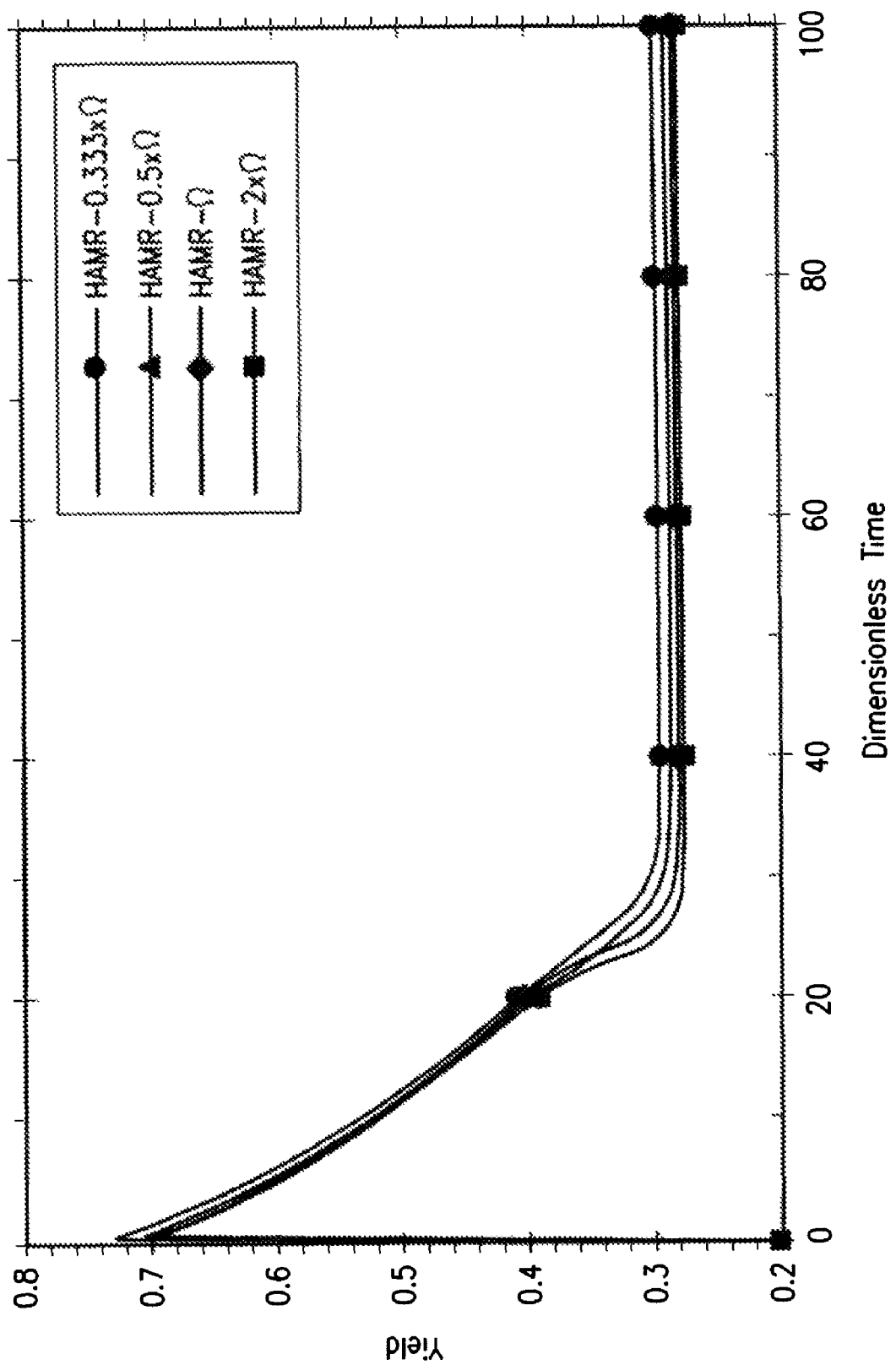
FIG. 43 shows effect of $\Omega$ on hydrogen yield.
Figure 44:
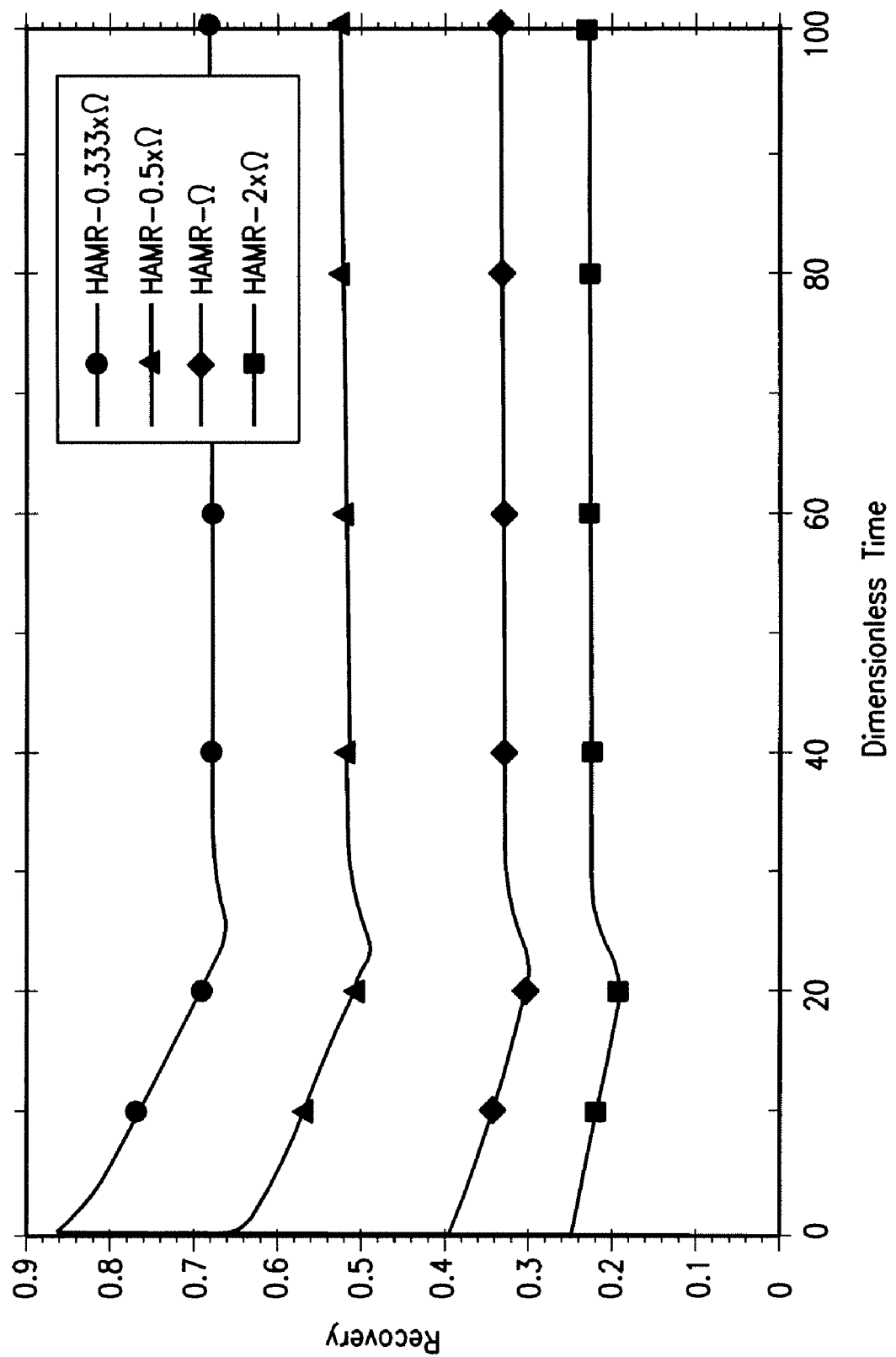
FIG. 44 shows effect of $\Omega$ on hydrogen recovery.
Figure 45:
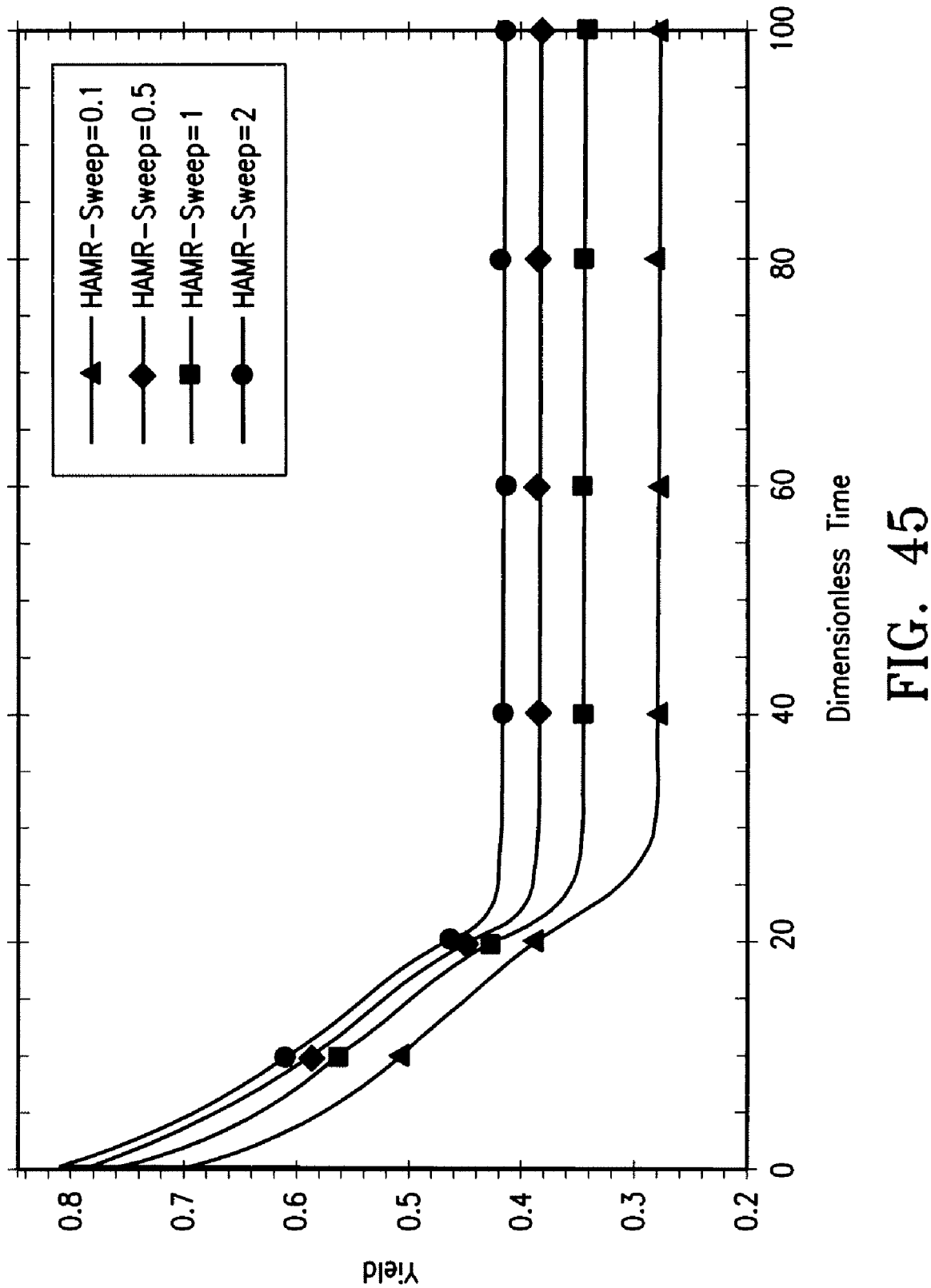
FIG. 45 shows effect of sweep ratio on hydrogen yield.
Figure 46:
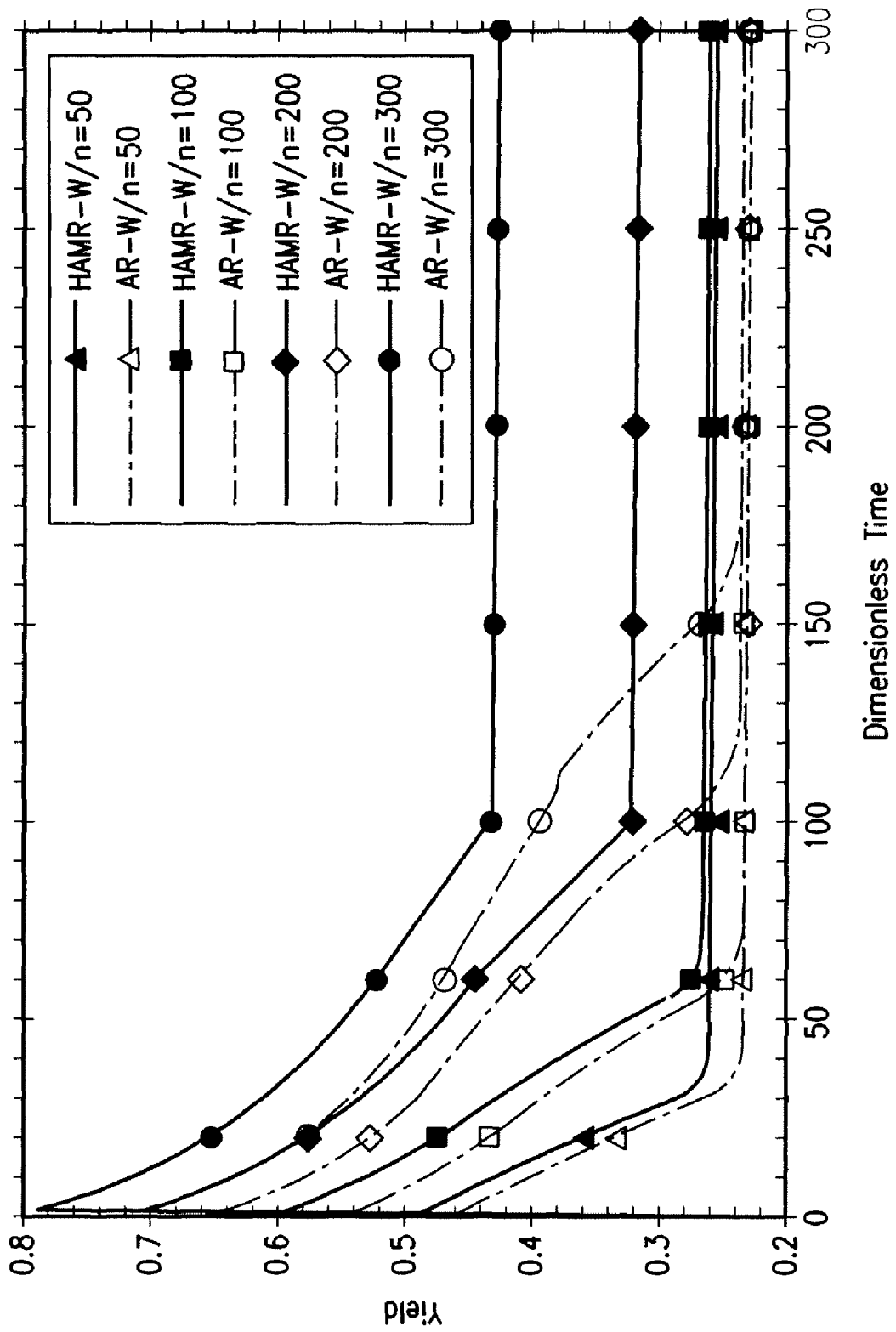
FIG. 46 shows hydrogen yield at 400° C.
Figure 47:
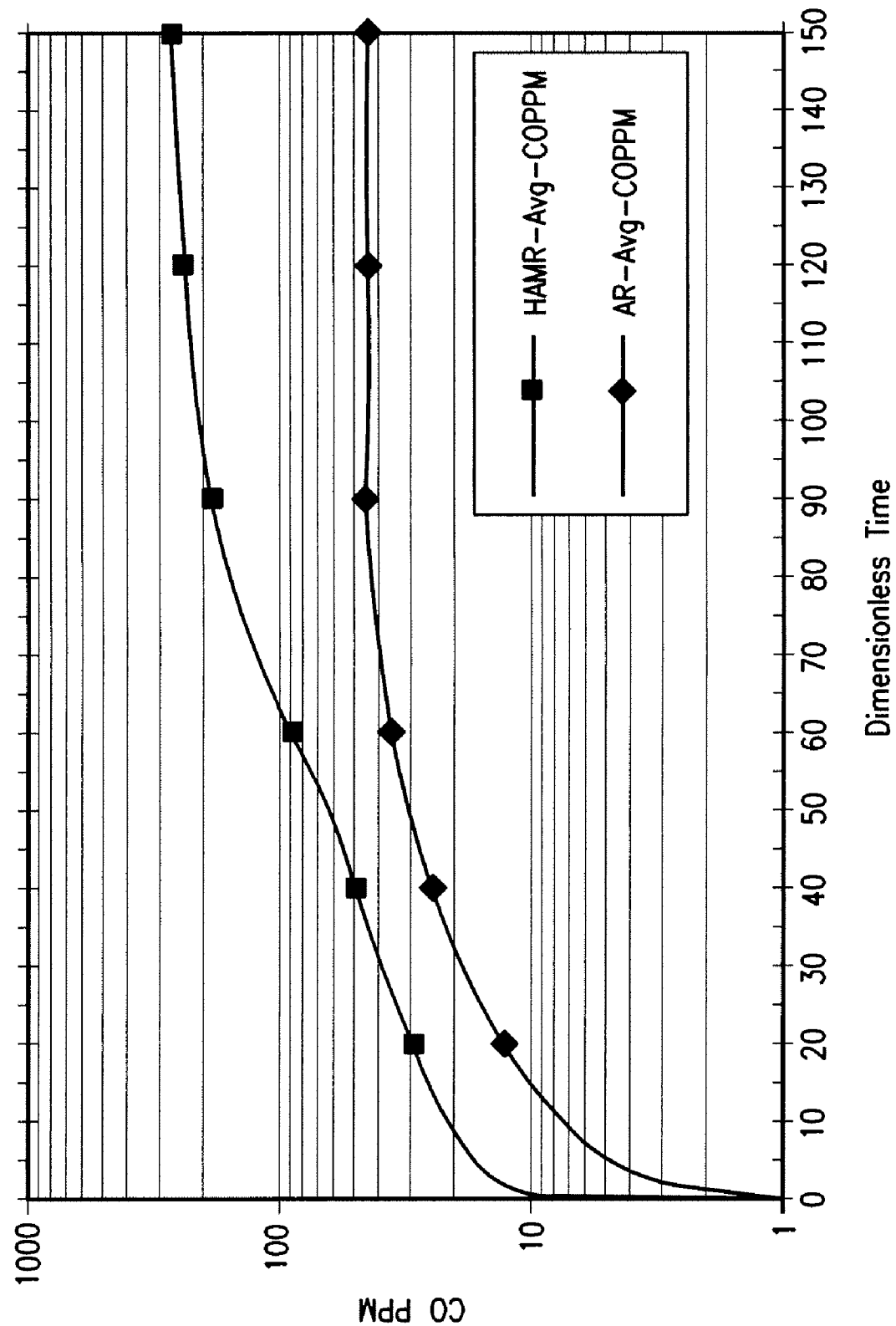
FIG. 47 shows time-averaged CO concentration (wet basis, in ppm) at 400° C. for HAMR and AR systems.

The effect of membrane transport characteristics is shown in FIG. 43, where the reactor yields corresponding to four different membranes (i.e., four different values of Ω) are shown. For the SiC membrane used in the simulations, Ω=1.54. The other three membranes had Ω values that were 0.333, 0.5, and 2 times the base Ω value (because Ω is inversely proportional to permeance, these Ω values corresponded to permeances that were 3, 2, and 0.5 times that of the base case corresponding to Ω=1.54). The HAMR system hydrogen yields did benefit from increased hydrogen permeance, but the effect saturated beyond a certain value. FIG. 44 shows the effect that Ω has on hydrogen recovery. As expected, increasing the hydrogen permeance had a very beneficial effect on hydrogen recovery, with very high hydrogen recoveries (~87%) attained for 0.333 times the base case Ω. FIG. 45 shows the effect of the sweep ratio on the hydrogen yield of the HAMR system. Increasing the sweep ratio improved the reactor performance; however, the effect saturated quickly, as shown in FIG. 45. FIGS. 46 and 47 show the behavior of the two systems at 400° C. FIG. 46 shows the hydrogen yield, while FIG. 47 presents the time-averaged CO (wet basis, in ppm) content for both the HAMR and AR systems. The average CO purity, (yco), at the given operating time $t_1$ is calculated by:

$$\langle y_{CO} \rangle = \frac{\int_0^{t_1} \left(\frac{Pu^P y_{CO}}{RT}\right)_{outlet} dt}{\int_0^{t_1} \left(\frac{Pu^P}{RT}\right)_{outlet} dt} \text{ for } HAMR;$$

$$\langle y_{CO} \rangle = \frac{\int_0^{t_1} \left(\frac{Pu y_{CO}}{RT}\right)_{outlet} dt}{\int_0^{t_1} \left(\frac{Pu}{RT}\right)_{outlet} dt} \text{ for } AR$$

The conditions in the figure were such that for a good fraction of the adsorption/reaction cycle for the HAMR system, the CO content in the hydrogen product stayed below 50 ppm (140 ppm on a dry basis).

Conclusions

A novel reactor system, termed HAMR, for hydrogen production through methane steam reforming was investigated. The HAMR combines the reaction and membrane separation steps with adsorption on the membrane feed or permeate sides. The HAMR system is of potential interest to pure hydrogen production for PEM fuel cells for various mobile and stationary applications. The reactor characteristics have been investigated for a range of temperature, pressure, and other experimental conditions relevant to the aforementioned applications and compared with the behavior of the traditional packed bed reactor, the conventional MR, and an AR. The HAMR outperformed all of the other more conventional reactor systems. It exhibited enhanced methane conversion, hydrogen yield, and product purity and showed good promise for reducing the hostile operating conditions of conventional methane steam reformers and for meeting the product purity requirements for PEM operation. The performance of the HAMR system depended on the various operating parameters, including the reactor space time, the temperature, and the membrane and adsorbent properties. Use of more effective adsorbents, for example, resulted in increased yields and longer operational windows. More highly permeable membranes also increased the reactor yield but, more importantly, also increased the hydrogen recovery ratio. One of the key advantages of the HAMR system over the corresponding AR system (in addition to improvements in yield) is its ability to deliver a product with a significantly lower CO content through the use of membranes, which preferentially allow the permeation of the hydrogen while excluding CO and other reactants and products. This may be the primary reason for adopting such reactors for fuel cell application, where a CO-free product is at a premium.

Similar to that for the ARs, HAMR requires regeneration of the spent adsorbent and, for continuous operation, they may require a dual reactor system, where one of the reactors is in operation while the other reactor is being regenerated.

Example IV

Figure 48:
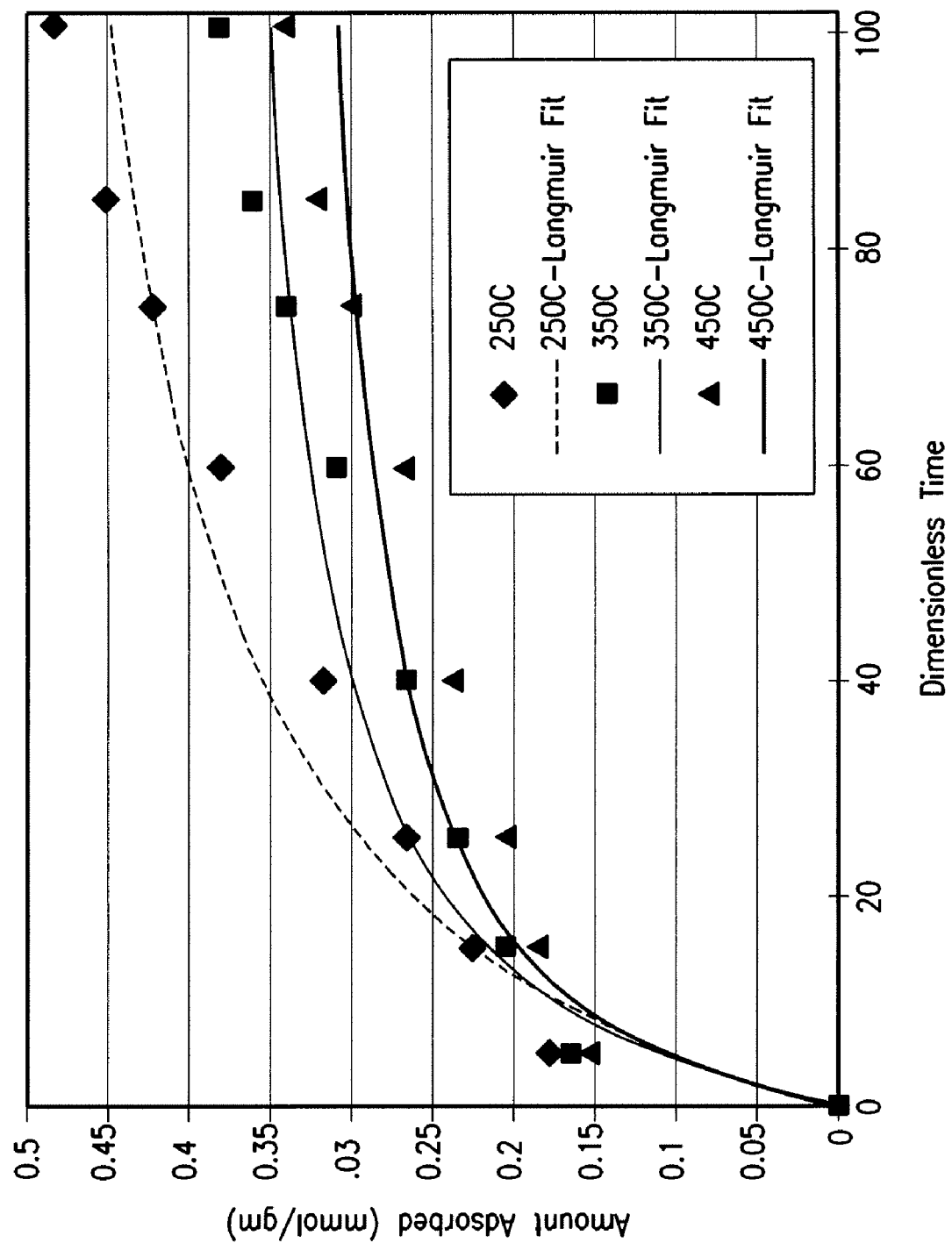
FIG. 48 shows $CO_2$ isotherms and Langmuir fitting.

The adsorption equilibrium capacity and rate for the $CO_2$ affinity adsorbent, hydrotalcite, used in this study were experimentally determined. The lab scale adsorption isotherm study was performed using a gravimetric technique. The adsorption isotherms for $CO_2$ on hydrotalcite at 250-450° C. were determined by measuring the $CO_2$ uptake data. The experimental data were then fitted with the Langmuir adsorption isotherm as presented in FIG. 48. Table 5 shows the Langmuir parameters obtained by fitting the adsorption data for various temperatures. The transient $CO_2$ uptake data were measured at each elevated temperature, and then the diffusion coefficients were estimated by fitting acquired experimental data to the solution of the relevant diffusion equation. Table 6 gives the diffusivity data obtained by fitting the experimental data to the diffusion equation for the temperatures studied.

TABLE 5

Langmuir Fitting Parameters.
Diffusivity

| Temperature, ° C. | $m_{CO2}$, mmol/g sample | $b_{CO2}$, kPa$^{-1}$ |
|---|---|---|
| 250 | 0.534 | 0.05 |
| 350 | 0.387 | 0.088 |
| 450 | 0.337 | 0.099 |

TABLE 6

Hydrotalcite Data

| Temperature, ° C. | D/r$^2$, s$^{-1}$ |
|---|---|
| 250 | 9.52 × 10$^{-4}$ |
| 350 | 3.42 × 10$^{-4}$ |
| 450 | 6.00 × 10$^{-4}$ |

Figure 49:
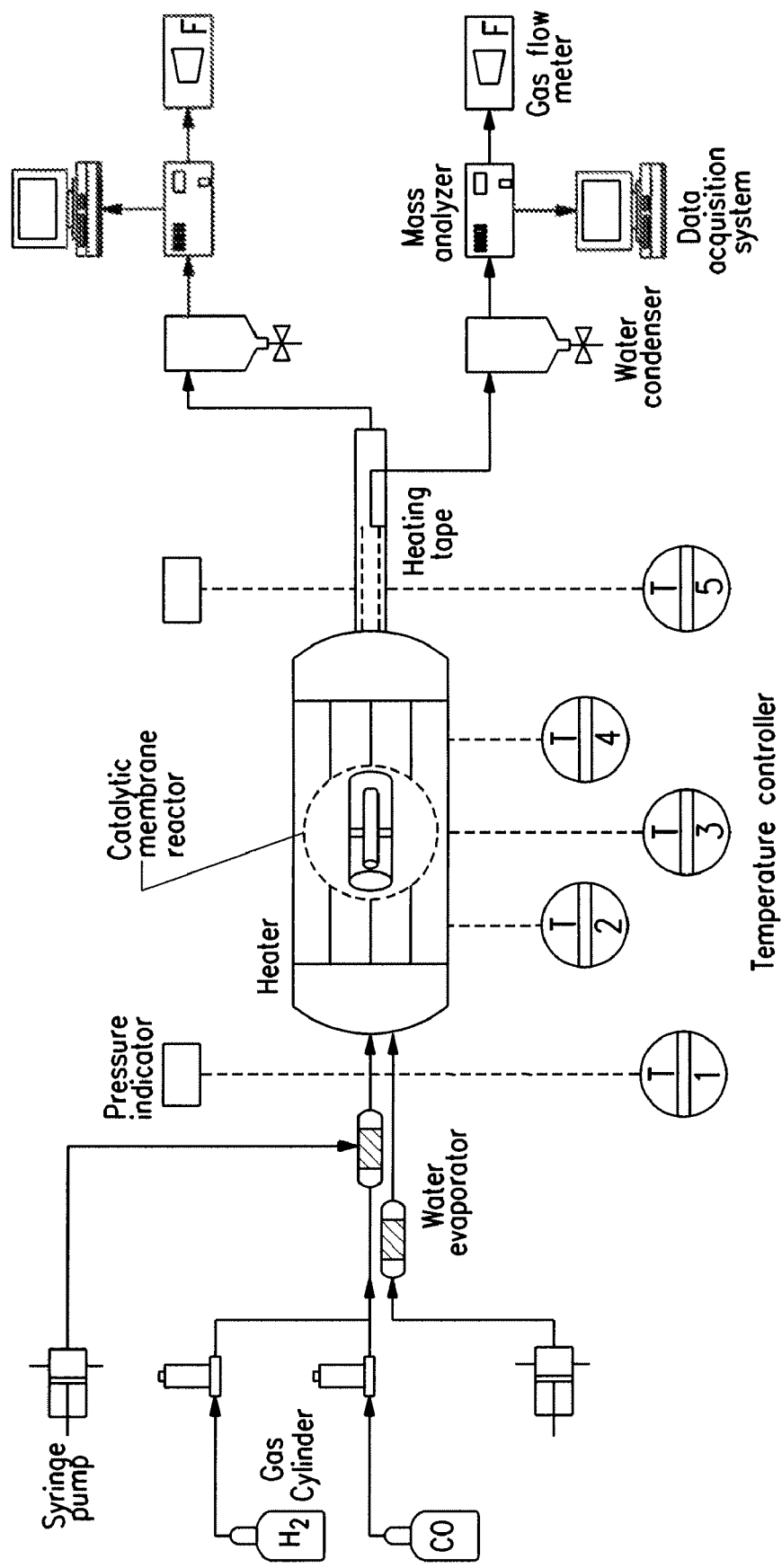
FIG. 49 shows an experimental set-up.
Figure 50:
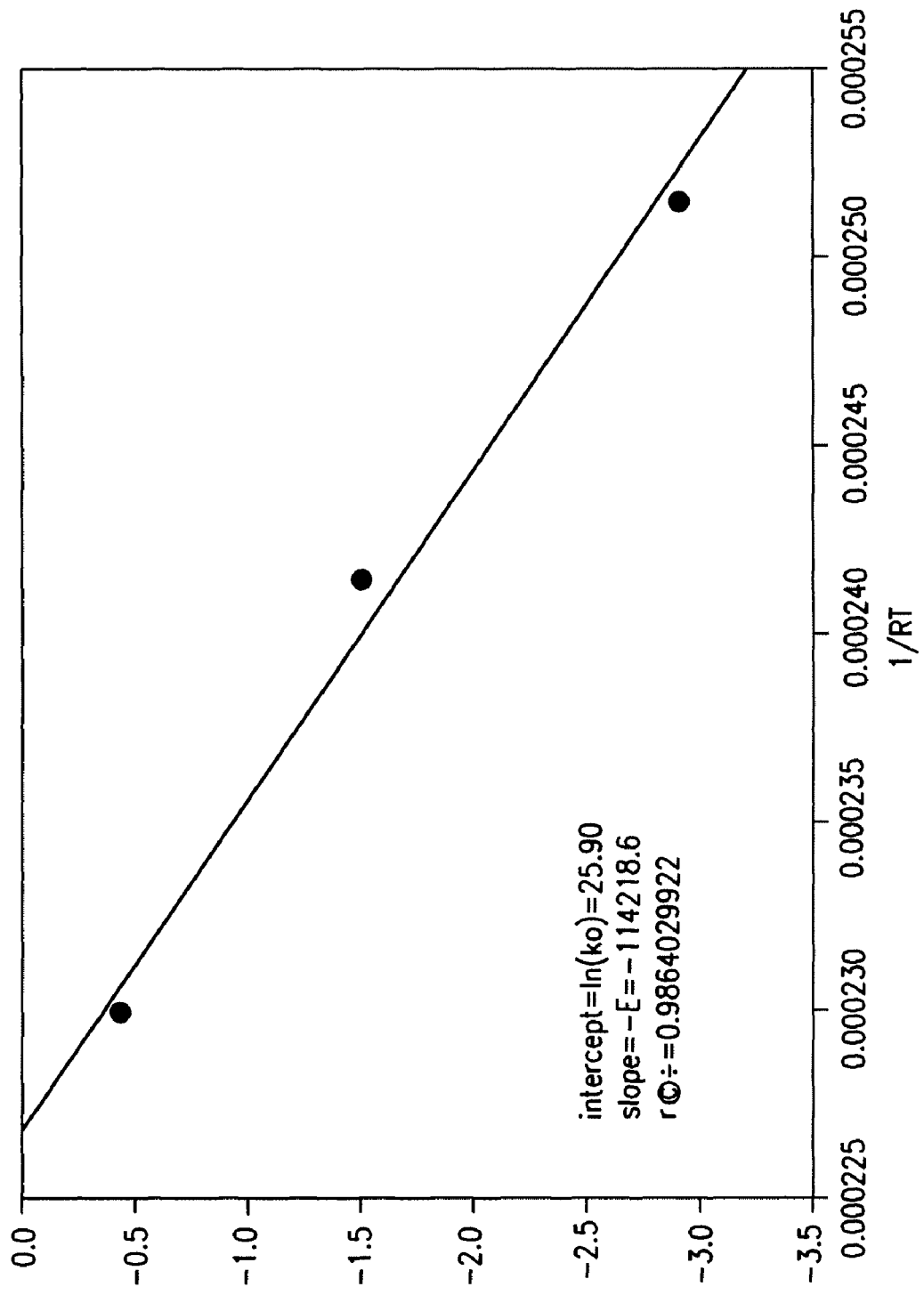
FIG. 50 is an activation energy plot.

Kinetic constants for WGS reaction are critical input parameters for the performance simulation of the HAMR. A laboratory scale reactor system was established as shown in FIG. 49 to study the reaction kinetics, which was then employed for the HAMR study. Synthetic feed was prepared from pure gas cylinders with mass flow controllers. The reactor temperature was kept at the target temperature within a constant temperature box. The effluent from the reactor was analyzed with a mass spectrometer after water dropout via condensation.

Three different temperatures were selected, i.e., 205, 225 and 250° C., which covered the temperature range recommended by the catalyst manufacturer for the low temperature shift catalyst. Pressure of the reactor was kept at ~50 psig. The feed composition selected for this study was $CO:H_2:H_2O=1.0:4.0:1.1$. W/Fo selected ranged from ~30 to as high as ~467, which spanned a wide operating condition for obtaining representative kinetic parameters. The reaction rate constants obtained experimentally were then used to determine the pre-exponential factor and the activation energy required. The pre-exponential factor and the activation energy determined based upon the operating condition are listed in Table 7. These kinetic parameters were used in the mathematical simulation.

TABLE 7

Reaction Rate and Kinetic Parameters for WGS.

| | |
|---|---|
| ko<br>g – mol/(g cat * hr * bar^0.4) | 1.77E+11 |
| E (kJ/mol) | 114.22 |

$$r = A \cdot \exp(-E_a/RT) \cdot \frac{P_{CO} \cdot P_{H_2O}^{1.4}}{P_{CO_2}^{0.7} \cdot P_{H_2}^{0.9}} \frac{1}{P_T^{0.4}} (1-\beta)$$

Figure 51:
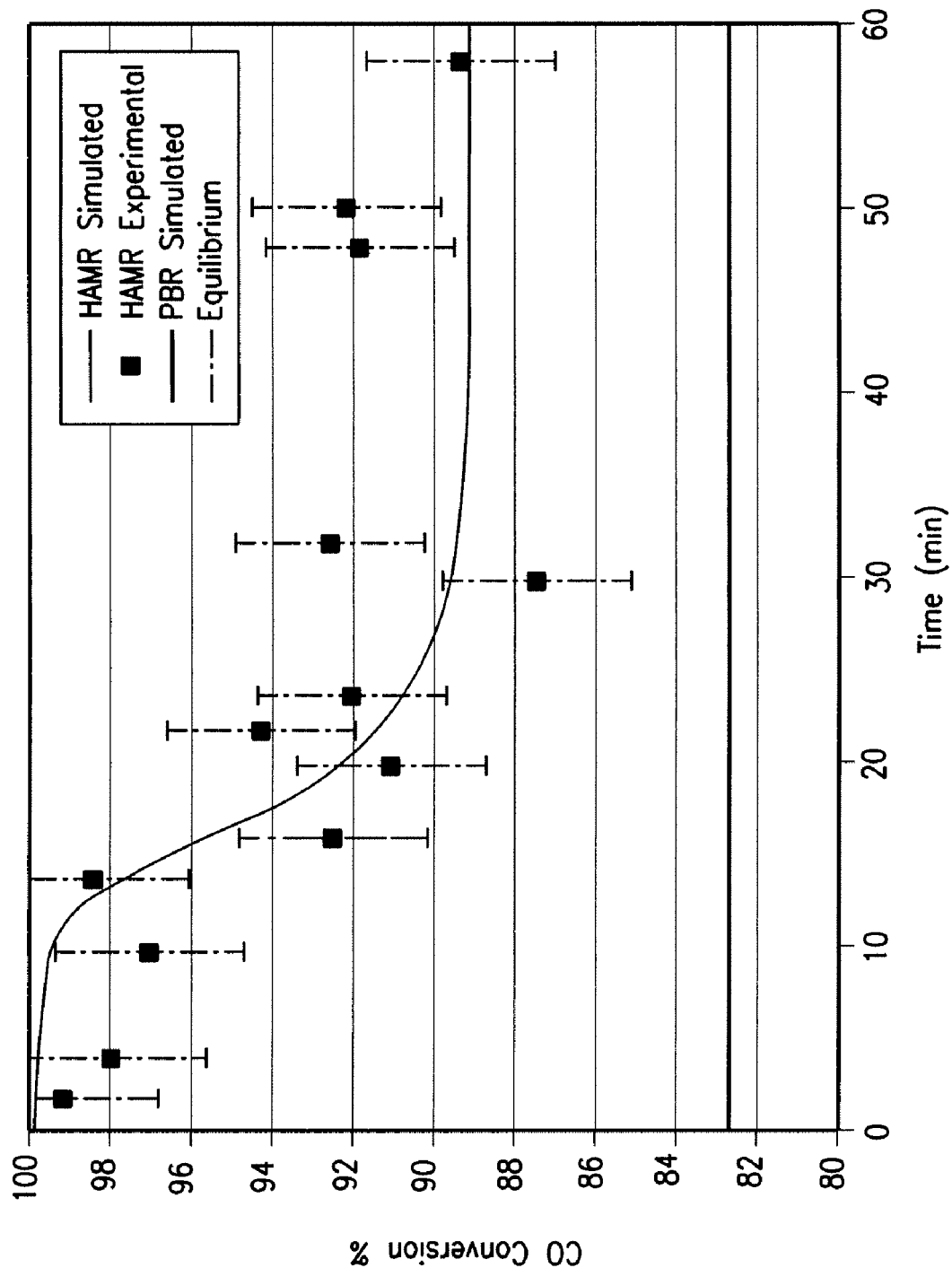
FIG. 51 shows CO conversion vs time (W/F=300).
Figure 52:
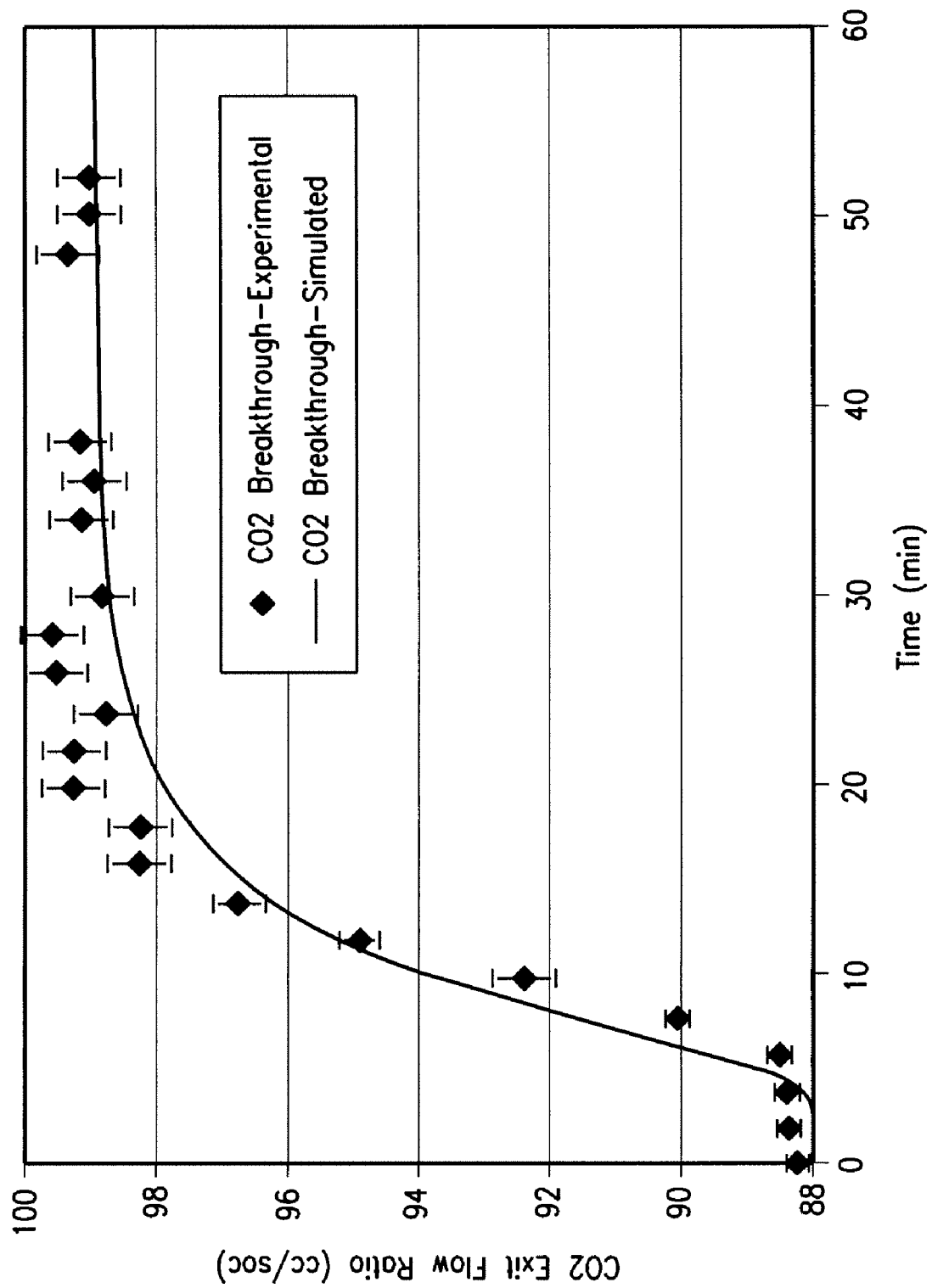
FIG. 52 shows $CO_2$ exit flow rate vs time (W/F=300).
Figure 53:
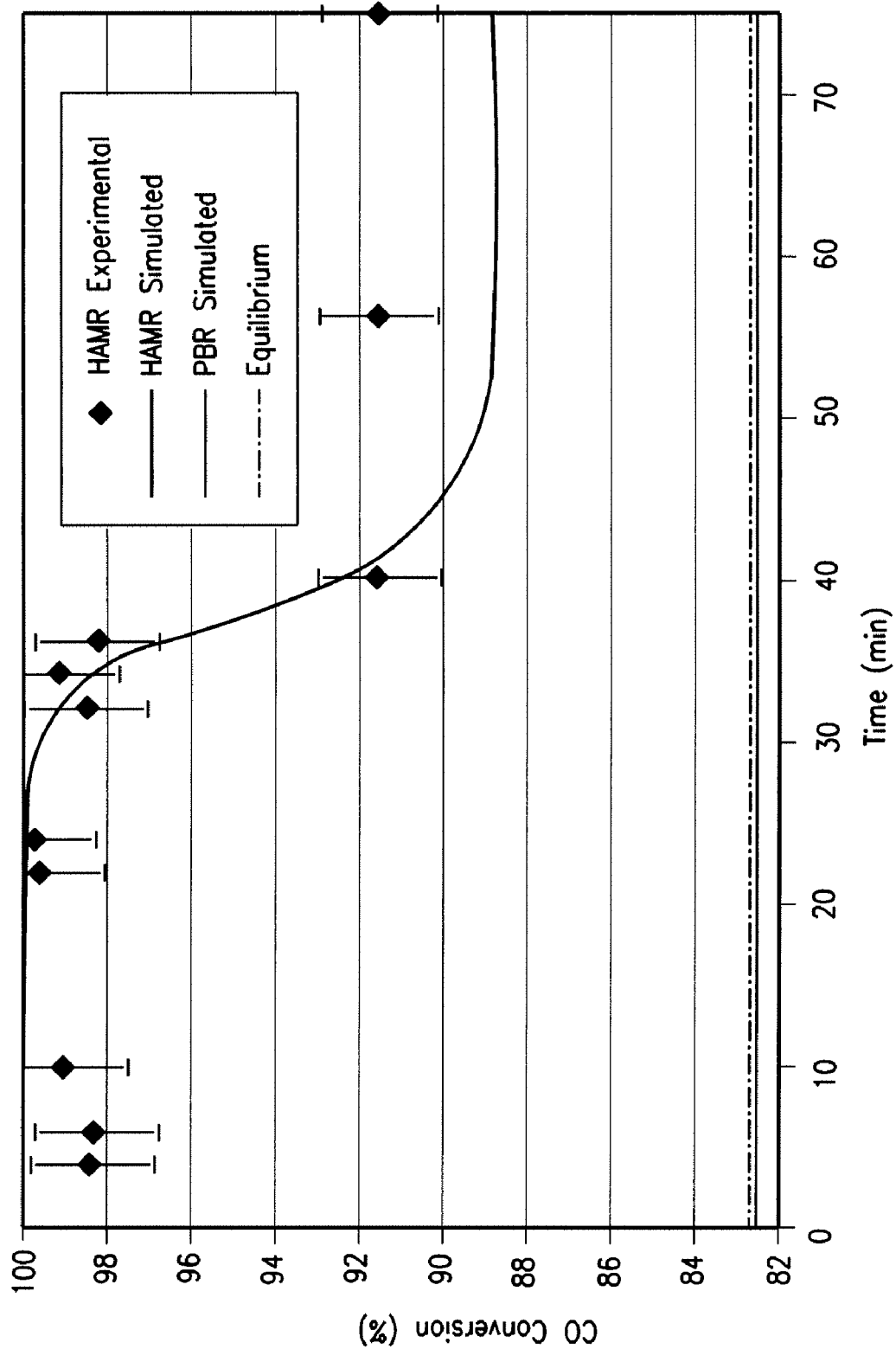
FIG. 53 shows CO conversion vs time (W/F=350).
Figure 54:
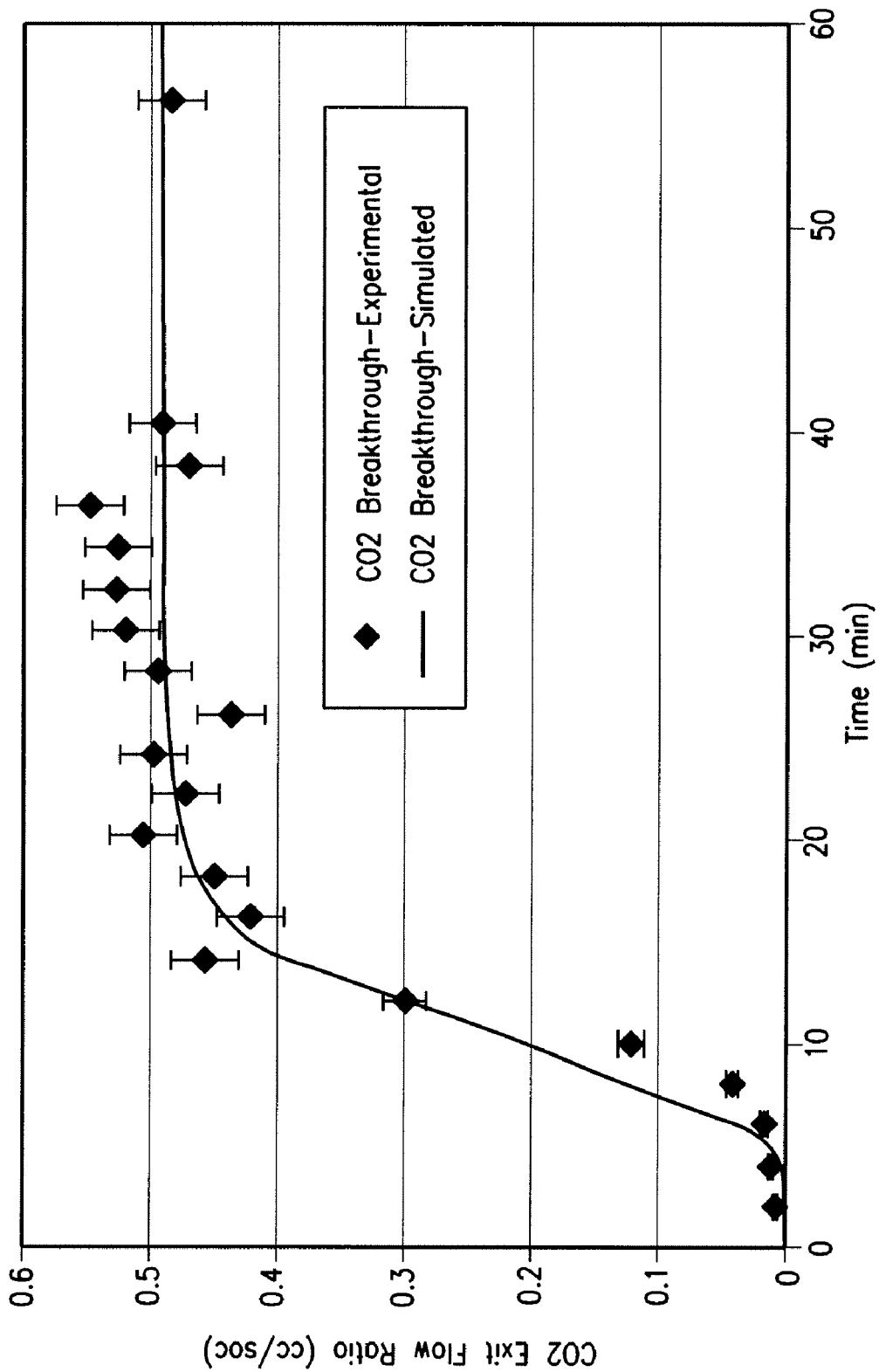
FIG. 54 shows $CO_2$ exit flow rate vs time (W/F=350).
Figure 55:
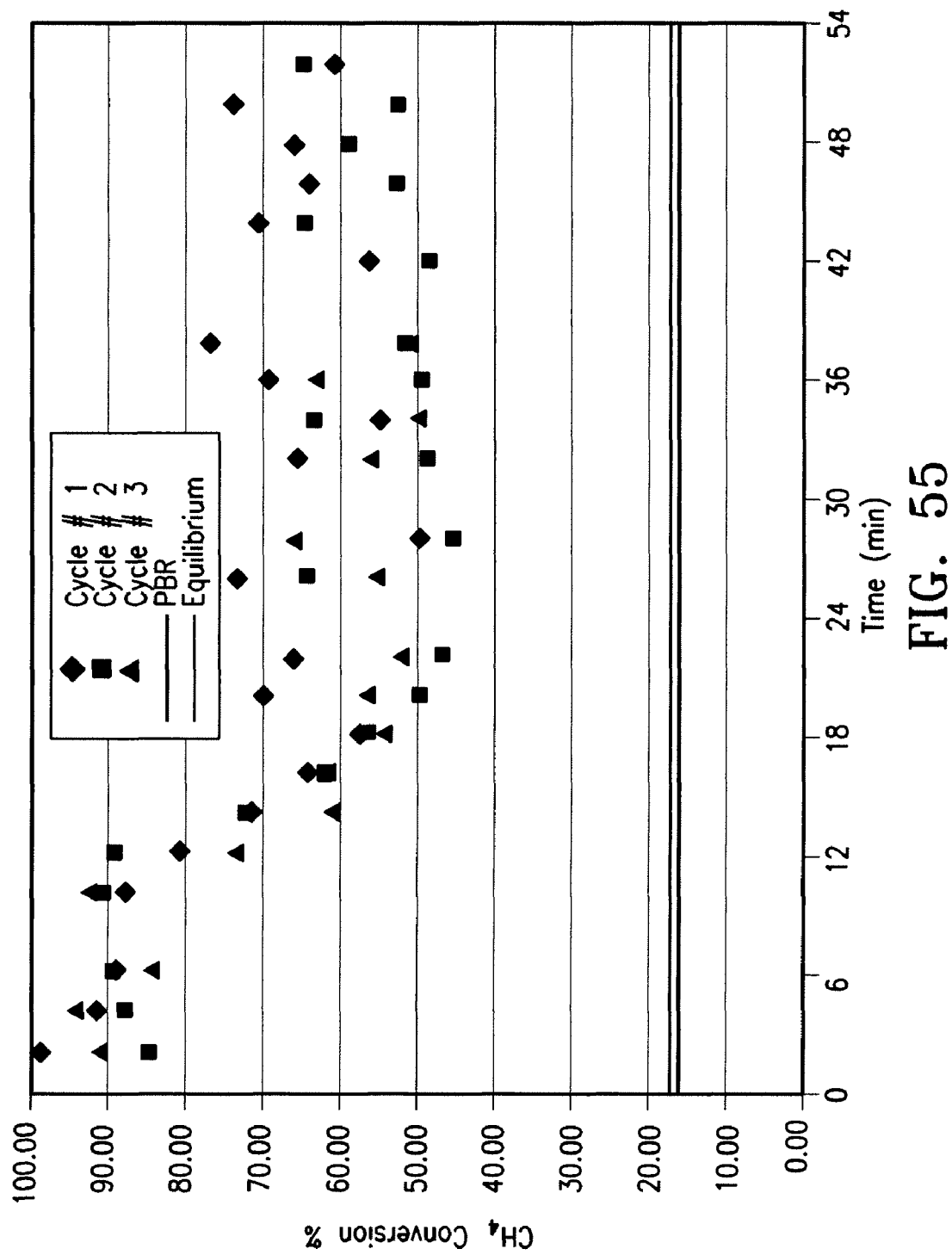
FIG. 55 shows $CH_4$ conversion vs time.

Experimental investigations of HAMR systems using $CO_2$ hydrotalcite-type adsorbents and a porous $H_2$ selective membranes (similar to the one shown in Example I) were also carried out. The behavior of the HAMR and conventional PBR for the WGS reaction for hydrogen production with concomitant $CO_2$ removal were simulated. The adsorption rates and constants were taken from the adsorption studies. The reaction rate constants and the membrane permeances were experimentally determined, as outlined above. The reactor characteristics have been investigated for a range of temperature and pressure conditions and compared with the predictions of the mathematical model. The reactor temperature utilized was 250° C., and a $CO:H_2:H_2O$ feed ratio of 1:4:1.1 was employed. Steam was used as the sweep gas. FIGS. 51 and 53 show the CO conversion attained by both the PBR and HAMR as a function of time for Wc/F, 300 and 350 (Wc is the total weight of the catalyst). The reactor showed complete conversion, while the adsorbent was still active. After the adsorbent saturated, the conversion settled to the value corresponding to the membrane reactor conditions, which was still significantly higher than the conversion of the PBR system and the corresponding equilibrium. Shown in the figures are also the predictions of the HAMR model using no adjustable parameters. FIGS. 52 and 54 show the experimentally measured and calculated exit $CO_2$ molar flow rates for Wc/F, 300 and 350. The agreement between the model and the experiments is again satisfactory.

HAMR systems using $CO_2$ hydrotalcite-type adsorbents and $H_2$ selective palladium membranes for the steam reforming reaction have also been studied. The adsorption rates and constants were taken from the adsorption studies. For the simulations, the reaction rate constants and the membrane permeances were experimentally determined. The reactor temperature utilized was 450° C., and a $CH_4:H_2:H_2O$ feed ratio of 1:0.2:4 was employed. Steam was used as a sweep gas. The HAMR reactor showed near complete conversion, while the adsorbent was still active. After the adsorbent saturated, the conversion settled to the value corresponding to the membrane reactor conditions, which was still (as in the WGS reaction above) significantly higher than the conversion of the PBR system and the corresponding equilibrium.

This U.S. patent application process is partially supported by a grant from Carbon Dioxide Reduction and Sequestration R&D Center under Agreement No. M102KP010023-05K1601-02310 operated by Korean Ministry of Science and Technology.

What is claimed is:

1. A reactor comprising:
   a chamber;
   an inlet for introducing one or more reactants into the chamber;
   a catalyst disposed in the chamber for facilitating a reaction of the reactants to produce at least one desired product and at least one by-product, wherein the reaction is a water-gas-shift (WGS) reaction;
   a membrane disposed in the chamber for selectively permitting the desired product and the by-product to pass through the membrane;
   an adsorbent disposed in the chamber for adsorbing the by-product; and
   an outlet for allowing the desired product to exit the chamber.

2. The reactor of claim 1, wherein the membrane is a carbon molecular sieve (CMS) or silicon carbide membrane.

3. The reactor of claim 1, wherein the adsorbent is a hydrotalcite.

4. An apparatus comprising at least two reactors of claim 1.

5. A reactor comprising:
   a chamber;
   an inlet for introducing one or more reactants into the chamber;
   a catalyst disposed in the chamber for facilitating a reaction of the reactants to produce at least one desired product and at least one by-product, wherein the reaction is a steam reforming reaction;
   a non-metallic membrane disposed in the chamber for selectively permitting the desired product and the by-product to pass through the membrane;
   an adsorbent disposed in the chamber for adsorbing the by-product; and
   an outlet for allowing the desired product to exit the chamber.

6. The reactor of claim 5, wherein the membrane is a CMS or silicon carbide membrane.

7. The reactor of claim 5, wherein the adsorbent is a hydrotalcite.

8. A reactor comprising:
   a chamber;
   an inlet for introducing one or more reactants into the chamber;
   a catalyst disposed in the chamber for facilitating a reaction of the reactants to produce at least one desired product and at least one by-product, wherein the reaction is a steam reforming reaction;
   a membrane disposed in the chamber for selectively permitting the desired product and the by-product to pass through the membrane;
   a hydrotalcite adsorbent disposed in the chamber for adsorbing the byproduct; and
   an outlet for allowing the desired product to exit the chamber.

9. The reactor of claim 8, wherein the membrane is a CMS or silicon carbide membrane.

10. A reactor comprising:
    a chamber;
    an inlet for introducing one or more reactants into the chamber;

a catalyst disposed in the chamber for facilitating a reaction of the reactants to produce at least one desired product and at least one by-product, wherein the reaction is a steam reforming reaction;

a membrane disposed in the chamber for selectively permitting the desired product and the by-product to pass through the membrane;

an adsorbent disposed in the chamber for adsorbing the by-product; and an outlet for allowing the desired product to exit the chamber, wherein neither the catalyst nor the adsorbent is disposed in a circulating fluidized bed.

11. The reactor of claim 10, wherein the membrane is a CMS or silicon carbide membrane.

12. The reactor of claim 10, wherein the adsorbent is a hydrotalcite.

13. An apparatus comprising:
at least two reactors, each reactor including:
a chamber;
an inlet for introducing one or more reactants into the chamber;
a catalyst disposed in the chamber for facilitating a reaction of the reactants to produce at least one desired product and at least one by-product, wherein the reaction is a steam reforming reaction;
a membrane disposed in the chamber for selectively permitting the desired product and the by-product to pass through the membrane;
an adsorbent disposed in the chamber for adsorbing the byproduct; and
an outlet for allowing the desired product to exit the chamber.

14. The reactor of claim 13, wherein the membrane is a CMS or silicon carbide membrane.

15. The reactor of claim 13, wherein the adsorbent is a hydrotalcite.

16. A reactor comprising:
a chamber;
an inlet for introducing one or more reactants into the chamber;
a catalyst disposed in the chamber for facilitating a reaction of the reactants to produce at least one desired product and at least one by-product;
a CMS or silicon carbide membrane disposed in the chamber for selectively permitting the desired product and the by-product to pass through the membrane;
an adsorbent disposed in the chamber for adsorbing the by-product; and
an outlet for allowing the desired product to exit the chamber.

17. The reactor of claim 16, wherein the adsorbent is a hydrotalcite.

18. An apparatus comprising at least two reactors of claim 16.

19. A reactor comprising:
a chamber;
an inlet for introducing one or more reactants into the chamber;
a catalyst disposed in the chamber for facilitating a reaction of the reactants to produce at least one desired product and at least one by-product, wherein the reaction is a steam reforming reaction;
a membrane disposed in the chamber for selectively permitting the desired product and the by-product to pass through the membrane;
a hydrotalcite adsorbent disposed in the chamber for adsorbing the byproduct; and
an outlet for allowing the desired product to exit the chamber.

20. An apparatus comprising at least two reactors of claim 19.

21. A process comprising:
introducing one or more reactants into the reactor of claim 1; contacting the catalyst with the reactants to facilitate a reaction of the reactants to produce at least one desired product and at least one by-product;
selectively passing the desired product and the by-product through the membrane;
adsorbing the by-product with the adsorbent; and
withdrawing the desired product from the reactor.

22. The process of claim 21, wherein the process is carried out at 275-700° C.

23. A process comprising:
introducing one or more reactants into each reactor of the apparatus of claim 4;
contacting the catalyst with the reactants to facilitate a reaction of the reactants to produce at least one desired product and at least one by-product in the reactor;
selectively passing the desired product and the by-product through the membrane in the reactor;
adsorbing the by-product with the adsorbent in the reactor; and
withdrawing the desired product from the reactor,
wherein the reactors of the apparatus are offset in point of time such that, at all times, the desired product is being withdrawn from at least one of the reactors.

24. The process of claim 23, wherein the process is carried out at 275-700° C.

25. A process comprising:
introducing one or more reactants into the reactor of claim 5;
contacting the catalyst with the reactants to facilitate a reaction of the reactants to produce at least one desired product and at least one by-product;
selectively passing the desired product and the by-product through the membrane;
adsorbing the by-product with the adsorbent; and
withdrawing the desired product from the reactor.

26. The process of claim 25, wherein the process is carried out at 275-700° C.

27. A process comprising:
introducing one or more reactants into the reactor of claim 8;
contacting the catalyst with the reactants to facilitate a reaction of the reactants to produce at least one desired product and at least one by-product;
selectively passing the desired product and the by-product through the membrane;
adsorbing the by-product with the adsorbent; and
withdrawing the desired product from the reactor.

28. The process of claim 27, wherein the process is carried out at 275-700° C.

29. A process comprising:
introducing one or more reactants into the reactor of claim 10;
contacting the catalyst with the reactants to facilitate a reaction of the reactants to produce at least one desired product and at least one by-product;
selectively passing the desired product and the by-product through the membrane;
adsorbing the by-product with the adsorbent; and
withdrawing the desired product from the reactor.

30. The process of claim 29, wherein the process is carried out at 275-700° C.

31. A process comprising:
introducing one or more reactants into each reactor of the apparatus of claim 13;
contacting the catalyst with the reactants to facilitate a reaction of the reactants to produce at least one desired product and at least one by-product in the reactor;
selectively passing the desired product and the by-product through the membrane in the reactor;
adsorbing the by-product with the adsorbent in the reactor; and withdrawing the desired product from the reactor,
wherein the reactors of the apparatus are offset in point of time such that, at all times, the desired product is being withdrawn from at least one of the reactors.

32. The process of claim 31, wherein the process is carried out at 275-700° C.

33. A process comprising:
introducing one or more reactants into the reactor of claim 16;
contacting the catalyst with the reactants to facilitate a reaction of the reactants to produce at least one desired product and at least one by-product;
selectively passing the desired product and the by-product through the membrane;
adsorbing the by-product with the adsorbent; and
withdrawing the desired product from the reactor.

34. The process of claim 33, wherein the process is carried out at 275-700° C.

35. A process comprising:
introducing one or more reactants into each reactor of the apparatus of claim 18;
contacting the catalyst with the reactants to facilitate a reaction of the reactants to produce at least one desired product and at least one by-product in the reactor;
selectively passing the desired product and the by-product through the membrane in the reactor;
adsorbing the by-product with the adsorbent in the reactor; and
withdrawing the desired product from the reactor,
wherein the reactors of the apparatus are offset in point of time such that, at all times, the desired product is being withdrawn from at least one of the reactors.

36. The process of claim 35, wherein the process is carried out at 275-700° C.

37. A process comprising:
introducing one or more reactants into the reactor of claim 19;
contacting the catalyst with the reactants to facilitate a reaction of the reactants to produce at least one desired product and at least one by-product;
selectively passing the desired product and the by-product through the membrane;
adsorbing the by-product with the adsorbent; and
withdrawing the desired product from the reactor.

38. The process of claim 37, wherein the process is carried out at 275-700° C.

39. A process comprising:
introducing one or more reactants into each reactor of the apparatus of claim 20;
contacting the catalyst with the reactants to facilitate a reaction of the reactants to produce at least one desired product and at least one by-product in the reactor;
selectively passing the desired product and the by-product through the membrane in the reactor;
adsorbing the by-product with the adsorbent in the reactor; and
withdrawing the desired product from the reactor,
wherein the reactors of the apparatus are offset in point of time such that, at all times, the desired product is being withdrawn from at least one of the reactors.

40. The process of claim 39, wherein the process is carried out at 275-700° C.

* * * * *